US012764606B2

(12) United States Patent
Lunardi et al.

(10) Patent No.: US 12,764,606 B2
(45) Date of Patent: Oct. 13, 2026

(54) MANAGING RESOURCES IN A RADIO ACCESS NETWORK

(71) Applicant: Telefonaktiebolaget LM Ericsson (publ), Stockholm (SE)

(72) Inventors: Luca Lunardi, Genoa (IT); Henrik Rydén, Stockholm (SE); Angelo Centonza, Granada (ES); Pradeepa Ramachandra, Linköping (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 572 days.

(21) Appl. No.: 18/033,060

(22) PCT Filed: Oct. 18, 2021

(86) PCT No.: PCT/EP2021/078859
§ 371 (c)(1),
(2) Date: Apr. 20, 2023

(87) PCT Pub. No.: WO2022/084270
PCT Pub. Date: Apr. 28, 2022

(65) Prior Publication Data
US 2023/0403606 A1 Dec. 14, 2023

Related U.S. Application Data

(60) Provisional application No. 63/094,449, filed on Oct. 21, 2020.

(51) Int. Cl.
*H04W 28/16* (2009.01)
*H04W 24/02* (2009.01)
*H04W 84/04* (2009.01)

(52) U.S. Cl.
CPC .......... *H04W 28/16* (2013.01); *H04W 24/02* (2013.01); *H04W 84/042* (2013.01)

(58) Field of Classification Search
CPC .... H04W 28/16; H04W 24/02; H04W 84/042
See application file for complete search history.

(56) References Cited

U.S. PATENT DOCUMENTS 9,432,901 B1 8/2016 Kwan
10,945,169 B2 * 3/2021 Kanazawa ........ H04W 36/0079
(Continued)

FOREIGN PATENT DOCUMENTS

CN 111093236 A 5/2020
GB 2491362 A 12/2012
WO 2012045059 A1 4/2012
WO 2021088850 A1 5/2021

OTHER PUBLICATIONS

International Search Report and the Written Opinion of the International Searching Authority, issued in corresponding International Application No. PCT/EP2021/078859, dated Jan. 28, 2022, 13 pages.
(Continued)

*Primary Examiner* — Wayne H Cai
(74) *Attorney, Agent, or Firm* — Rothwell, Figg, Ernst & Manbeck. P.C.

(57) ABSTRACT

A computer implemented method for managing resources in a RAN of a communication network is disclosed. The method, performed by a first node in the RAN, comprises obtaining a record of resource status information describing usage, during a historical time period and within a coverage area of the first node, of RAN resources controlled by the first node (2102), and using an ML process to predict, based on the obtained record, resource status information describing usage of RAN resources controlled by the first node within a coverage area of the first node and during a future
(Continued)

time period (2104). The method further comprises sending, to a second node in the RAN, a representation of the predicted resource status information (2106). Also disclosed is a method performed by a second node in which the second node uses a received representation of predicted resource status information for RAN resources controlled by a first node in a process relating to management of RAN resources controlled by the second node (2304).

19 Claims, 34 Drawing Sheets

(56) References Cited

U.S. PATENT DOCUMENTS

| | | | | |
|---|---|---|---|---|
| 11,109,283 | B1 * | 8/2021 | Kulkarni | H04W 24/02 |
| 2022/0394562 | A1 * | 12/2022 | Wang | H04W 36/32 |

OTHER PUBLICATIONS

3GPP TS 36.423 V16.2.0 (Jul. 2020) 3rd Generation Partnership Project; Technical Specification Group Radio Access Network; Evolved Universal Terrestrial Radio Access Network (E-UTRAN); X2 application protocol (X2AP) (Release 16), 490 pages.

3GPP TS 38.401 V15.4.0 (Dec. 2018), 3rd Generation Partnership Project; Technical Specification Group Radio Access Network; NG-RAN; Architecture description (Release 15), 40 pages.

* cited by examiner

MANAGING RESOURCES IN A RADIO ACCESS NETWORK

CROSS REFERENCE TO RELATED APPLICATION(S)

This application is a 35 U.S.C. § 371 National Phase of PCT/EP2021/078859, filed Oct. 18, 2021, designating the United States, which claims the benefit of U.S. Provisional Application No. 63/094,449, filed Oct. 21, 2020, the disclosures of which are incorporated herein in their entirety by reference.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The current 5G RAN (NG-RAN) architecture is depicted and described in TS 38.401v15.4.0 (http://www.3gpp.org/ftp//Specs/archive/38_series/38.401/38401-f40.zip) as illustrated in FIG. 1.

The NG architecture illustrated in FIG. 1 can be described as follows. The NG-RAN consists of a set of gNBs connected to the 5GC through the NG. An gNB can support FDD mode, TDD mode or dual mode operation. gNBs can be interconnected through the Xn interface. A gNB may consist of a gNB-CU and gNB-DUs. A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes, and interfaces between them, are defined as part of the RNL. For each NG-RAN interface (NG, Xn, F1) the related TNL protocol and the functionality are specified. The TNL provides services for user plane transport and signaling transport.

A gNB may also be connected to an LTE eNB via the X2 interface. Another architectural option is that where an LTE eNB connected to the Evolved Packet Core network is connected over the X2 interface with a so called nr-gNB. The latter is a gNB not connected directly to a CN and connected via X2 to an eNB for the sole purpose of performing dual connectivity.

The architecture in FIG. 1 can be expanded by spitting the gNB-CU into two entities. One gNB-CU-UP, which serves the user plane and hosts the PDCP protocol and one gNB-CU-CP, which serves the control plane and hosts the PDCP and RRC protocol. For completeness it should be noted that a gNB-DU hosts the RLC/MAC/PHY protocols.

Resource Status Update

XnAP and X2AP procedures are defined in 3GPP so that a RAN node can provide another RAN node with Resource Status Update related to different resources. Relevant procedures are:

In TS 36.423 v16.2.0 (X2AP):
Resource Status Reporting Initiation
Resource Status Reporting
EN-DC Resource Status Reporting Initiation
EN-DC Resource Status Reporting
In TS 38.423 v16.2.0 (XnAP):
Resource Status Reporting Initiation
Resource Status Reporting
Traffic prediction Cell-Level Prediction In the example illustrated in FIG. 2, a cell in a real network deployment predicts its future traffic in order to activate MIMO-sleep in order to save battery. The figure shows how the periodicity of traffic each day can enable an accurate prediction. The horizontal line shows the threshold for activation, the intermediate line is the prediction, while the line with the highest peaks shows the real data.

UE-Level Prediction

With a prediction model, it is possible to estimate the probability of data arriving in the downlink/uplink. This could for example be the probability of data arriving within time T, or data received within the frame $T_1$ to $T_2$. The prediction could be based on the history of data transmissions/receptions of the UE (i.e. traffic pattern), UE behavior (e.g. activity and mobility pattern, etc.), or those of other UEs, for example by using any of the following inputs:

Packet Inter Arrival Time (standard deviation, average, median, . . . )
Number of Packets Up/Down
Total bytes Up/Down
Packet sizes
Time since last packet
Packet protocols (http/voice, . . . )
UE manufacturer
PDU Session type(s)
QoS profile(s)
Slice type(s)

There currently exist certain challenge(s). Current telecommunication systems have several ways to measure and report metrics that allow determination of resources consumed or available in a given area of coverage. Such metrics can be used for various purposes.

In one example of current solutions, mobility load balancing decisions consider load metrics reflecting measurements taken in the past and reported from one (source) node to another (target) node. One of the uses the target RAN node makes of such information is to decide which mobility target cell is the best possible handover target. There are however other uses the RAN could make of information regarding resources used in a neighbor cell.

SUMMARY

Certain aspects of the present disclosure and their embodiments may provide solutions to these or other challenges.

According to a first aspect of the present disclosure, there is provided a computer implemented method for managing resources in a Radio Access Network, RAN, of a communication network. The method, performed by a first node in the RAN, comprises obtaining a record of resource status information describing usage, during a historical time period and within a coverage area of the first node, of RAN resources controlled by the first node. The method further comprises using a Machine Learning, ML, process to predict, based on the obtained record, resource status information describing usage of RAN resources controlled by the first node within a coverage area of the first node and during a future time period. The method further comprises sending, to a second node in the RAN, a representation of the predicted resource status information.

According to another aspect of the present disclosure, there is provided a computer implemented method for managing resources in a Radio Access Network, RAN, of a communication network. The method, performed by a second node in the RAN, comprises receiving, from a first node in the RAN, a representation of predicted resource status information describing usage of RAN resources controlled by the first node within a coverage area of the first node and during a future time period. The method further comprises using the received representation of predicted resource status information for RAN resources controlled by the first node in a process relating to management of RAN resources controlled by the second node.

According to another aspect of the present disclosure, there is provided a first node in a communication network comprising a Radio Access Network, RAN, the first node being configured to manage resources in the Radio Access Network, RAN. The first node is configured to obtain a record of resource status information describing usage, during a historical time period and within a coverage area of the first node, of RAN resources controlled by the first node. The first node is further configured to use a Machine Learning, ML, process to predict, based on the obtained record, resource status information describing usage of RAN resources controlled by the first node within a coverage area of the first node and during a future time period. The first node is further configured to send, to a second node in the RAN, a representation of the predicted resource status information.

According to another aspect of the present disclosure, there is provided a second node in a communication network comprising a Radio Access Network, RAN, the second node being configured to manage resources in the Radio Access Network, RAN. The second node is configured to receive, from a first node in the RAN, a representation of predicted resource status information describing usage of RAN resources controlled by the first node within a coverage area of the first node and during a future time period. The second node is further configured to use the received representation of predicted resource status information for RAN resources controlled by the first node in a process relating to management of RAN resources controlled by the second node.

The proposed solution adds support for the exchange of predicted or anticipated values of resource utilization metrics, also referred in this invention as load metrics, that can be used as input to algorithms for radio resource optimization, such as load balancing or resource management. Many uses may be envisaged to which the RAN may put predicted information regarding resources that will be used in a neighbour cell.

Predicted values of resource use metrics can be derived based on the actual and predicted status of resources in an given first RAN node, the actual and predicted status of resources in the first RAN node and in other neighbor RAN nodes, the history of load balancing decisions taken by the first RAN node and its neighbor RAN nodes, etc.

In one example of the present disclosure a first node collects measures of utilized resources and provides such measures, possibly together with other information available at the node, as input to an algorithm that predicts the resources that will be utilized in a future time window. Such resource utilization prediction may be derived for different parts of the communication system, for example for the radio interface, for the transport network, for specific cells or beamformed coverage areas, for specific classes of services or network slices.

The information about prediction of utilized resources is sent from the node that derives it to a second node. Such node may use this information for a number of purposes, for example relating to resource optimization in the RAN, improvement of user experience, etc.

In one example of the present disclosure the node receiving the prediction of resource utilization may use it to optimize its handover decision function. For example, on the basis of a predicted load for a given future time window, the second node may determine which of the potential handover target cells may best serve a moving UE, and select the determined cell as target cell.

In another example of the present disclosure the node receiving the prediction may use it to estimate the level of cross cell interference caused by communication on the utilized resources of neighboring cells. This may assist the second node in taking decisions on resource utilization or on configuration of radio channels.

In another example of the present disclosure, when the first network node sends the predicted network information to the second network node, the first network node may include a request for feedback information related to the prediction accuracy of the predictions.

There are, proposed herein, various embodiments which address one or more of the issues disclosed herein, as set out in the claims below and with reference to FIGS. 21 and 23.

Certain embodiments may provide one or more technical advantages, including improvement of traffic steering by means of load balancing decisions that reflect the expected load in the system in a better way, more efficient resource usage across multiple nodes in a RAN, reduced interference, improved user experience, etc.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Additional Information section at the end of the Detailed Description.

It will be appreciated that for the purposes of the present disclosure, a node of a Radio Access Network (RAN), also referred to herein as a RAN node, comprises a node that is operable to transmit, receive, process and/or orchestrate wireless signals. A RAN node may comprise a physical node and/or a virtualized network function. The term RAN node may therefore refer to Long Term Evolution (LTE) or New Radio (NR) technology and may be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, or any future implementation of the above discussed functionality.

Also for the purposes of the present specification, the term RAN resources refers to any resources available to the RAN network, and under the control of one or more nodes of the RAN network. Such resources may include radio spectrum resources radio spectrum resources, examples of which include PRBs in downlink and uplink, PDCCH CCEs for downlink and uplink and other examples, such as are reported in TS38.423 for the IE Radio Resource Status. A coverage area of a RAN node refers to the geographical and/or radio area over which the RAN node provides access to the communication network.

Summary of Steps which May be Performed According to Certain Examples

Example methods of the present disclosure are executed in a radio access network (RAN), in which a first RAN node and a second RAN node are neighbors, meaning a signaling connection is established between them.

Figure 1:
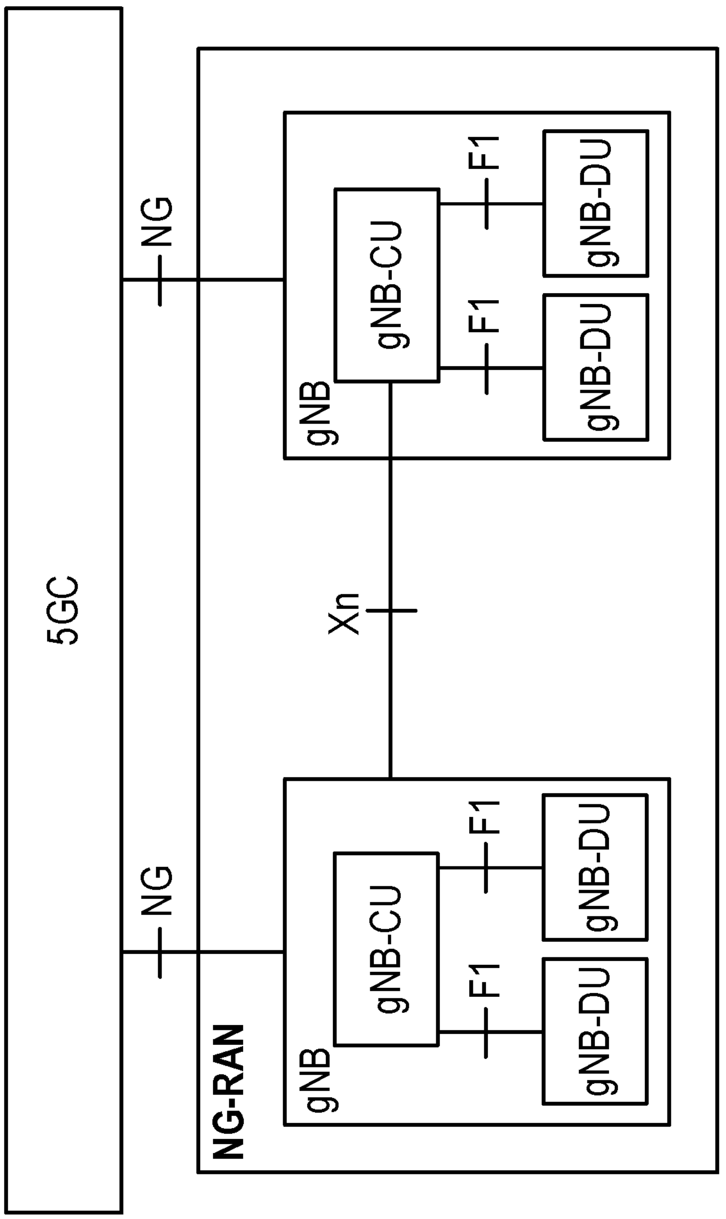
FIG. 1 illustrates a 5G RAN (NG-RAN) architecture.
Figure 2:
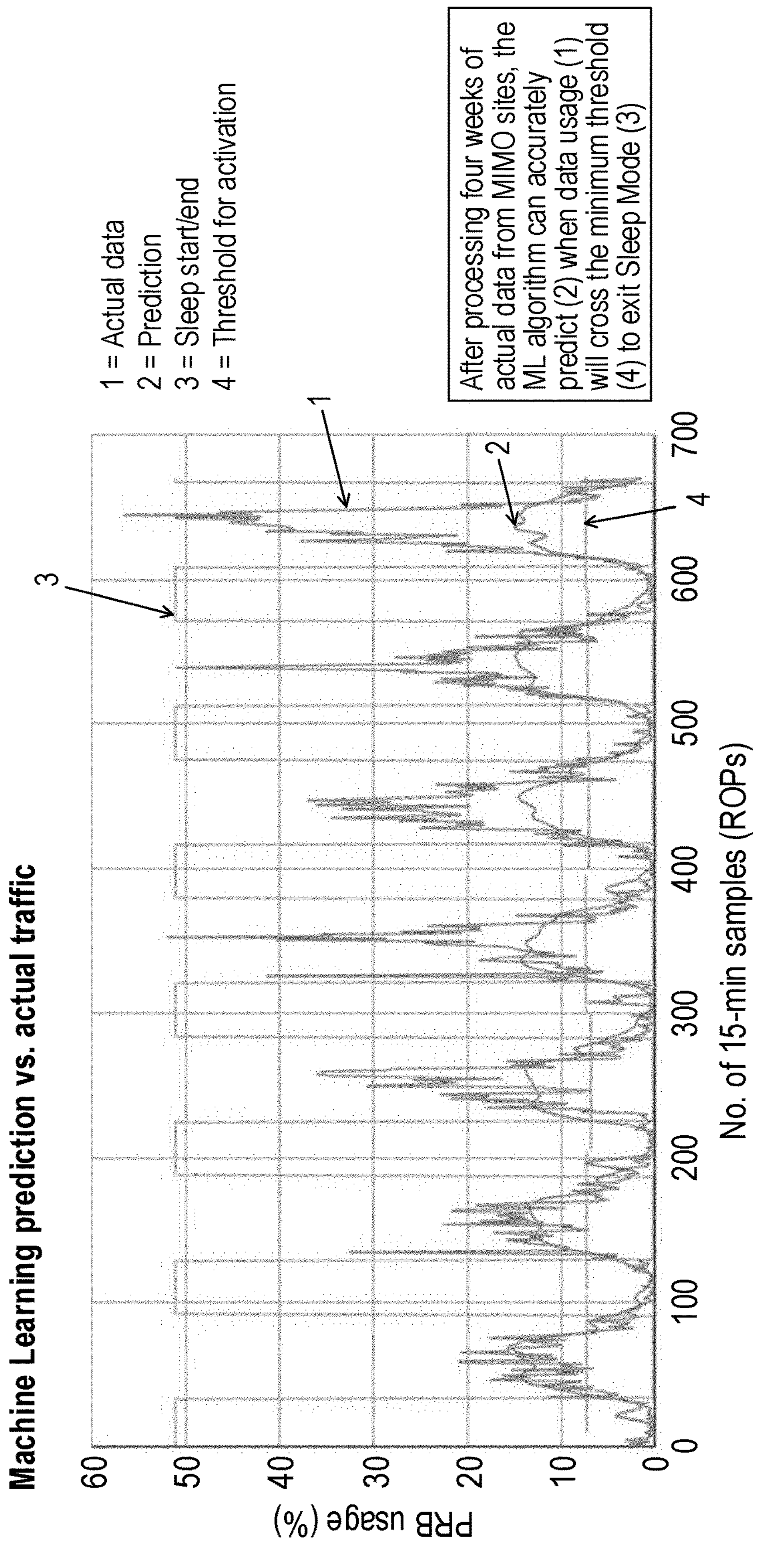
FIG. 2 illustrates a machine learning prediction of traffic in a cell.
Figure 3:
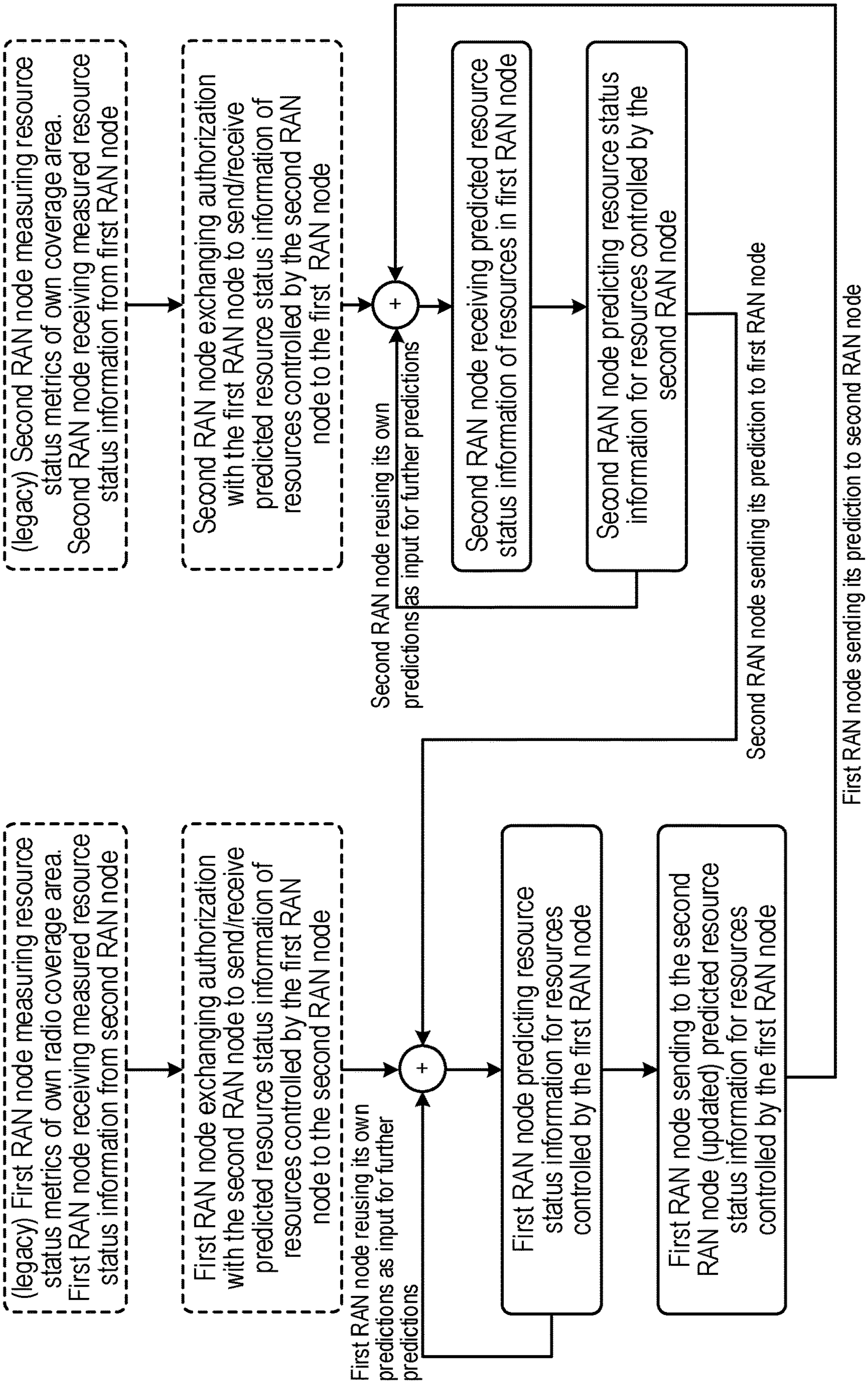
FIG. 3 show steps which may be performed at a first RAN node and a second RAN node.

Steps which may be performed at the first RAN node and second RAN node are summarized in FIG. 3.

Referring to FIG. 3, it will be appreciated that the process of generating predicted resource utilization information may happen in only one of the interacting nodes or in both nodes. Namely, there might be only one of the two nodes (for example the first node) producing the predicted information and the other node (for example the second node) subscribing to receiving such information. It will also be appreciated that the prediction run by a given node does not depend necessarily on reception of resource utilization prediction from the neighbor node, thus the prediction of future resource information at a given first node may be performed on the basis of historical resource use at the first node alone. However, receiving a RAN node prediction of the resource utilization in neighboring coverage areas, such as neighboring cells controlled by a different second RAN node, may improve the prediction of the resource utilization for the first RAN node. This is because, for example:

- The first node may use the resource utilization prediction from the second node to deduce how much traffic can be handed over to the second node coverage area, and consequently how much RAN resource(s) will be available in the coverage area of the first network node as a result of this transfer.
- The first node may use the resource utilization prediction from the second node to deduce how much interference the second node may cause to radio communications between the first network node and its UEs. This in turn provides an indication of how much resource (s) the first node will need to serve its UEs. For example, with higher interference from neighbor cells, lower modulation and coding schemes may need to be selected, and therefore less spectral efficiency is achieved.

Example Behavior at a First RAN Node

At a first radio access network (RAN) node, one example method according to the present disclosure may include some or all of the following steps:

Receiving, from a second RAN node, resource status information concerning actual values (this information may be received according to existing standardized procedures);

Measuring resource utilization of served radio coverage (this may be performed according to existing standardized procedures);

Negotiating with the second RAN node for the provision of predicted resource status information by:

Sending to the second RAN node an authorization request, indicating that the first RAN node wants to send predicted resource status information of resources controlled by the first RAN node to the second RAN node, the request triggered for example by an event in the first RAN node such as the start of traffic to/from a UE served by the first RAN node; or Receiving from the second RAN node a request to receive predictions of resource utilization generated by the second node, the request may for example by triggered by an event in the second RAN node such as the start of traffic to/from a UE served by the second RAN node;

Receiving from the second RAN node an authorization response, indicating that the second RAN node can accept predicted resource status information of resources controlled by the first RAN node; or Signaling to the second RAN node confirmation that the predicted resource utilization metrics can be received by the first RAN node from the second RAN node;

If available, receiving from the second RAN node predicted resource status information for resources controlled by the second RAN node;

Predicting resource status information for resources controlled by the first RAN node based on:

collected historical data of measured resource status information related to resources controlled by the first RAN node;

if available, collected historical data of measured resource status information related to resources controlled by the second RAN node;

if available, predicted resource status for resources controlled by the first RAN node;

if available, received predicted resource status for resources controlled by the second RAN node;

previous resource management decisions, and/or RAN operations carried out by the first RAN node, including for example connection operations, mobility operations, reporting operations, resource configuration operations, synchronisation operations, traffic management operations, scheduling operations etc. Specific examples of RAN operations may include Link Adaptation, Scheduling, mobility, Inter and intra-frequency handover, positioning, beamforming, Uplink and downlink synchronisation, random access, uplink power control, wireless signal reception/transmission, etc.

Sending, to the second RAN node, updated predicted resource status information for resources controlled by the first RAN node The predicted resource status information may comprise at least one of:

Time window for which the prediction is considered valid

Predicted number of active UEs (where number of active UEs is defined in e.g. TS38.423)

Predicted QoE metrics or QoE score

Predicted QoS characteristics: GBR, PDB, PER etc.

Predicted RRC Connections and available RRC Connection Capacity

Predicted number of inactive UEs

Predicted TNL Capacity, namely a prediction of the resources available over the transport network Predicted Composite Available Capacity, in uplink and/or downlink, namely a prediction of the capacity available over a specific radio coverage area of the node Predicted Slice Available Capacity, in uplink and/or downlink namely a prediction of the capacity available over a specific radio coverage area of the node and for a specific network slice Predicted traffic for each UE, for example probability of an arrival of packet within T seconds for each connected UE Predicted size of data arrival in uplink or downlink for a UE within T seconds.

Predicted resource utilization in areas neighboring with specific coverage areas, for example:

Resource utilization prediction at cell edge between cell with first CGI x and cell with second CGI y Predicted transmission power used per resource block in UL and DL This metric could be provided on a per UE basis or on a cumulative basis, i.e. counting all UEs using the same resource block within a given coverage area, or with respect to the criteria listed below Uncertainty (accuracy, precision) indication for each one of the predicted resource status or an overall uncertainty indication for the overall prediction being exchanged It will be appreciated that the metrics listed above may be collected according to at least one of the following criteria:

separately for uplink and downlink, combined for uplink and downlink, per cell, per DRB, per 5QI, per QCI per intra cell coverage area, e.g. per SSB area, per CSI-RS area per network slice minimum, maximum, mean, median, average per sharing PLMN The step of predicting resource status information for resources controlled by the first RAN node comprises using a Machine Learning (ML) process to predict the resource status information, for example by submitting chosen inputs to an ML model.

One example of an ML model that may be used to generate and represent the predicted resource status information is an Autoregressive model (AR-model). An AR-model is used to regress a time-series value on previous values from the same time series. For example, an AR-model with two components is illustrated below.

$$y_t=\beta_0+\beta_1 y_{t-1}+\beta_2 y_{t-2}+\epsilon_t$$

An AR-model can also be used by the second node to represent its historical resource status information, and this may be used by the first node to predict future resource status information for the second node. For example, using an AR-model, the second node can signal its current load values in a number of time instances (t−1, t−2, . . . ), in combination with the AR-model coefficients. This can allow the first node to estimate a time-series of predicted load values in the second node for future time instances (t, t+1, t+2 . . . ). The second node can also indicate the timesampling of the AR-model, for example indicating that x seconds elapse between each load information value. The load information can be any metric described in above list. The second node can also indicate the noise component E, describing how the uncertainty propagates in time. It will be appreciated that by including the epsilon term, an uncertainty estimate of the prediction can be generated. This can be used as a weighting estimate at the receiving node (the first node), when using the prediction, or used to trigger a new report. By using AR-models, the signaling can be reduced in comparison to reporting each load value per future time-instance. The AR-model order depends on the complexity of the time-series properties.

In further examples, the predicted resource status information may be generated and/or reported using a Recurrent Neural Network or Long Short-Term Memory (LSTM) algorithm. A Recurrent Neural Network (RNN) takes sequential values as inputs (t, t−1, t−2) and can generate a predicted future value at t+1, t+2, using a number of neurons that are connected with loops. In comparison to a traditional Feedforward Neural Network, the loops in RNN can take prior information into account for future neurons. Through signaling of the RNN structure and weights from the second network node, in addition to the observed load values in (t−1, t−2 . . . t−N) the first network node can generate a sequence of load-information predictions by feeding the predicted value back into the RNN. The LSTM method is an extension to RNN that is better suited to handling long time-series. LSTM works in a similar manner to RNN, feeding predicted values of the sequence back into the LSTM to generate new predictions of the load sequence.

Figure 4:
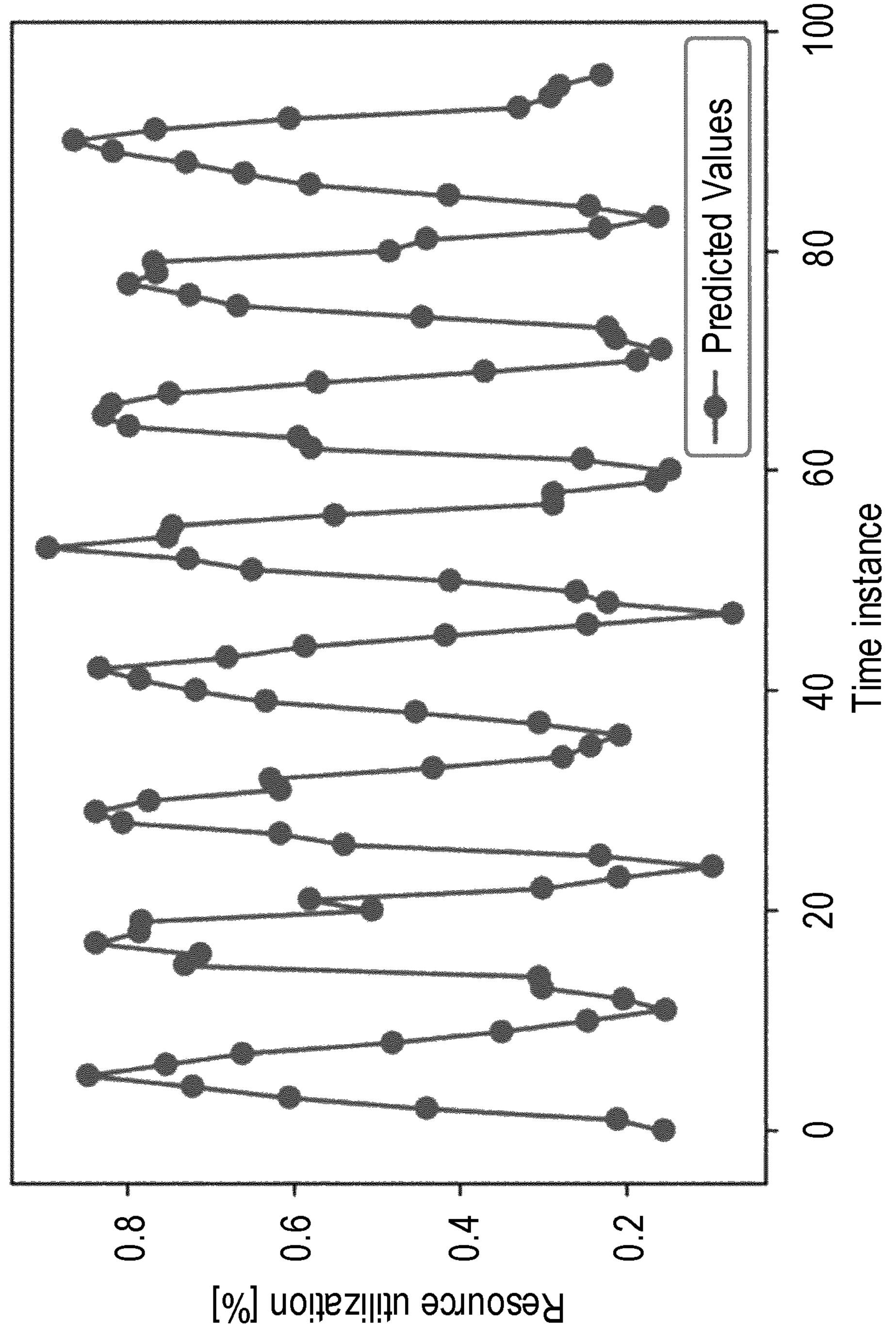
FIG. 4 illustrates predicted values of resource utilisation in future time instances.

In another example, the prediction provided by the first node can comprise a time-offset and value related to a previous prediction. In a related example, the second network node can select a threshold for the granularity of reporting. For example, first node can report a new value when a new predicted value is T greater than a previous value as shown in FIG. 4, which illustrates predicted value in future time instances. The first node signals the time-instance when the predicted value is larger than the threshold T. Reporting granularity can be selected during a negotiation between the first and second nodes for the provision by the first node of its predicted resource status information.

Example 1

Figure 5:
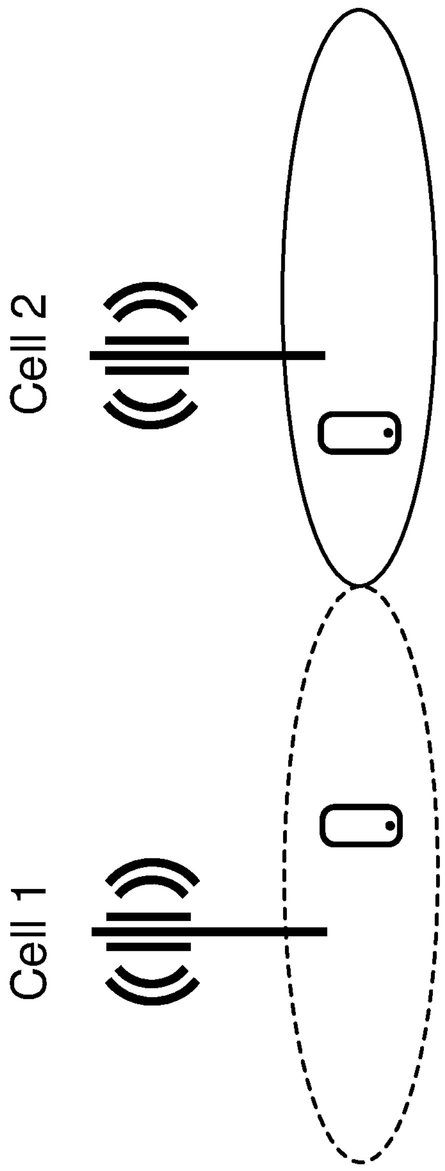
FIG. 5 shows load in two cells according to an example.
Figure 6:
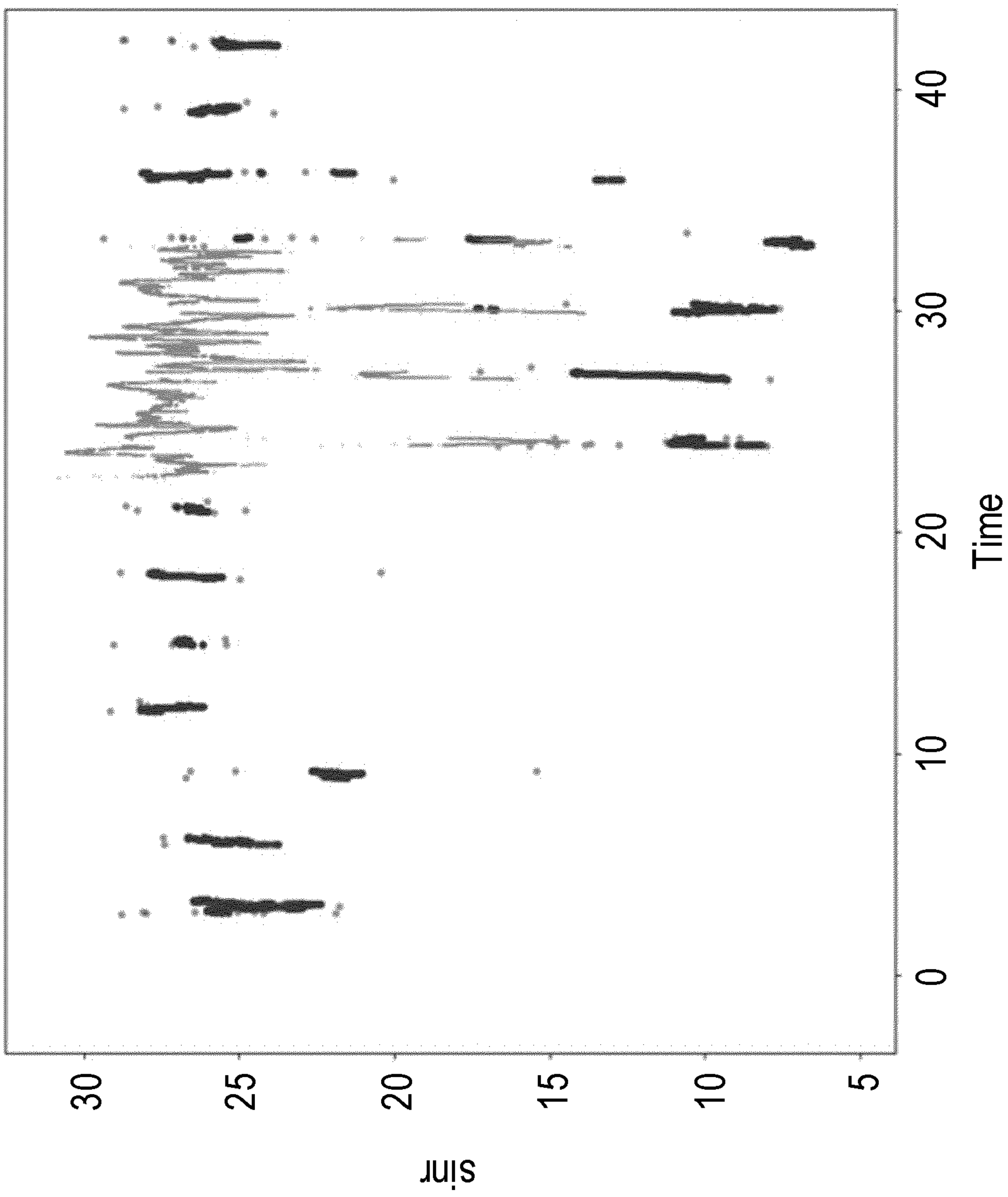
FIG. 6 illustrates SI NR variation for the UEs in FIG. 5.
Figure 7:
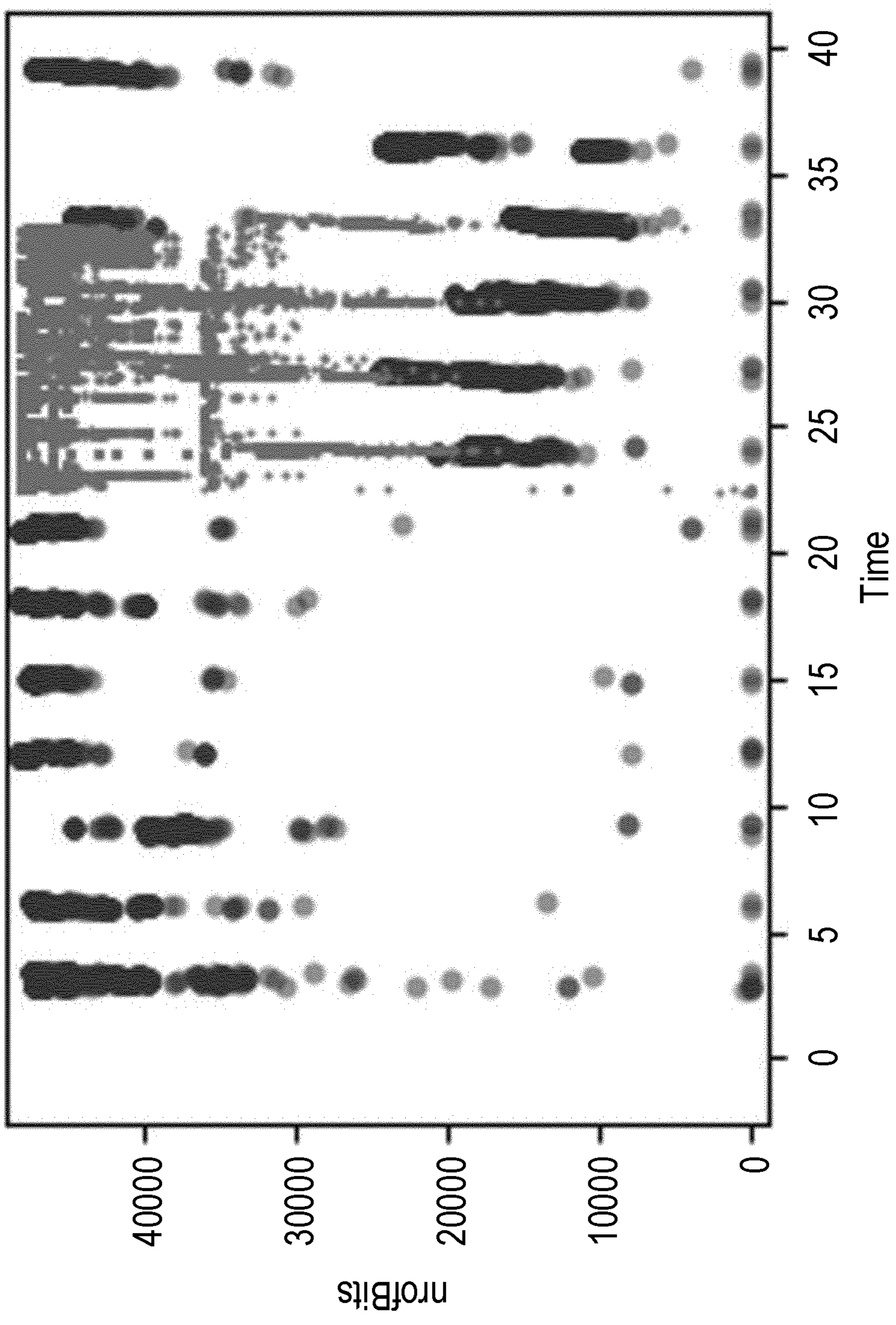
FIG. 7 shows how the transport block size varies depending on time.

According to the present example, the load in two cells is illustrated in FIG. 5, in which cell 1 has one connected UE with periodic video streaming traffic starting at t=3 seconds, and cell 2 has a file transfer download to a UE starting in t=23 seconds. FIG. 6 illustrates SINR variation for the video-streaming UE and the file-downloading UE, highlighted SINR when the traffic of the two UEs is colliding (starting at t=23 seconds). FIG. 6 shows how the SINR for the video-streaming UE and the file-downloading UE varies depending on whether their traffic is colliding. FIG. 7 shows how the transport block size varies depending on the time (the cell needs to select a lower block size depending on the SINR). Using example methods disclosed herein, cell 1 (with video streaming UE) could signal its predicted traffic to cell 2 (with file download UE), for example based on a request from cell 2 upon traffic start to its UE. Cell 1 could then send, for example, the time instances and corresponding size of predicted future packets to UE 1 (left UE). The prediction can be based on its transmitted packets from t=3 to t=23 seconds for UE 1. Next, based on receiving the prediction, cell 2 can use the received prediction in a process for managing its own resources with respect to the file download UE. Cell 2 may for example use the received prediction to configure one or more RAN operations with respect to its served UE. In one example, cell 2 may avoid scheduling any traffic in predicted interfering slots, or setting link-adaptation based on predicted traffic. In this manner, resource use is optimized between the two cells.

Example 2

Figure 8:
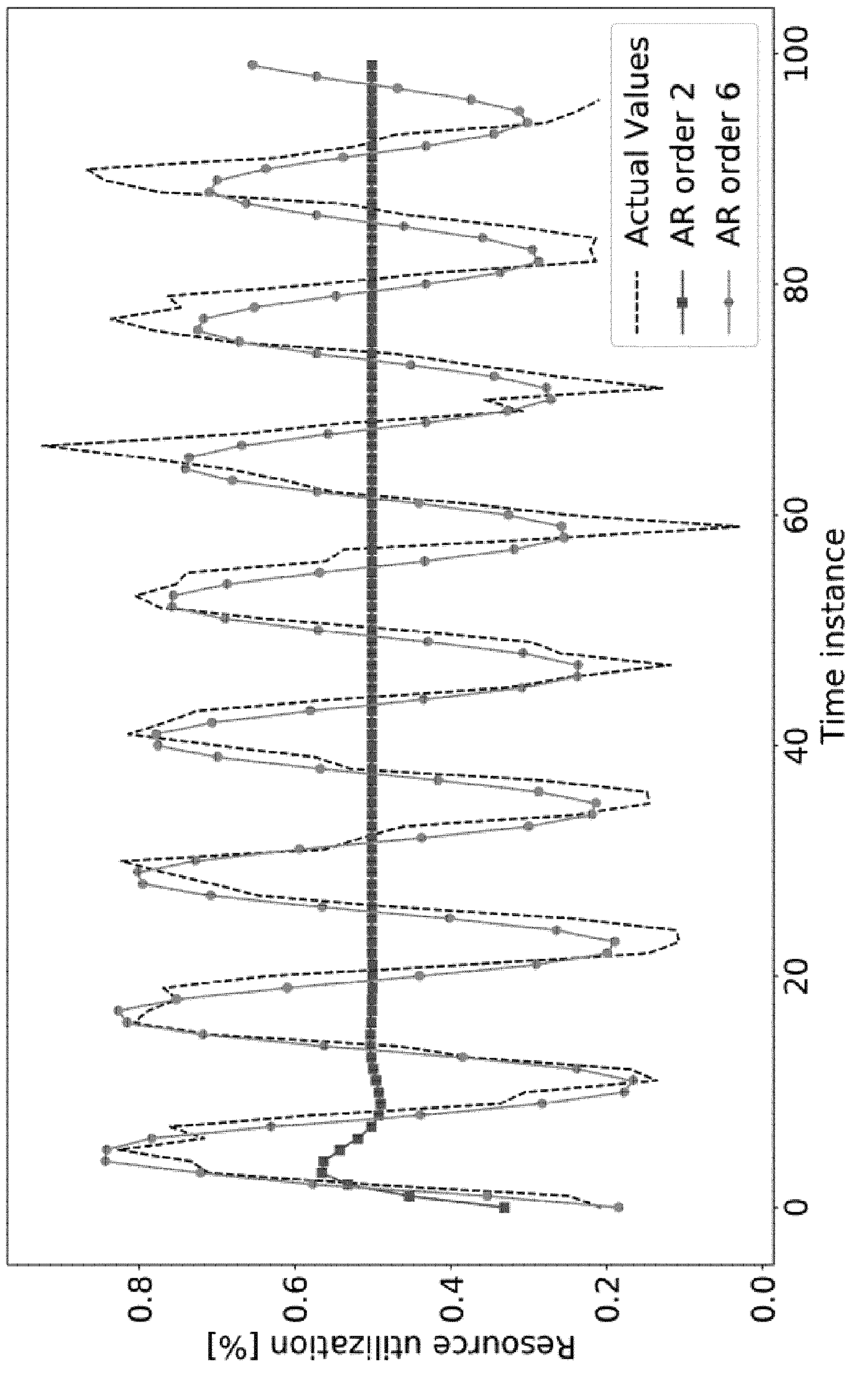
FIG. 8 illustrates resource utilization in a cell over a certain time interval in another example.

According to a second example, resource utilization in a cell over a certain time interval 1-100 is illustrated in FIG. 8. The cell builds an AR-model in order to predict future resource status information and signal an efficient representation to a neighboring cell describing the predicted future traffic. FIG. 8 illustrates resource utilization prediction illustrating $2^{nd}$ and $6^{th}$ order AR model prediction of resource usage against actual values, and shows how the two AR-models of order 2 and 6 perform. The figure shows how a 6-order model provides better prediction than a 2-order (which appears as a substantially horizontal line after approx. 10 seconds, and that a 2-order model is not sufficient to capture the future predicted values in the illustrated example. The first node can select the order using for example the autocorrelation properties of the load time-series.

Figure 9:
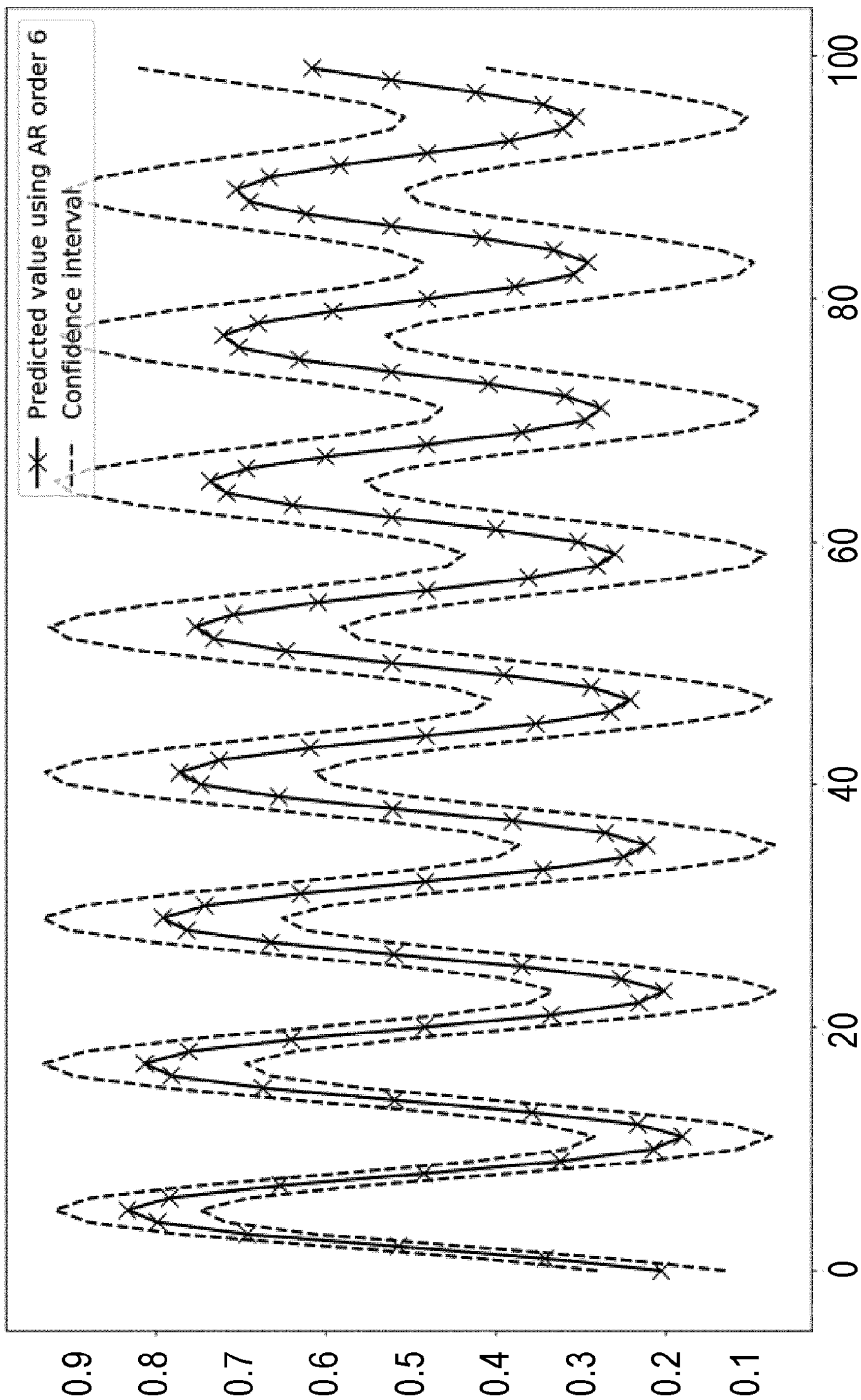
FIG. 9 shows prediction uncertainty using an AR model of order 6.

The prediction uncertainty using an AR model of order 6 is illustrated in FIG. 9. The uncertainty naturally increases with the time-horizon of the autoregressive model. The second node receiving the AR-model can for example request a new measured value when the uncertainty is too high.

Example Behavior at a Second RAN Node

Figure 11A:
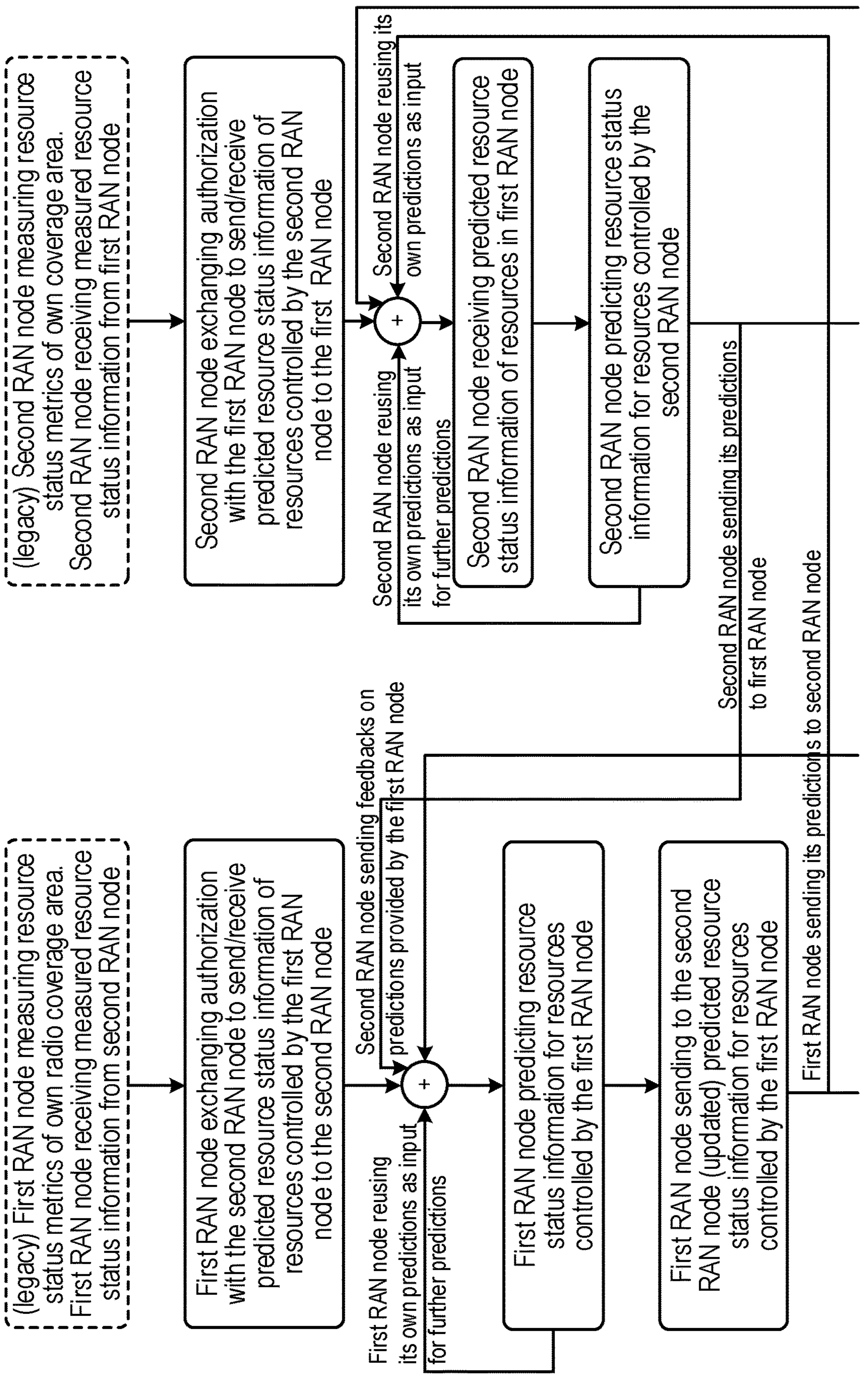
FIGS. 11*a* and 11*b* show a summary of steps which may be performed in example methods proposed herein.
Figure 11B:
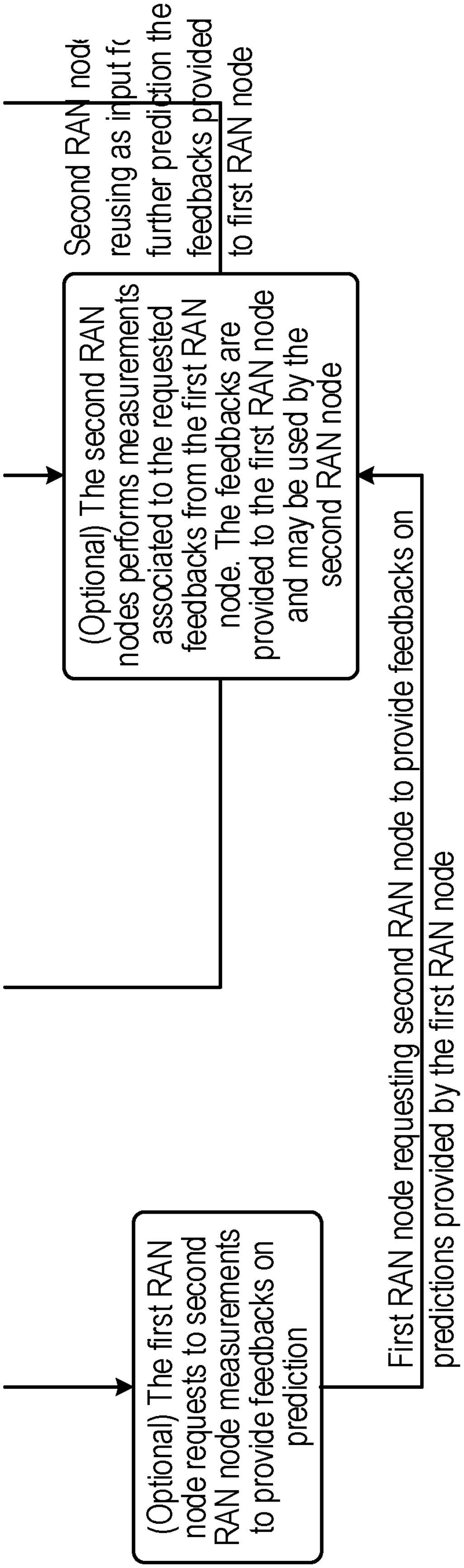

Behavior at the second RAN node may both complement and mirror behavior at the first RAN node. That is, the second RAN node may receive the predicted resource status information from the first RAN node as discussed above, and may provide actual and/or predicted status information to the first RAN node to be used by the first RAN node as input for its own prediction, as well as participating in the negotiation for provision of the predicted information by the first RAN node. In addition, the second RAN node may also generate its own prediction of resource status information and provide this to the first RAN node. While the examples above have been described with the first RAN node acting essentially as provider of predicted resource status information, and the second RAN node acting as receiver of predicted resource status information, in some examples, each of the first and second RAN nodes may both provide and receive predicted resource status information, as illustrated in FIGS. 3, 11*a* and 11*b*, and discussed in further detail below.

At the second RAN node, one example method according to the present disclosure may include some or all of the following steps:

- Measuring resource utilization of served radio coverage (this may be performed according to existing standardized procedures)
- Providing, to the first node, resource status information for actual values based on the above measurements. The second node may also receive, from the first RAN node, resource status information concerning actual values for the first RAN node (this information may be exchanged according to existing standardized procedures)
- Negotiating with the first RAN node for the receipt of predicted resource status information by:

Receiving from the first RAN node an authorization request, indicating that the first RAN node wants to send predicted resource status information of resources controlled by the first RAN node to the second RAN node, the request triggered for example by an event in the first RAN node such as the start of traffic to/from a UE served by the first RAN node, or Sending to the first RAN node a request to accept predictions of resource utilization generated from the second node, the request may for example be triggered by an event in the second RAN node such as the start of traffic to/from a UE served by the second RAN node;

Sending to the first RAN node an authorization response, indicating that the second RAN node can accept predicted resource status information of resources controlled by the first RAN node; or Receiving from the first RAN node confirmation that the predicted resource utilization metrics can be received by the first RAN node from the second RAN node;

If available, sending to the first RAN node predicted resource status for resources controlled by the second RAN node;

Receiving, from the first RAN node, predicted resource status information for resources controlled by the first RAN node;

Using the received representation of predicted resource status information for RAN resources controlled by the first node in a process relating to management of RAN resources controlled by the second node, for example by inputting the prediction to one or more resource optimization processes and/or configuring one or more RAN operations performed by the second node on the basis of the prediction;

Predicting resource status information for resources controlled by the second RAN node based on:

collected historical data of measured resource status information related to resources controlled by the second RAN node;

if available, collected historical data of measured resource status information related to resources controlled by the first RAN node;

if available, predicted resource status for resources controlled by the second RAN node;

if available, received predicted resource status for resources controlled by the first RAN node;

previous resource management decisions, and/or RAN operations carried out by the second RAN node, including for example connection operations, mobility operations, reporting operations, resource configuration operations, synchronisation operations, traffic management operations, scheduling operations etc. Specific examples of RAN operations may include Link Adaptation, Scheduling, mobility, Inter and intra-frequency handover, positioning, beamforming, Uplink and downlink synchronisation, random access, uplink power control, wireless signal reception/transmission, etc.

Sending, to the first RAN node, updated predicted resource status information for resources controlled by the second RAN node.

Examples of parameters that may be included in the historical and/or predicted resource status information are discussed above with respect to behavior at the first RAN node.

As demonstrated above, the behavior at the first and second nodes may form a closed loop, with each node sending to the other node its own prediction when available. Each node may consequently use the received prediction to optimize resource usage, for example through load balancing or configuration of other RAN operations.

Figure 10:
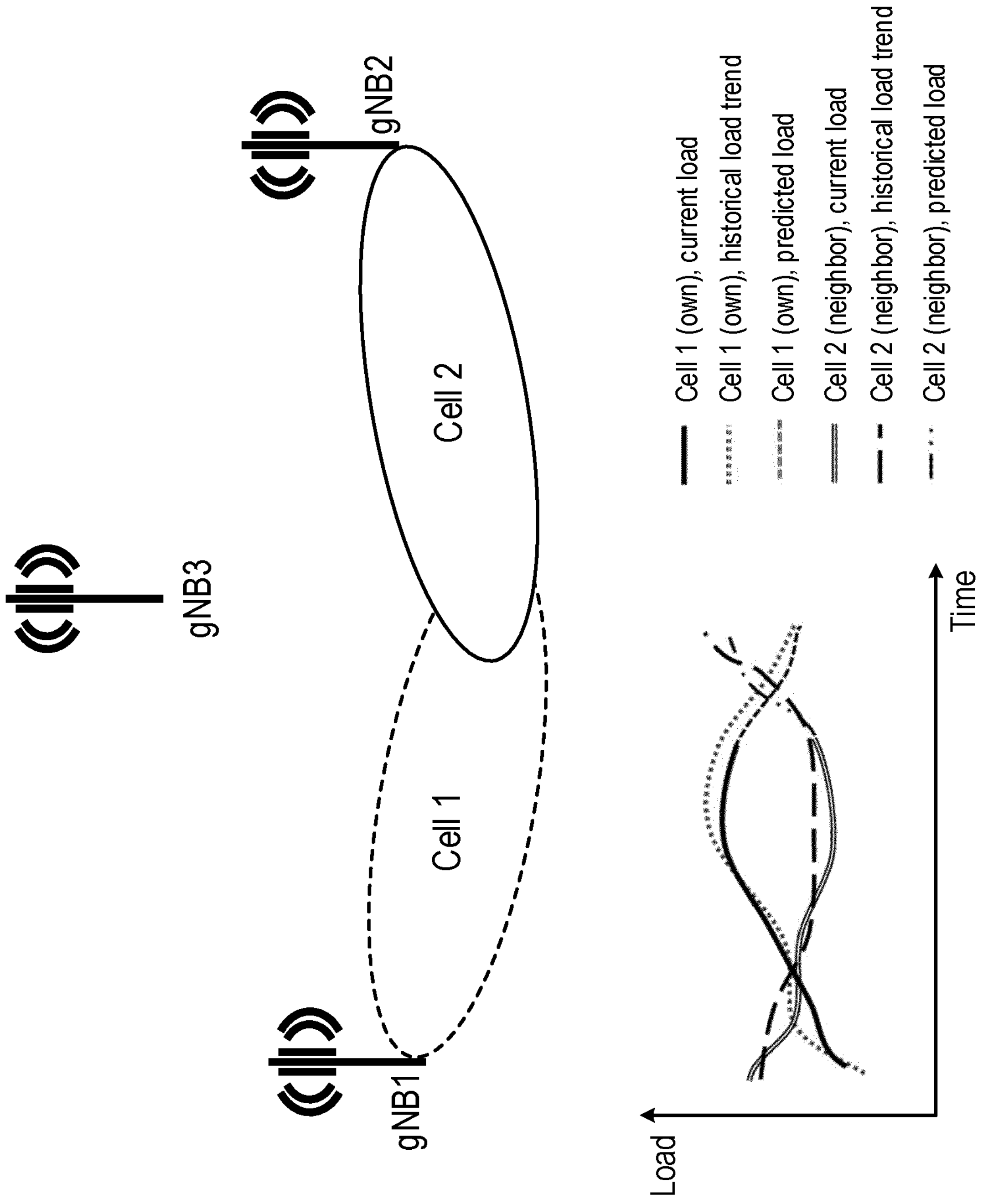
FIG. 10 shows an example scenario illustrating aspects of the present disclosure.

An example scenario illustrating aspects of the present disclosure is shown in FIG. 10. A first node gNB1 keeps track of the load in cell 1 (including for example historical trends and most recent data), and receives load information concerning cell 2 controlled by a second node gNB2. A similar process is performed in gNB2. The predicted load information is exchanged between gNB1 and gNB2. Cell 1 data appears as the substantially upper lines in the graph, with cell 2 data appearing as substantially lower lines. Each cell can use the predicted information regarding resource status in the neighboring cell to optimize resource usage, through optimization algorithms and/or configuring RAN operations to take account of the predicted usage information.

Example Implementations of Methods According to the Present Disclosure

An example of implementation is provided below for XnAP, the sections highlighted in italic bold relate specifically to the present disclosure.

9.1.3.21 Resource Status Update

This message is sent by NG-RAN node$_2$ to NG-RAN nodes to report the results of requested measurements.

Direction: NG-RAN node$_2$ to NG-RAN node$_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN node$_1$ | YES | reject |
| NG-RAN node2 Measurement ID | M | | INTEGER (1 . . . 4095, . . . ) | Allocated by NG-RAN node$_2$ | YES | reject |
| Cell Measurement Result | | 1 | | | YES | ignore |
| >Cell Measurement Result Item | | 1 . . . <maxnoofCellsinNG-RANnode> | | | YES | ignore |

-continued

| IE/Group Name | Presence | Range | IE type and reference | Semantics description | Criticality | Assigned Criticality |
|---|---|---|---|---|---|---|
| >>Cell ID | M | | Global NG-RAN Cell Identity 9.2.2.27 | | | |
| >>Radio Resource Status | O | | 9.2.2.50 | | | |
| >>TNL Capacity Indicator | O | | 9.2.2.49 | | | |
| >>Composite Available Capacity Group | O | | 9.2.2.51 | | | |
| >>Slice Available Capacity | O | | 9.2.2.55 | | | |
| >>Number of Active UEs | O | | 9.2.2.62 | | — | |
| >> RRC Connections | O | | 9.2.2.56 | | | |
| >> Predicted Resource Status | O | 0 . . . 1 | 9.2.2.x1 | | YES | ignore |

| Range bound | Explanation |
|---|---|
| maxnoofCellsinNG-RANnode | Maximum no. cells that can be served by a NG-RAN node. Value is 16384. |

9.2.2.x1 Predicted Resource Status

The Predicted Resource Status IE indicates predicted future usage of cell resource status in Uplink and Downlink and respective uncertainties.

| IE/Group Name | Presence | Range | IE Type and Reference | Semantics Description |
|---|---|---|---|---|
| Prediction time window | M | | ENUMERATED (100 ms, 200, 500 ms, 1 s, 2 s, 5 s, 10 s, 20 s, 30 s, 40 s, 50 s, 1 m, 2 m, 5 m, 10 m, 20 m, 30 m, 40 m, 50 m, 1 h, . . . ) | |
| Predicted uncertainty | M | | INTEGER (0 . . . 100) | |
| Radio Resource Status | O | | 9.2.2.50 | |
| TNL Capacity Indicator | O | | 9.2.2.49 | |
| Composite Available Capacity Group | O | | 9.2.2.51 | |
| Slice Available Capacity | O | | 9.2.2.55 | |
| Number of Active UEs | O | | 9.2.2.62 | |
| RRC Connections | O | | 9.2.2.56 | |
| QoE score | O | | ENUMERATED (very poor, poor, medium, good, very good) | |

In another example, the node receiving the resource utilization prediction can use it to derive the best link adaptation policy to adopt. For example, the node can derive from the received resource utilization prediction which modulation and coding scheme to adopt for a UE served by the node. The selection of a modulation and coding scheme can be made in light of the predicted resource utilization received, and therefore the predicted interference generated by neighboring radio coverage layers on the radio channels supported by the receiving node and the UEs.

Feedback Information Amongst Network Nodes

According to some examples of the present disclosure, explicit or implicit feedback may be provided by a node receiving predicted resource status information, the feedback concerning the accuracy or confidence of the prediction. Provision of such feedback is illustrated in FIGS. 11*a* and 11*b*, which show a summary of steps which may be performed in example methods proposed herein, including feedback requested by the first RAN node. The second RAN is shown as performing measurements associated to the request for feedback and providing the feedback to the first RAN node. The second RAN node may also use the measurements.

Referring to FIGS. 11*a* and 11*b*, when the first node sends the predicted resource status information to the second node, the first node may further include a request for feedback information related to the prediction accuracy of the predictions. This request may alternatively be sent separately to the predicted information. If the request is accepted, the second node performs measurements that are associated to the request for feedback. For example, the measurements may include measurements of resources controlled by the first node that are the subject of the predictions, and or other resources allowing an estimation of prediction accuracy to be generated. The second RAN node may then compare measurement results to the received predictions from the first RAN node in order to generate feedback, and may additionally make use of the measurements for configuration or other purposes.

Short Feedback

In some examples, the feedback information may be a ‘1-bit flag’ per predicted value of a measurement quantity in the second network node. An example is shown below wherein the parts in *bold italic* relate specifically to the present disclosure, and the Information Elements in *bold italic underlined* relate specifically to the present disclosure and explain the requested feedback from the first network node to the second network node for the predicted values, such as KPIs. It will be appreciated that the size of the bit string is dependent on the number of predicted values provided and could be changed based on the number of predictions included in the predicted resource status information.

9.2.2.x1 Predicted Resource Status

The Predicted Resource Status IE indicates predicted future usage of cell resource status in Uplink and Downlink and respective uncertainties.

| *IE/Group Name* | *Presence* | *Range* | *IE Type and Reference* | **Semantics Description** |
|---|---|---|---|---|
| Prediction time window | ***M*** | | ***ENUMERATED (100 ms, 200, 500 ms, 1 s, 2 s, 5 s, 10 s, 20 s, 30 s, 40 s, 50 s, 1 m, 2 m, 5 m, 10 m, 20 m, 30 m, 40 m, 50 m, 1 h, . . . )*** | |
| ***Predicted uncertainty*** | ***M*** | | ***INTEGER (0 . . . 100)*** | |
| ***Radio Resource Status*** | ***O*** | | ***9.2.2.50*** | |
| ***TNL Capacity Indicator*** | ***O*** | | ***9.2.2.49*** | |
| ***Composite Available Capacity Group*** | ***O*** | | ***9.2.2.51*** | |
| ***Slice Available Capacity*** | ***O*** | | ***9.2.2.55*** | |
| ***Number of Active UEs*** | ***O*** | | ***9.2.2.62*** | |
| ***RRC Connections*** | ***O*** | | ***9.2.2.56*** | |
| ***QoE score*** | ***O*** | | ***ENUMERATED (very poor, poor, medium, good, very good)*** | |
| ***RequestedShortFeedback*** | ***O*** | | ***BIT STRING (SIZE (7))*** | ***Each bit indicates the request for feedback for each of the above listed IEs that are part of Predicted Resource Status*** |

As an example, the first network node could include (1100001) as the bit sting for requested feedback, which indicates to the second network node that the second network node shall send feedback about whether the predictions were within the said range (1—YES) or not (0—NO) for:

radio network status,

TNL capacity indicator and

QoE score.

In response to this feedback request, the second network node sends the following response message.

Example #1 to implement reporting of short feedback, using new XnAP message 9.1.3.xx Resource Status Feedback This message is sent by NG-RAN $node_2$ to NG-RAN $node_1$ to report the results of the requested prediction related feedback.

Direction: NG-RAN $node_2$→NG-RAN $node_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN $node_1$ | YES | reject |
| NG-RAN node2 Measurement ID | M | | INTEGER (1 . . . 4095, . . . ) | Allocated by NG-RAN $node_2$ | YES | reject |
| Cell Measurement Result | | 1 | | | YES | ignore |
| >Cell Measurement Result Item | | 1 . . . <maxnoofCellsinNG-RANnode> | | | YES | ignore |
| >> Predicted Resource related feedback | O | | BIT STRING SIZE (7) | | YES | ignore |

In some examples, the feedback may be implicit, for example a lack of explicit feedback from the second node may be interpreted as an acknowledgement that the prediction was correct (i.e., the prediction was within an acceptable range).

Example #2 to implement reporting of short feedback, using existing XnAP message 9.1.3.21 Resource Status Update This message is sent by NG-RAN node$_2$ to NG-RAN node$_1$ to report the results of the requested measurements.

Direction: NG-RAN node$_2$ to NG-RAN node$_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN node$_1$ | YES | reject |
| NG-RAN node2 Measurement ID | M | | INTEGER (1 . . . 4095, . . . ) | Allocated by NG-RAN node$_2$ | YES | reject |
| **Cell Measurement Result** | | 1 | | | YES | ignore |
| **>Cell Measurement Result Item** | | 1 . . . < maxnoofCellsinNG-RANnode > | | | YES | ignore |
| >>Cell ID | M | | Global NG-RAN Cell Identity 9.2.2.27 | | | |
| >>Radio Resource Status | O | | 9.2.2.50 | | | |
| >>TNL Capacity Indicator | O | | 9.2.2.49 | | | |
| >>Composite Available Capacity Group | O | | 9.2.2.51 | | | |
| >>Slice Available Capacity | O | | 9.2.2.55 | | | |
| >>Number of Active UEs | O | | 9.2.2.62 | | — | |
| >> RRC Connections | O | | 9.2.2.56 | | | |
| ***>> Predicted Resource related feedback*** | ***O*** | | ***BIT STRING SIZE (7))*** | | ***YES*** | ***ignore*** |

Detailed Feedback

In some other examples, the feedback information may comprise the actual measurements as performed by the second node based on the predictions. An example is shown below in which the parts in *bold italic* relate specifically to the present disclosure, and the Information Elements in *bold italic underlined* relate specifically to the present disclosure and explain the feedback request and the corresponding feedback procedure.

9.2.2.x1 Predicted Resource Status

The Predicted Resource Status IE indicates predicted future usage of cell resource status in Uplink and Downlink and respective uncertainties.

| ***IE/Group Name*** | ***Presence*** | ***Range*** | ***IE Type and Reference*** | ***Semantics Description*** |
|---|---|---|---|---|
| ***Prediction time window*** | ***M*** | | ***ENUMERATED (100 ms, 200, 500 ms, 1 s, 2 s, 5 s, 10 s, 20 s, 30 s, 40 s, 50 s, 1 m, 2 m, 5 m, 10 m, 20 m, 30 m, 40 m, 50 m, 1 h, . . . )*** | |
| ***Predicted uncertainty*** | ***M*** | | ***INTEGER (0 . . . 100)*** | |
| ***Radio Resource Status*** | ***O*** | | ***9.2.2.50*** | |
| ***TNL Capacity Indicator*** | ***O*** | | ***9.2.2.49*** | |
| ***Composite Available Capacity Group*** | ***O*** | | ***9.2.2.51*** | |
| ***Slice Available Capacity*** | ***O*** | | ***9.2.2.55*** | |
| ***Number of Active UEs*** | ***O*** | | ***9.2.2.62*** | |
| ***RRC Connections*** | ***O*** | | ***9.2.2.56*** | |
| ***QoE score*** | ***O*** | | ***ENUMERATED (very poor, poor, medium, good, very good)*** | |

-continued

| IE/Group Name | Presence | Range | IE Type and Reference | Semantics Description |
|---|---|---|---|---|
| RequestedDetailedtFeedback | O | | BIT STRING (SIZE (7)) | Each bit indicates the request for feedback for each of the above listed IEs that are part of Predicted Resource Status |

As an example, the first network node could include (1100001) as the bit sting for feedback, which indicates to the second network node that the second network node shall send the feedback about the whether the predictions were within the said range (1—YES) or not (0—NO) for:

radio network status,

TNL capacity indicator and

QoE score.

Associated to this feedback request, the second network node sends the following response message.

Example #1 to implement reporting of detailed feedback, using new XnAP message 9.1.3.xx Resource Status Feedback This message is sent by NG-RAN $node_2$ to NG-RAN $node_1$ to report the results of the requested prediction related feedback.

Direction: NG-RAN $node_2$ to NG-RAN $node_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN $node_1$ | YES | reject |
| NG-RAN node2 Measurement ID | M | | INTEGER (1 . . . 4095, . . . ) | Allocated by NG-RAN $node_2$ | YES | reject |
| Cell Measurement Result | | 1 | | | YES | ignore |
| >Cell Measurement Result Item | | 1 . . . <maxnoofCellsinNG-RANnode> | | | YES | ignore |
| >> Measured Radio Resource status feedback | O | | 9.2.2.50 | | YES | ignore |
| >> Measured TNL capacity feedback | O | | 9.2.2.49 | | YES | ignore |
| >> QoE score feedback | O | | ENUMERATED (very poor, poor, medium, good, very good) | | YES | ignore |

In some examples, the feedback may be implicit, for example a lack of explicit feedback from the second node may be interpreted as an acknowledgement that the prediction was correct (i.e., the prediction was within an acceptable range). The second network node may therefore in some examples only include the detailed feedback information if the measured values are outside the range of the predicted value.

Example #2 to implement reporting of detailed feedback, using existing XnAP message 9.1.3.21 Resource Status Update This message is sent by NG-RAN $node_2$ to NG-RAN nodes to report the results of the requested measurements.

Direction: NG-RAN $node_2$→NG-RAN $node_1$.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . . ) | Allocated by NG-RAN node$_1$ | YES | reject |
| NG-RAN node2 Measurement ID | M | | INTEGER (1 . . . 4095, . . . ) | Allocated by NG-RAN node$_2$ | YES | reject |
| **Cell Measurement Result** | | 1 | | | YES | ignore |
| **>Cell Measurement Result Item** | | 1 . . . <maxnoofCellsinNG-RANnode> | | | YES | ignore |
| >>Cell ID | M | | Global NG-RAN Cell Identity 9.2.2.27 | | | |
| >>Radio Resource Status | O | | 9.2.2.50 | | | |
| >>TNL Capacity Indicator | O | | 9.2.2.49 | | | |
| >>Composite Available Capacity Group | O | | 9.2.2.51 | | | |
| >>Slice Available Capacity | O | | 9.2.2.55 | | | |
| >>Number of Active UEs | O | | 9.2.2.62 | | — | |
| >> RRC Connections | O | | 9.2.2.56 | | | |
| ***>> Measured Radio Resource status feedback*** | ***O*** | | ***9.2.2.50*** | | ***YES*** | ***ignore*** |
| ***>> Measured TNL capacity feedback*** | ***O*** | | ***9.2.2.49*** | | ***YES*** | ***ignore*** |
| ***>> QoE score feedback*** | ***O*** | | ***ENUMERATED (very poor, poor, medium, good, very good)*** | | ***YES*** | ***ignore*** |

Figure 12:
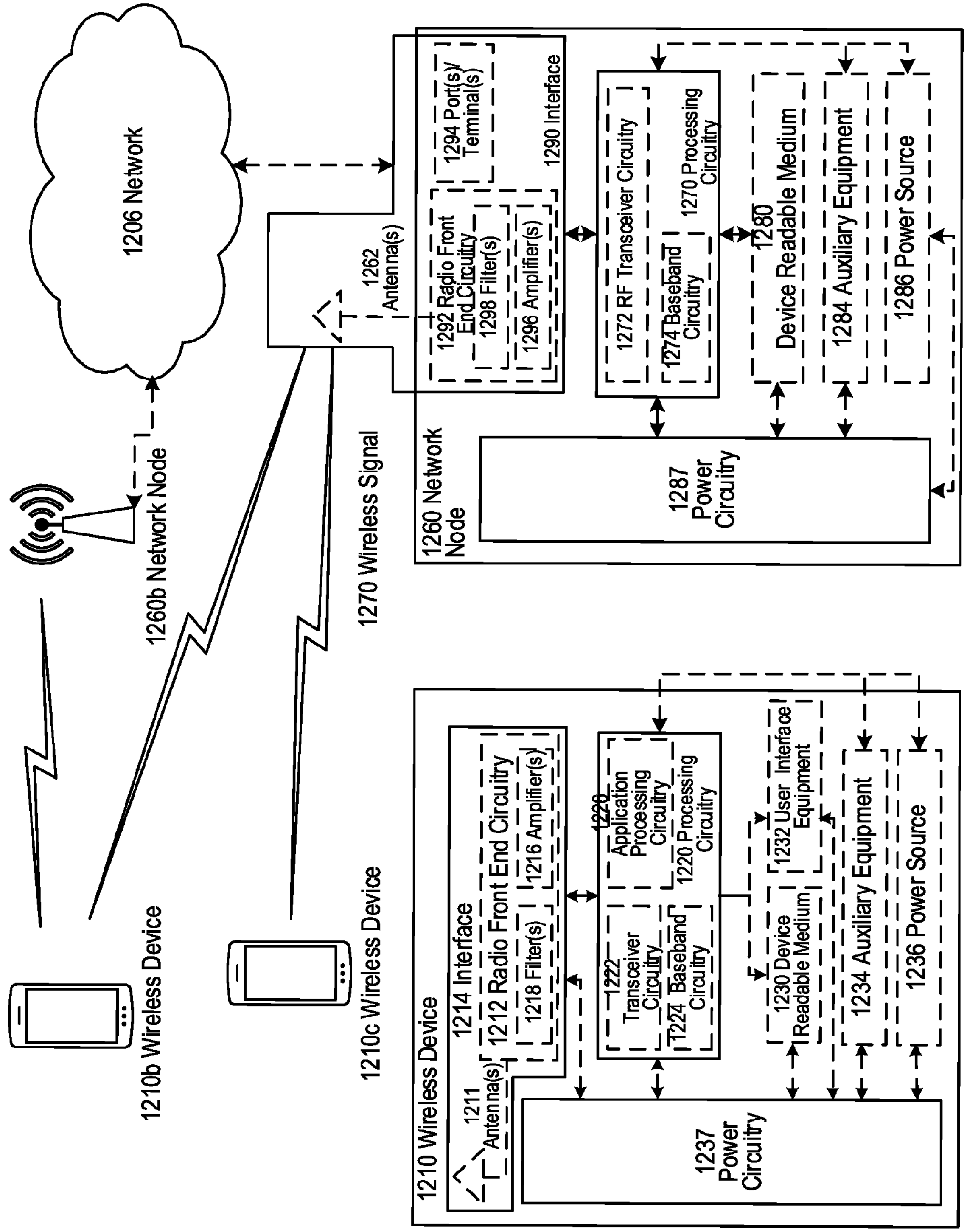
FIG. 12 illustrates a wireless network in accordance with some examples.

FIG. 12 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
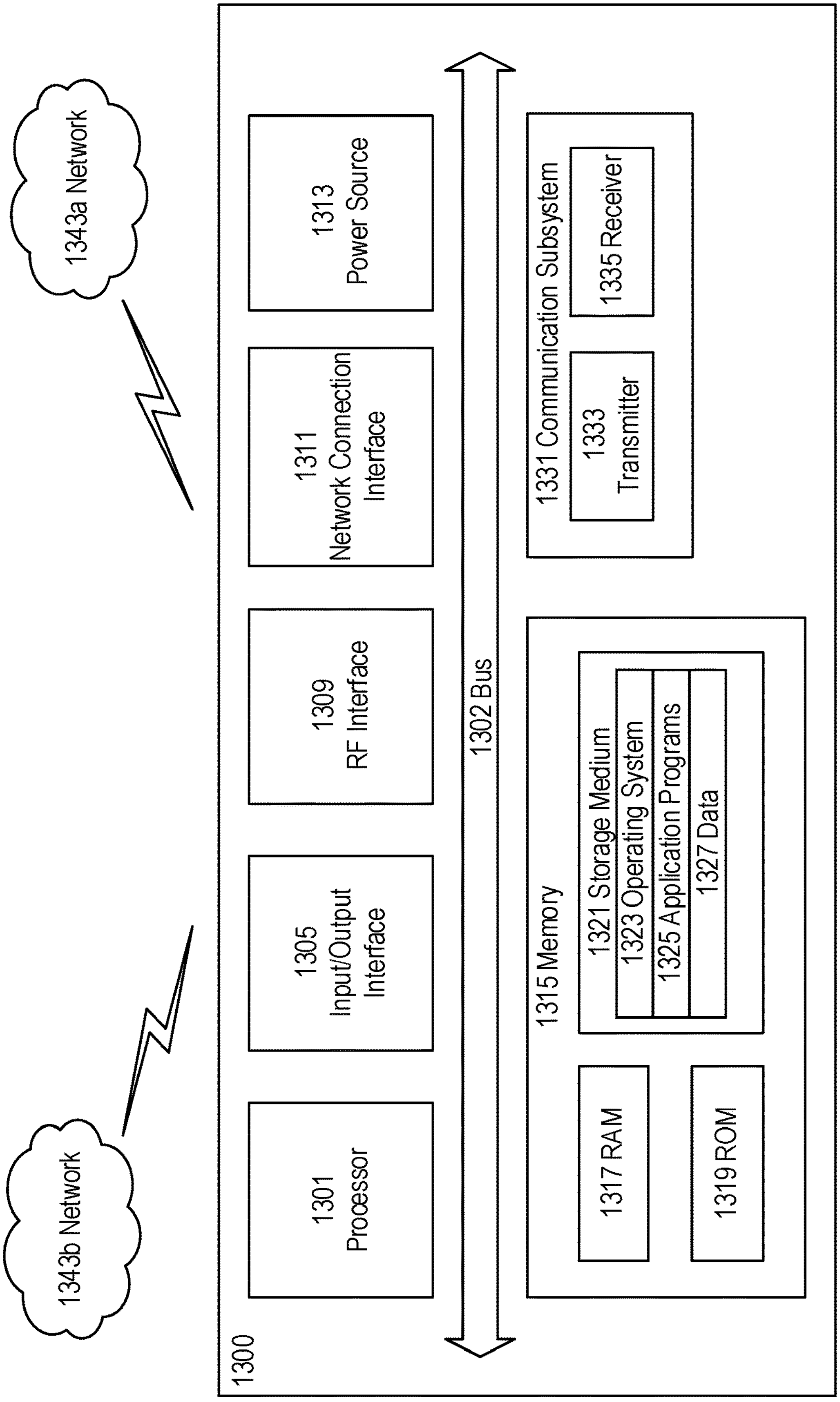
FIG. 13 illustrates a User Equipment in accordance with some examples.

FIG. 13 illustrates a User Equipment in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1300 may be any UE identified by the 3 rd Generation Partnership Project (3GPP), including a NB-loT UE, a machine type communication (MTC) UE, and/or an enhanced MTC (eMTC) UE. UE 1300, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
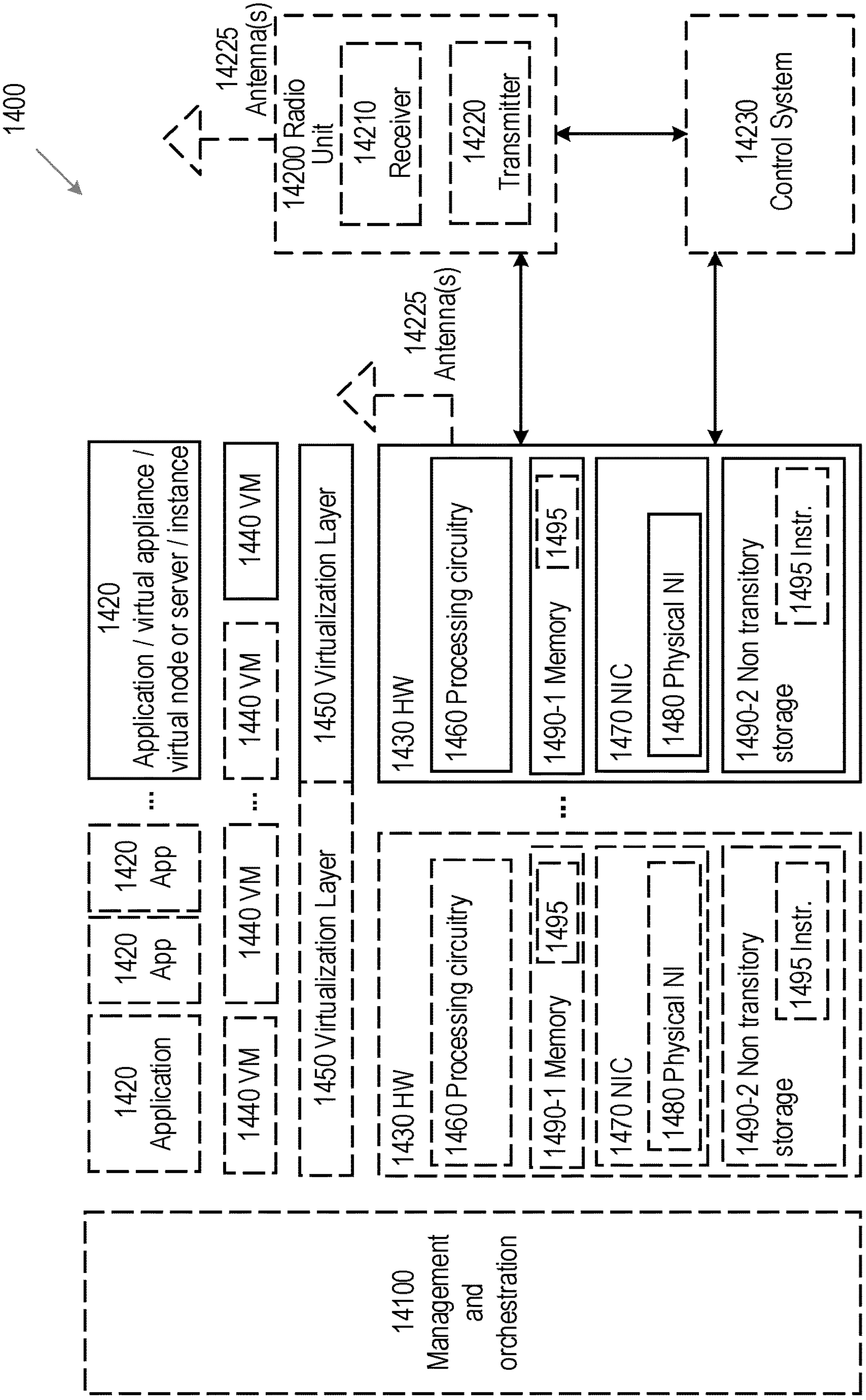
FIG. 14 illustrates a virtualization environment in accordance with some examples.

FIG. 14 illustrates a Virtualization environment in accordance with some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
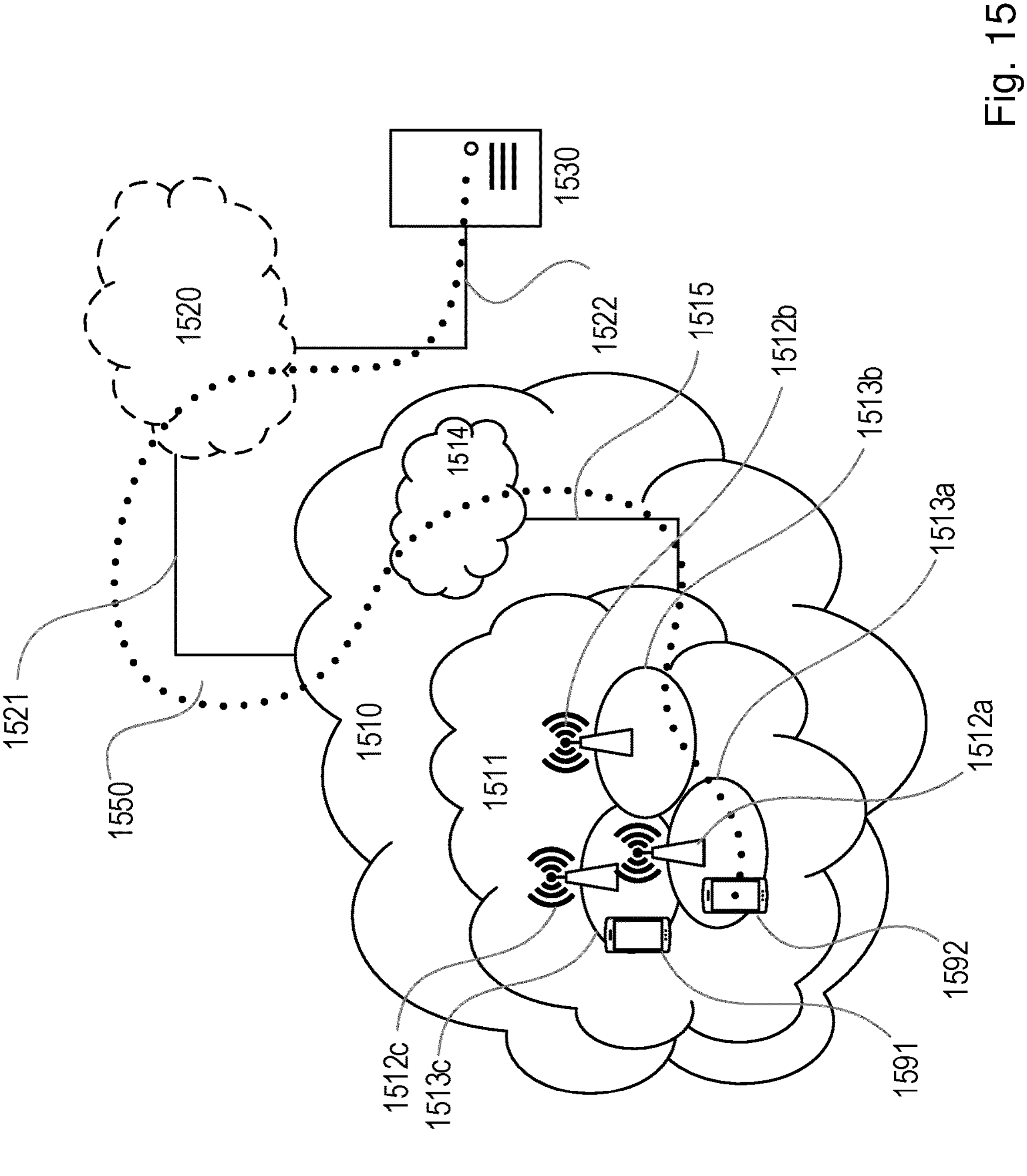
FIG. 15 illustrates a telecommunication network connected via an intermediate network to a host computer in accordance with some examples.

FIG. 15 illustrates a telecommunication network connected via an intermediate network to a host computer in accordance with some embodiments.

With reference To FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* is configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
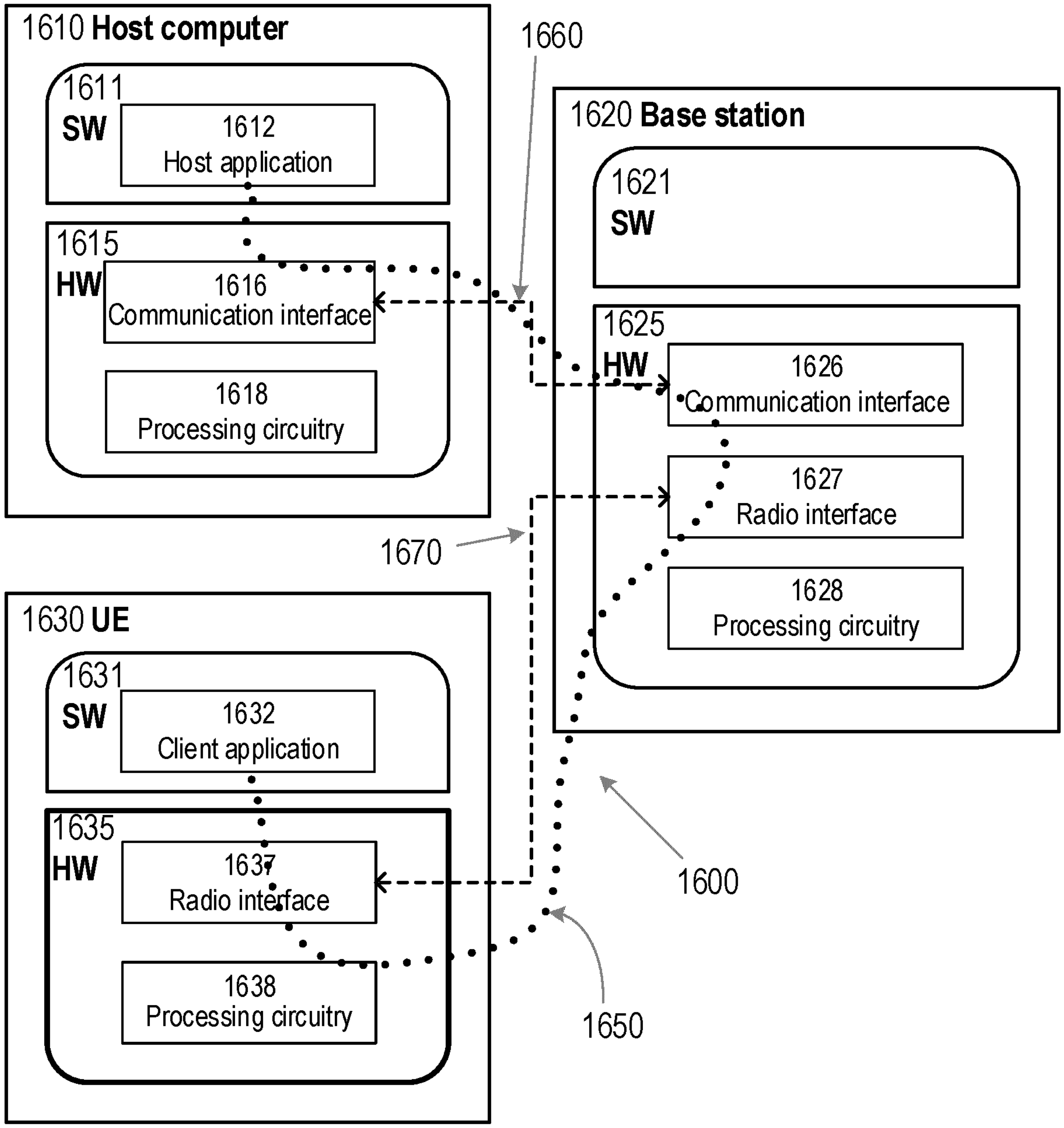
FIG. 16 illustrates a host computer communicating via a base station with a user equipment over a partially wireless connection in accordance with some examples.

FIG. 16 illustrates a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512*a*, 1512*b*, 1512*c* and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the traffic and resource management in the radio access network and thereby provide benefits such as reduced user waiting time, relaxed restriction on file sizes, better responsiveness, improved user experience, etc.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
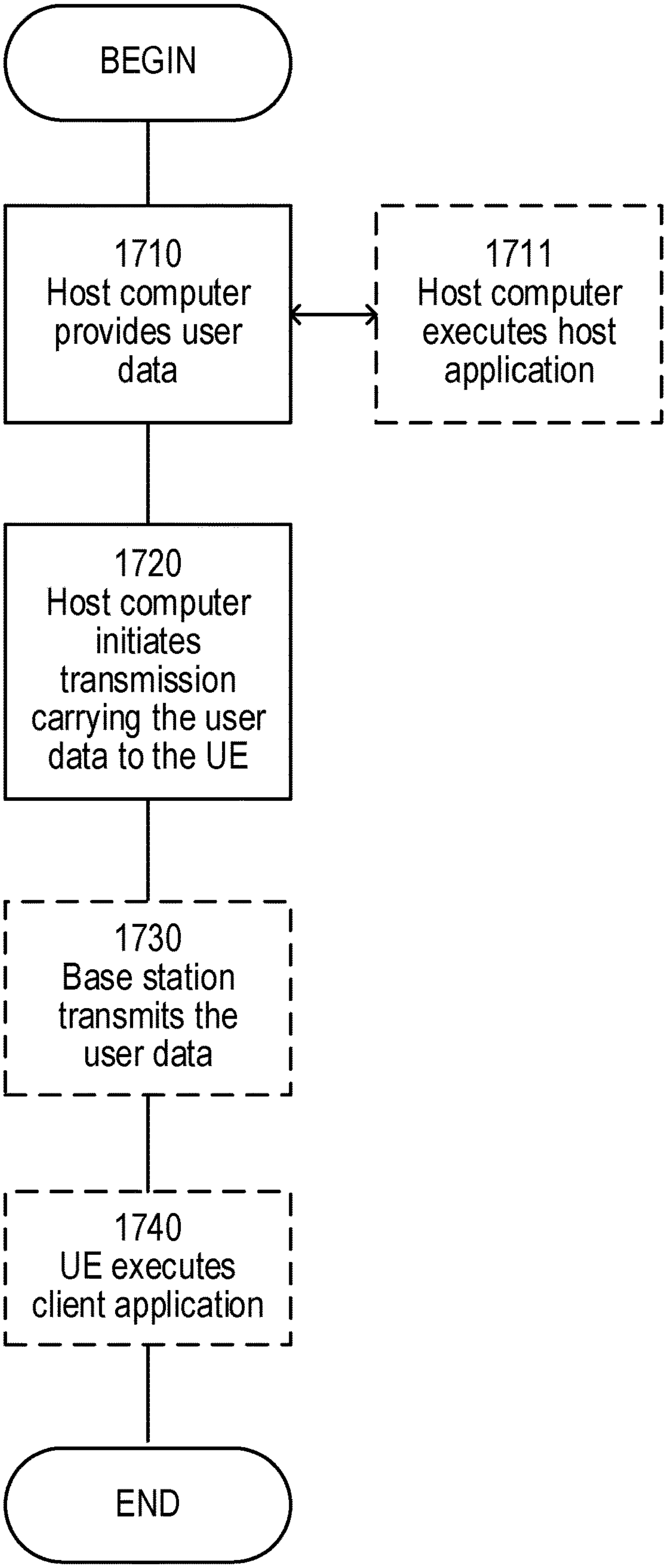
FIG. 17 illustrates methods implemented in a communication system including a host computer, a base station and a user equipment in accordance with some examples.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
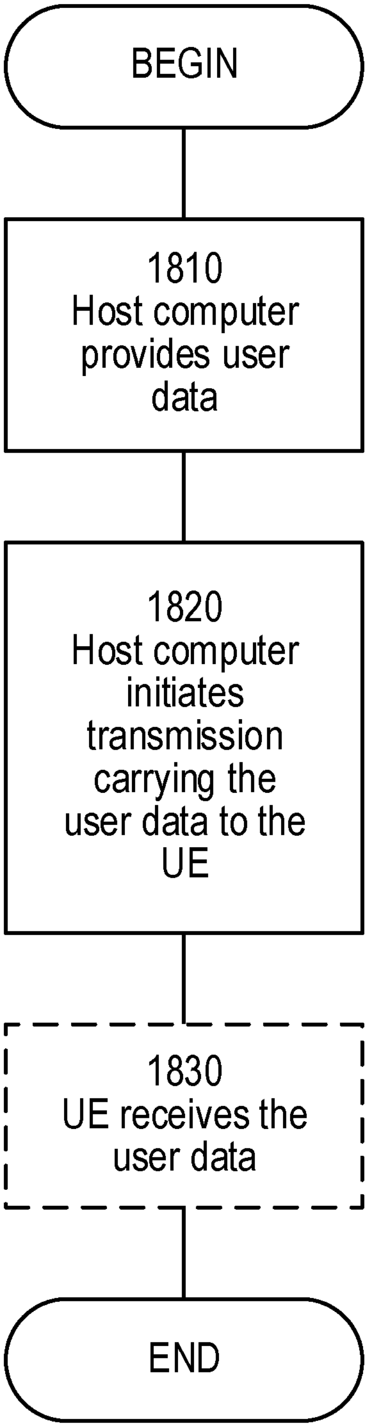
FIG. 18 illustrates methods implemented in a communication system including a host computer, a base station and a user equipment in accordance with some examples.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
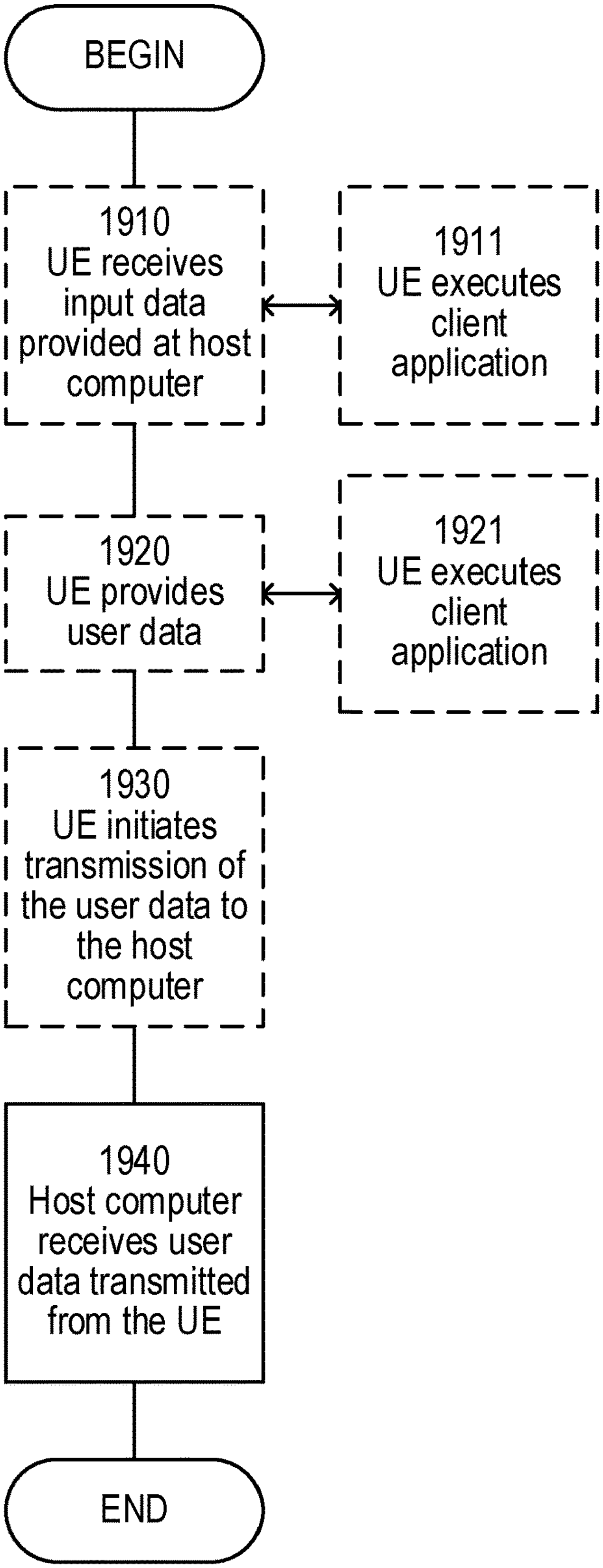
FIG. 19 illustrates methods implemented in a communication system including a host computer, a base station and a user equipment in accordance with some examples.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
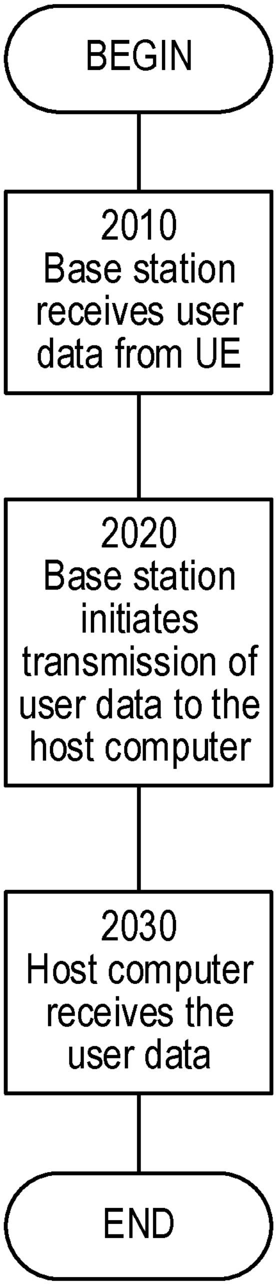
FIG. 20 illustrates methods implemented in a communication system including a host computer, a base station and a user equipment in accordance with some examples.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 21:
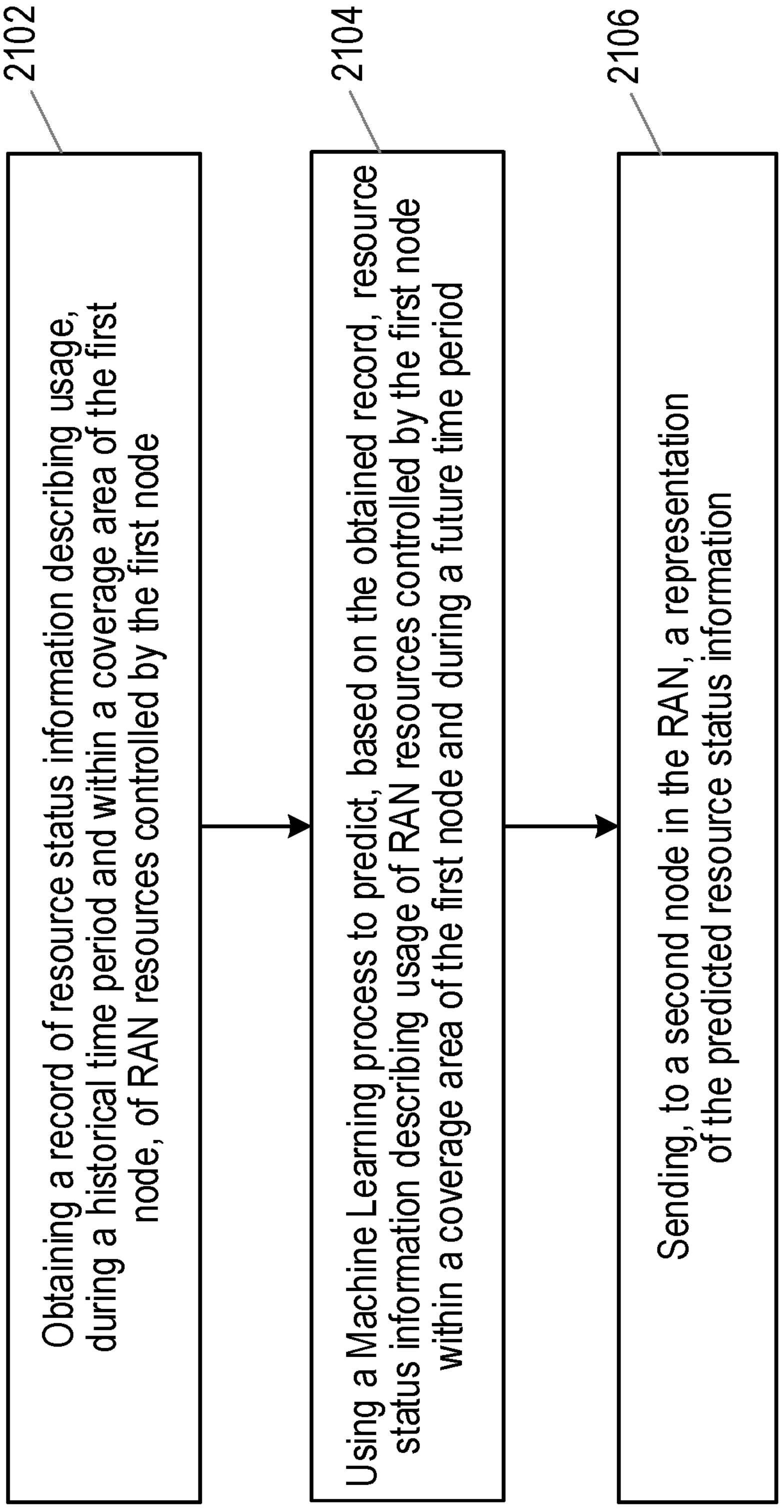
FIG. 21 illustrates a method in accordance with some embodiments.

FIG. 21 illustrates a method in accordance with some embodiments.

FIG. 21 depicts a computer implemented method in accordance with particular embodiments. The method is for managing resources in a Radio Access Network (RAN) of a communication network. The method, performed by a first node in the RAN, comprises, in step 2102, obtaining a record of resource status information describing usage, during a historical time period and within a coverage area of the first node, of RAN resources controlled by the first node. The method further comprises, in step 2104, using a Machine Learning (ML) process to predict, based on the obtained record, resource status information describing usage of RAN resources controlled by the first node within a coverage area of the first node and during a future time period. The method further comprises, in step 2106, sending, to a second node in the RAN, a representation of the predicted resource status information.

The first and second nodes in the RAN, also referred to herein as RAN nodes, each comprise a node that is operable to transmit, receive, process and/or orchestrate wireless signals. A RAN node may comprise a physical node and/or a virtualized network function. The term RAN node may therefore refer to Long Term Evolution (LTE) or New Radio (NR) technology and may be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, or any future implementation of the above discussed functionality.

For the purposes of the present disclosure, the term RAN resources refers to any resources available to the RAN network, and under the control of one or more nodes of the RAN network. Such resources may include radio spectrum resources radio spectrum resources, examples of which include PRBs in downlink and uplink, PDCCH CCEs for downlink and uplink and other examples, such as are reported in TS38.423 for the IE Radio Resource Status. A coverage area of a RAN node refers to the geographical and/or radio area over which the RAN node provides access to the communication network. A historical time period comprises a time period that is in the past with respect to performance of the method, that is a time period that elapses at any time before a time instant at which a current iteration of the method is performed. A future time period is a time period that is in the future with respect to performance of the method, that is a time period that elapses at any time after a time instant at which a current iteration of the method is performed.

Also for the purposes of the present disclosure, resource status information may comprise any parameter operable to describe usage of RAN resources, performance of the RAN and or communication network of which the resources are a component part, performance of network services and/or applications provided over the RAN resources, and/or available capacity relation to the RAN resources. Specific examples of parameters that may be included in resource status information are discussed above with reference to example method steps performed by a first node, and below.

According to examples of the present disclosure, resource status information describing usage of RAN resources controlled by the first node may comprise at least one of the metrics:

a. number of active wireless devices served by the first node;
b. Quality of Experience measure, including for example a QoE metric and/or a QoE score;
c. Quality of Service measure;
d. established Radio Resource Control, RRC, Connections;
e. available RRC Connection capacity;
f. number of inactive UE contexts for wireless devices stored by the first node;
g. available Transport Network Layer resources;
h. Composite Available Capacity, in uplink and/or downlink;
i. Slice Available Capacity, in uplink and/or downlink;
j. Traffic for each served wireless device;
k. size of data arrival in uplink or downlink for a wireless device within a time period;
l. resource use in a part of the coverage area of the first node that is adjacent a coverage area of another node; and/or
m. transmission power used per resource block in uplink and/or downlink.

Predicted resource status information describing predicted usage of RAN resources controlled by the first node may comprise at least one of:

n. any one of the metrics listed above;
o. a time window for which the predicted resource status information is valid; and/or p. a confidence interval for the predicted resource status information.

According to further examples of the present disclosure, resource status information and predicted resource status information may be assembled according to at least one of the criteria:

a. per uplink/downlink;
b. per cell;
c. per Data Radio Bearer;
d. per 5G Quality of Service Indicator;
e. per Quality of Service Class Indicator;
f. per intra cell coverage area;
g. per network slice;
h. maximum, minimum, mean, average, median;
i. per sharing PLMN.

According to examples of the present disclosure, obtaining a record of resource status information describing usage, during a historical time period and within a coverage area of the first node, of RAN resources controlled by the first node may comprise measuring usage of RAN resources controlled by the first node during the historical time period.

According to examples of the present disclosure, the method may further comprise receiving, from the second node, resource status information describing usage, during a historical time period and within a coverage area of the second node, of RAN resources controlled by the second node.

It will be appreciated that the historical time periods covered by the resource status information received in the present method step, and obtained in step 2102 of the method, may at least partially overlap. In other examples, the time periods may be substantially consecutive, and/or may not overlap. This also applies to other groups of historical and future time periods covered by historical and predicted resource status information generated by different RAN nodes. For example a future time period covered by predicted resource status information generated by the first RAN node may or may not at least partially overlap with a future time period covered by predicted resource status information generated and provided by the second RAN node.

According to examples of the present disclosure, the method may further comprise receiving, from the second node, predicted resource status information describing usage, during a future time period and within a coverage area of the second node, of RAN resources controlled by the second node.

According to examples of the present disclosure, the method may further comprise obtaining previously predicted resource status information describing usage, during a future or historical time period and within a coverage area of the first node, of RAN resources controlled by the first node.

According to examples of the present disclosure, using an ML process to predict, based on the obtained record, resource status information describing usage of RAN resources controlled by the first node within a coverage area of the first node and during a future time period may comprise using the ML process to predict resource status information describing usage of RAN resources controlled by the first node within a coverage area of the first node and during a future time period based on the obtained record and on at least one of:

i. received resource status information describing usage, during a historical time period and within a coverage area of the second node, of RAN resources controlled by the second node;
ii. received predicted resource status information describing usage, during a future time period and within a coverage area of the second node, of RAN resources controlled by the second node;
iii. obtained previously predicted resource status information describing usage, during a future or historical time period and within a coverage area of the first node, of RAN resources controlled by the first node.

According to examples of the present disclosure, the method may further comprise negotiating, with the second node, sending of a representation of predicted resource status information describing usage of RAN resources controlled by the first node within a coverage area of the first node and during a future time period.

Negotiating, with the second node, sending a representation of predicted resource status information may comprise at least one of:

a. sending to the second node an authorization request for the second node to receive a representation of predicted resource status information for RAN resources controlled by the first node, and receiving from the second node a response to the request, wherein the response indicates that the second node either will or will not accept the representation of predicted resource status information; or
b. receiving from the second node a request to receive a representation of predicted resource status information for RAN resources controlled by the second node, and sending to the second node a response to the request, wherein the response either confirms that the first node can receive the representation of predicted resource status information or indicates that the first node will not accept the representation of predicted resource status information.

Either one or both of requesting to send predicted resource status information or requesting provision of predicted resource status information may be triggered by related action within the requesting node, such as for example a start or change in traffic to/from a served UE, and/or an event in relation to a RAN operation performed by in relation to the node, and/or an event in relation to a previously provided prediction, such as prediction uncertainty rising above a threshold or a predicted value changing by more than a threshold amount. According to examples of the present disclosure, the second node may set reporting granularity during negotiation of provision of predicted resource status information. For example, the second node may request periodic updates to predicted resource status information, or may set thresholds for uncertainty and/or one or more individual predicted values, on the basis of which updated predictions should be provided. This granularity may be set for example in a request for provision of predicted resource status information or in a response to a request to provide predicted resource status information. If reporting granularity is set during the negotiation then, in subsequent iterations of the method, the step 2106 of sending the predicted resource status information may be dependent upon a condition set for reporting being fulfilled, such as a reporting time period expiring, or uncertainty or a predicted value or a change in a predicted value exceeding a certain threshold.

According to examples of the present disclosure, using an ML process to predict, based on the obtained record, resource status information describing usage of RAN resources controlled by the first node within a coverage area of the first node and during a future time period may comprise using at least one of an Autoregressive model, a Recurrent Neural Network, or a Long Short-Term Memory process to predict the resource status information.

According to examples of the present disclosure, the second node may be a neighbor of the first node, such that a signaling connection is established between the first node and second node.

According to examples of the present disclosure, the method may further comprise sending a request to the second node to provide feedback on the predicted resource status information. Such feedback may for example include information about the accuracy, usefulness, and/or confidence interval of the predictions.

According to examples of the present disclosure, the method may further comprise receiving from the second node an explicit or implicit feedback on the predicted resource status information. Such feedback may for example include information about the accuracy, usefulness, and/or confidence interval of the predictions.

According to examples of the present disclosure, the method may further comprise generating feedback on the predicted resource status information by i. obtaining a record of resource status information describing usage, during the future time period and within a coverage area of the first node, of RAN resources controlled by the first node; and
ii. comparing the obtained record of resource status information to the predicted resource status information.

Such feedback may for example include information about the accuracy, usefulness, and/or confidence interval of the predictions.

According to examples of the present disclosure, using an ML process to predict, based on the obtained record, resource status information describing usage of RAN resources controlled by the first node within a coverage area of the first node and during a future time period may comprise using the ML process to predict resource status information describing usage of RAN resources controlled by the first node within a coverage area of the first node and during a future time period based on the obtained record and on the feedback on the predicted resource status information.

According to examples of the present disclosure, the method may further comprise receiving, from the second node, a representation of predicted resource status information describing usage of RAN resources controlled by the second node within a coverage area of the second node and during a future time period, and using the received representation of predicted resource status information for RAN resources controlled by the second node in a process relating to management of RAN resources controlled by the first node.

According to examples of the present disclosure, using the received representation of predicted resource status information for RAN resources controlled by the second node in a process relating to management of RAN resources controlled by the first node may comprise inputting the received representation of predicted resource status information for RAN resources controlled by the second node to a resource optimization process.

According to examples of the present disclosure, the method may further comprise sending to the second node the obtained record of resource status information describing usage, during a historical time period and within a coverage area of the first node, of RAN resources controlled by the first node.

According to examples of the present disclosure, the method may further comprise sending, to the second node, the previously predicted resource status information describing usage, during a future or historical time period and within a coverage area of the first node, of RAN resources controlled by the first node.

According to examples of the present disclosure, the method may further comprise negotiating, with the second node, receipt of the representation of predicted resource status information describing usage of RAN resources controlled by the second node within a coverage area of the second node and during a future time period.

According to examples of the present disclosure, negotiating, with the second node, receipt of a representation of predicted resource status information may comprise at least one of:

a. receiving from the second node a request to accept a representation of predicted resource status information for RAN resources controlled by the second node, and sending to the second node a response to the request, wherein the response indicates that the first node either will or will not accept the representation of predicted resource status information; or
b. sending to the second node a request to send a representation of predicted resource status information for RAN resources controlled by the first node, and receiving from the second node a response to the request, wherein the response either confirms that the first node can provide the requested representation of predicted resource status information, or indicates that the second node will not accept the requested representation of predicted resource status information.

As discussed above, either one or both of requesting to send predicted resource status information or requesting provision of predicted resource status information may be triggered by related action within the requesting node, such as for example a start or change in traffic to/from a served UE, and/or an event in relation to a RAN operation performed by in relation to the node, and/or an event in relation to a previously provided prediction, such as prediction uncertainty rising above a threshold or a predicted value changing by more than a threshold amount. According to examples of the present disclosure, the first node may set reporting granularity during negotiation of provision of predicted resource status information. For example, the first node may request periodic updates to predicted resource status information, or may set thresholds for uncertainty and/or one or more individual predicted values, on the basis of which updated predictions should be provided. This granularity may be set for example in a request for provision of predicted resource status information or in a response to a request to provide predicted resource status information. If reporting granularity is set during the negotiation then, in subsequent iterations of the method, the step of sending the predicted resource status information may be dependent upon a condition set for reporting being fulfilled, such as a reporting time period expiring, or uncertainty or a predicted value or a change in a predicted value exceeding a certain threshold.

According to examples of the present disclosure, the method may further comprise receiving from the second node a request to provide feedback on the predicted resource status information provided by the second node. Such feedback may for example include information about the accuracy, usefulness, and/or confidence interval of the predictions.

According to examples of the present disclosure, the method may further comprise generating feedback on the predicted resource status information, and providing to the second node, explicitly or implicitly, the generated feedback on the accuracy and/or usefulness and/or confidence interval of the predicted resource status information. Such feedback may for example include information about the accuracy, usefulness, and/or confidence interval of the predictions.

According to examples of the present disclosure, the method may further comprise obtaining user data; and forwarding the user data to a host computer or a wireless device.

Figure 22:
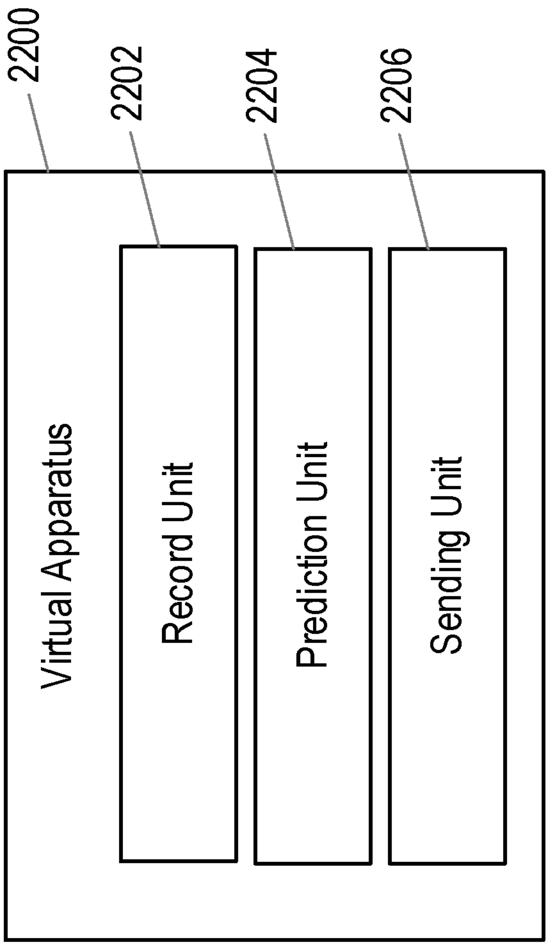
FIG. 22 shows a virtualization apparatus in accordance with some embodiments.

FIG. 22 shows a virtualization apparatus in accordance with some embodiments.

FIG. 22 illustrates a schematic block diagram of an apparatus 2200 in a wireless network (for example, the wireless network shown in FIG. 12). The apparatus may be implemented in a wireless device or network node (e.g., wireless device 1210 or network node 1260 shown in FIG. 12). Apparatus 2200 is operable to carry out the example method described with reference to FIG. 21 and possibly any other processes or methods disclosed herein. It is also to be understood that the method of FIG. 21 is not necessarily carried out solely by apparatus 2200. At least some operations of the method can be performed by one or more other entities.

Virtual Apparatus 2200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause record unit 2202, prediction unit 2204, and sending unit 2206, and any other suitable units of apparatus 2200, to perform corresponding functions according one or more embodiments of the present disclosure.

As illustrated in FIG. 22, apparatus 2200 includes record unit 2202, prediction unit 2204, and sending unit 2206. Record unit 2202 is configured to obtain a record of resource status information describing usage, during a historical time period and within a coverage area of the first node, of RAN resources controlled by the first node. Prediction unit 2204 is configured to use a Machine Learning, ML, process to predict, based on the obtained record, resource status information describing usage of RAN resources controlled by the first node within a coverage area of the first node and during a future time period. Sending unit 2206 is configured to send, to a second node in the RAN, a representation of the predicted resource status information The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
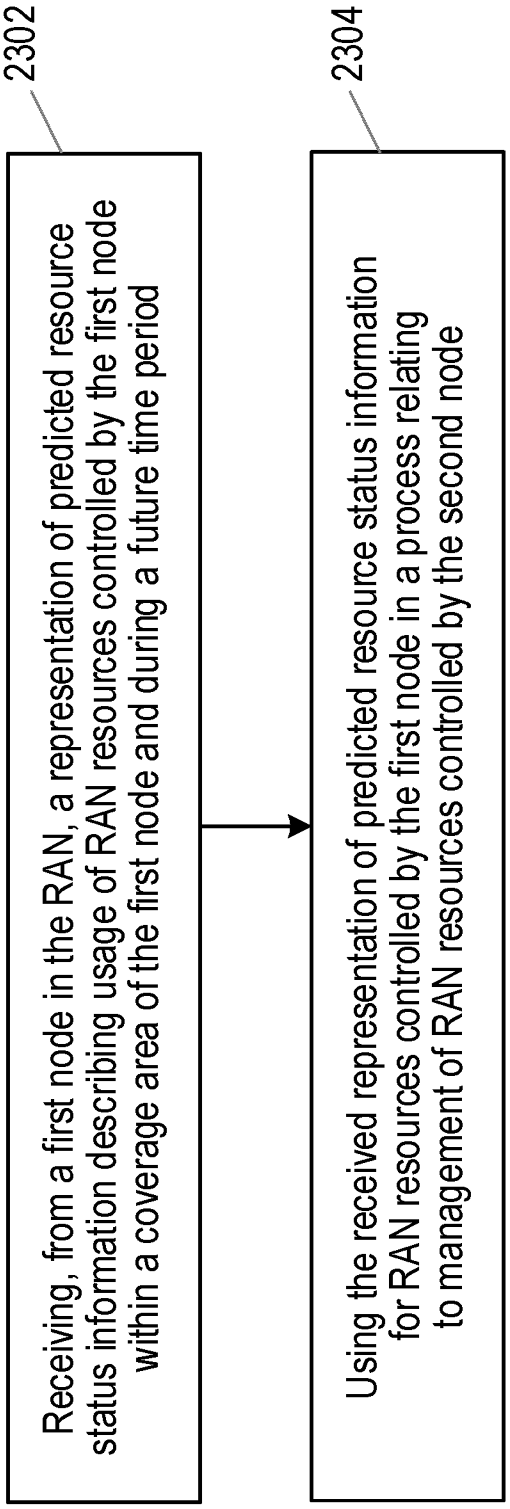
FIG. 23 shows a method in accordance with some embodiments.

FIG. 23 shows a method in accordance with some embodiments.

FIG. 23 depicts a computer implemented method for managing resources in a Radio Access Network, RAN, of a communication network in accordance with particular embodiments. The method, performed by a second node in the RAN, comprises, in a first step 2302 receiving, from a first node in the RAN, a representation of predicted resource status information describing usage of RAN resources controlled by the first node within a coverage area of the first node and during a future time period. The method further comprises, in step 2304, using the received representation of predicted resource status information for RAN resources controlled by the first node in a process relating to management of RAN resources controlled by the second node.

The first and second nodes in the RAN, also referred to herein as RAN nodes, each comprise a node that is operable to transmit, receive, process and/or orchestrate wireless signals. A RAN node may comprise a physical node and/or a virtualized network function. The term RAN node may therefore refer to Long Term Evolution (LTE) or New Radio (NR) technology and may be one of eNB, gNB, en-gNB, ng-eNB, CU-CP, CU-UP, DU, gNB-CU, gNB-DU, gNB-CU-UP, gNB-CU-CP, eNB-CU, eNB-DU, eNB-CU-UP, eNB-CU-CP, or any future implementation of the above discussed functionality.

For the purposes of the present disclosure, the term RAN resources refers to any resources available to the RAN network, and under the control of one or more nodes of the RAN network. Such resources may include radio resources. A coverage area of a RAN node refers to the geographical and/or radio area over which the RAN node provides access to the communication network. A historical time period comprises a time period that is in the past with respect to performance of the method, that is a time period that elapses at any time before a time instant at which a current iteration of the method is performed. A future time period is a time period that is in the future with respect to performance of the method, that is a time period that elapses at any time after a time instant at which a current iteration of the method is performed.

Also for the purposes of the present disclosure, resource status information may comprise any parameter operable to describe usage of RAN resources, performance of the RAN and or communication network of which the resources are a component part, performance of network services and/or applications provided over the RAN resources, and/or available capacity relation to the RAN resources. Specific examples of parameters that may be included in resource status information are discussed above with reference to example method steps performed by a first node, and below.

Also for the purposes of the present disclosure, a process relating to management of RAN resources controlled by the second node comprises any process that may be performed by the second node and is related to such management. The process may for example comprise a resource optimization process, such as load balancing. In further examples, the process may comprise a configuration and or management process for one or more RAN operations performed by the second node and or by one or more UEs served by the second node. For the purposes of the present disclosure, a RAN operation may comprise any operation that is at least partially performed by the first node in the context of connection of one or more wireless devices to the Radio Access Network. For example, a RAN operation may comprise a connection operation, a mobility operation, a reporting operation, a resource configuration operation, a synchronization operation, a traffic management operation, a scheduling operation etc. Specific examples of RAN operations may include Link Adaptation, Scheduling, mobility, Inter and intra-frequency handover, positioning, beamforming, Uplink and downlink synchronization, random access, uplink power control, wireless signal reception/transmission, TDD configurations, Traffic/load information, Radio resource management, Dual or multi-connectivity operation, RRC state handling, Inter-RAT operation, Carrier aggregation, Transmission mode selection, Energy savings operations/settings, etc.

A process relating to management of RAN resources controlled by the first node may be understood in the context of the above discussion with reference to the second node.

According to examples of the present disclosure, using the received representation of predicted resource status information for RAN resources controlled by the first node in a process relating to management of RAN resources controlled by the second node may comprise inputting the received representation of predicted resource status information for RAN resources controlled by the first node to a resource optimization process.

According to examples of the present disclosure, the predicted resource status information describing usage of RAN resources controlled by the first node may comprises at least one of the metrics:

a. number of active wireless devices served by the first node;
b. Quality of Experience measure;
c. Quality of Service measure;
d. established Radio Resource Control, RRC, Connections;
e. available RRC Connection capacity;
f. number of inactive UE contexts for wireless devices stored by the first node;
g. available Transport Network Layer resources;
h. Composite Available Capacity, in uplink and/or downlink;
i. Slice Available Capacity, in uplink and/or downlink;
j. Traffic for each served wireless device;
k. size of data arrival in uplink or downlink for a wireless device within a time period;
l. resource use in a part of the coverage area of the first node that is adjacent a coverage area of another node;
m. transmission power used per resource block in uplink and/or downlink;
n. a time window for which the predicted resource status information is valid; and/or
o. a accuracy and/or usefulness and/or confidence interval indication for the predicted resource status information.

According to examples of the present disclosure, the predicted resource status information may be assembled according to at least one of the criteria:

a. per uplink/downlink;
b. per cell;
c. per Data Radio Bearer;
d. per 5G Quality of Service Indicator;
e. per Quality of Service Class Indicator;
f. per intra cell coverage area;
g. per network slice;
h. maximum, minimum, mean, average, median;
i. per sharing PLMN.

According to examples of the present disclosure, the method may further comprise obtaining resource status information describing usage, during a historical time period and within a coverage area of the second node, of RAN resources controlled by the second node, and sending the obtained resource status information to the first node.

According to examples of the present disclosure, the method may further comprise obtaining a previously predicted resource status information describing usage, during a future time period and within a coverage area of the second node, of RAN resources controlled by the second node, and sending the obtained predicted resource status information to the first node.

According to examples of the present disclosure, the method may further comprise negotiating, with the first node, receipt of the representation of predicted resource status information describing usage of RAN resources controlled by the first node within a coverage area of the first node and during a future time period.

According to examples of the present disclosure, negotiating, with the first node, receipt of a representation of predicted resource status information may comprise at least one of:

a. receiving from the first node a request to provide a representation of predicted resource status information for RAN resources controlled by the first node, and sending to the first node a response to the request, wherein the response indicates that the second node either will or will not accept the representation of predicted resource status information; or
b. sending to the first node a request to accept a representation of predicted resource status information for RAN resources controlled by the second node, and receiving from the first node a response to the request, wherein the response either confirms that the first node can accept the requested representation of predicted resource status information, or indicates that the first node will not accept the requested representation of predicted resource status information.

Either one or both of requesting to send predicted resource status information or requesting provision of predicted resource status information may be triggered by related action within the requesting node, such as for example a start or change in traffic to/from a served UE, and/or an event in relation to a RAN operation performed by in relation to the node, and/or an event in relation to a previously provided prediction, such as prediction uncertainty rising above a threshold or a predicted value changing by more than a threshold amount. According to examples of the present disclosure, the second node may set reporting granularity during negotiation of provision of predicted resource status information. For example, the second node may request periodic updates to predicted resource status information, or may set thresholds for uncertainty and/or one or more individual predicted values, on the basis of which updated predictions should be provided. This granularity may be set for example in a request for provision of predicted resource status information or in a response to a request to provide predicted resource status information. If reporting granularity is set during the negotiation then, in subsequent iterations of the method, the step of sending the predicted resource status information may be dependent upon a condition set for reporting being fulfilled, such as a reporting time period expiring, or uncertainty or a predicted value or a change in a predicted value exceeding a certain threshold.

According to examples of the present disclosure, the first node may be a neighbor of the second node, such that a signaling connection is established between the first node and second node.

According to examples of the present disclosure, the method may further comprise receiving from the first node a request to provide feedback on the predicted resource status information provided by the first node. Such feedback may for example include information about the accuracy, usefulness, and/or confidence interval of the predictions.

According to examples of the present disclosure, the method may further comprise generating feedback on the predicted resource status information, and providing to the first node, explicitly or implicitly, the generated feedback on the predicted resource status information. Such feedback may for example include information about the accuracy, usefulness, and/or confidence interval of the predictions. Providing implicit feedback may for example comprise determining that the feedback is positive, and/or indicates that the predictions fulfil one or more criteria for acceptable accuracy/usefulness etc., and omitting to send any explicit feedback message, the absence of such message being interpreted by the first node as meaning that the predictions fulfil the one or more criteria.

According to examples of the present disclosure, generating feedback on the predicted resource status information may comprise performing measurements related to the predicted resource status information for RAN resources controlled by the first node, and comparing results of the performed measurements with the predicted resource status information for RAN resources controlled by the first node.

According to examples of the present disclosure, the method may further comprise obtaining a record of resource status information describing usage, during a historical time period and within a coverage area of the second node, of RAN resources controlled by the second node, using a Machine Learning, ML, process to predict, based on the obtained record, resource status information describing usage of RAN resources controlled by the second node within a coverage area of the second node and during a future time period, and sending, to the first node in the RAN, a representation of the predicted resource status information.

According to examples of the present disclosure, the method may further comprise receiving, from the first node, resource status information describing usage, during a historical time period and within a coverage area of the first node, of RAN resources controlled by the first node.

According to examples of the present disclosure, the method may further comprise receiving, from the first node, predicted resource status information describing usage, during a future time period and within a coverage area of the first node, of RAN resources controlled by the first node.

According to examples of the present disclosure, the method may further comprise obtaining previously predicted resource status information describing usage, during a future or historical time period and within a coverage area of the second node, of RAN resources controlled by the second node.

According to examples of the present disclosure, using an ML process to predict, based on the obtained record, resource status information describing usage of RAN resources controlled by the second node within a coverage area of the second node and during a future time period may comprise using the ML process to predict resource status information describing usage of RAN resources controlled by the second node within a coverage area of the second node and during a future time period based on the obtained record and on at least one of:

iv. received resource status information describing usage, during a historical time period and within a coverage area of the first node, of RAN resources controlled by the first node;

v. received predicted resource status information describing usage, during a future time period and within a coverage area of the first node, of RAN resources controlled by the first node;

vi. obtained previously predicted resource status information describing usage, during a future or historical time period and within a coverage area of the second node, of RAN resources controlled by the second node.

According to examples of the present disclosure, the method may further comprise negotiating, with the first node, sending of a representation of predicted resource status information describing usage of RAN resources controlled by the second node within a coverage area of the second node and during a future time period.

According to examples of the present disclosure, the method may further comprise negotiating, with the first node, sending of sending of a representation of predicted resource status information may comprise at least one of:

a. sending to the first node a request to provide a representation of predicted resource status information for RAN resources controlled by the second node, and receiving from the first node a response to the request, wherein the response indicates that the first node either will or will not accept the representation of predicted resource status information; or b. receiving from the first node a request to provide a representation of predicted resource status information for RAN resources controlled by the second node, and sending to the first node a response to the request, wherein the response either confirms that the second node can provide the requested representation of predicted resource status information, or indicates that the second node will not provide the requested representation of predicted resource status information.

As discussed above, either one or both of requesting to send predicted resource status information or requesting provision of predicted resource status information may be triggered by related action within the requesting node, such as for example a start or change in traffic to/from a served UE, and/or an event in relation to a RAN operation performed by in relation to the node, and/or an event in relation to a previously provided prediction, such as prediction uncertainty rising above a threshold or a predicted value changing by more than a threshold amount. According to examples of the present disclosure, the first node may set reporting granularity during negotiation of provision of predicted resource status information. For example, the first node may request periodic updates to predicted resource status information, or may set thresholds for uncertainty and/or one or more individual predicted values, on the basis of which updated predictions should be provided. This granularity may be set for example in a request for provision of predicted resource status information or in a response to a request to provide predicted resource status information. If reporting granularity is set during the negotiation then, in subsequent iterations of the method, the step of sending the predicted resource status information may be dependent upon a condition set for reporting being fulfilled, such as a reporting time period expiring, or uncertainty or a predicted value or a change in a predicted value exceeding a certain threshold.

According to examples of the present disclosure, using an ML process to predict, based on the obtained record, resource status information describing usage of RAN resources controlled by the second node within a coverage area of the second node and during a future time period may comprise using at least one of an Autoregressive model, a Recurrent Neural Network, or a Long Short-Term Memory process to predict the resource status information.

According to examples of the present disclosure, the method may further comprise sending a request to the first node to provide feedback on the predicted resource status information. Such feedback may for example include information about the accuracy, usefulness, and/or confidence interval of the predictions.

According to examples of the present disclosure, the method may further comprise receiving from the first node an explicit or implicit feedback on the predicted resource status information. Such feedback may for example include information about the accuracy, usefulness, and/or confidence interval of the predictions.

According to examples of the present disclosure, the method may further comprise generating feedback on the predicted resource status information by:

iii. obtaining a record of resource status information describing usage, during the future time period and within a coverage area of the second node, of RAN resources controlled by the second node; and iv. comparing the obtained record of resource status information to the predicted resource status information.

Such feedback may for example include information about the accuracy, usefulness, and/or confidence interval of the predictions.

According to examples of the present disclosure, using an ML process to predict, based on the obtained record, resource status information describing usage of RAN resources controlled by the second node within a coverage area of the second node and during a future time period may comprise using the ML process to predict resource status information describing usage of RAN resources controlled by the second node within a coverage area of the second node and during a future time period based on the obtained record and on the feedback on the predicted resource status information.

According to examples of the present disclosure, the method may further comprise obtaining user data, and forwarding the user data to a host computer or a wireless device.

Figure 24:
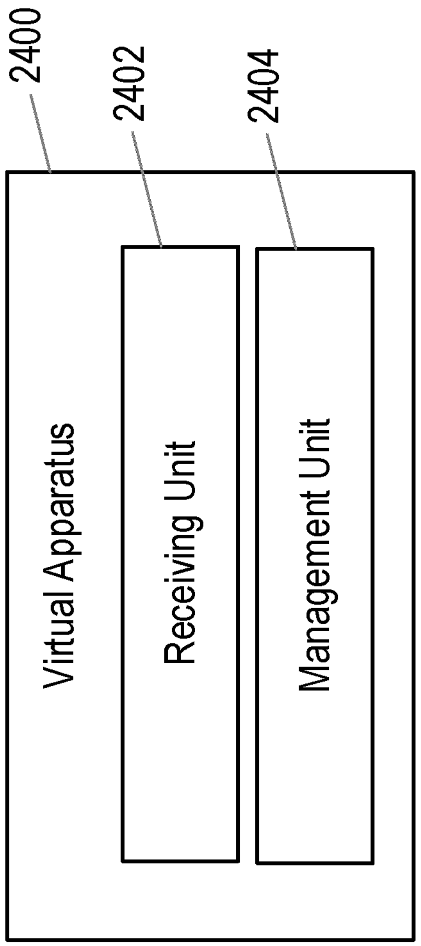
FIG. 24 shows a virtualization apparatus in accordance with some embodiments.

FIG. 24 shows a virtualization apparatus in accordance with some embodiments.

FIG. 24 illustrates a schematic block diagram of an apparatus 2400 in a wireless network (for example, the wireless network shown in FIG. 12). The apparatus may be implemented in a wireless device or network node (e.g., wireless device 1210 or network node 1260 shown in FIG. 12). Apparatus 2400 is operable to carry out the example method described with reference to FIG. 23 and possibly any other processes or methods disclosed herein. It is also to be understood that the method of FIG. 23 is not necessarily carried out solely by apparatus 2400. At least some operations of the method can be performed by one or more other entities.

Virtual Apparatus 2400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2402, management unit 2404, and any other suitable units of apparatus 2400 to perform corresponding functions according one or more embodiments of the present disclosure.

As illustrated in FIG. 24, apparatus 2400 includes receiving unit 2402 and management unit 2404. Receiving unit 2402 is configured to receive, from a first node in the RAN, a representation of predicted resource status information describing usage of RAN resources controlled by the first node within a coverage area of the first node and during a future time period. Management unit 2404 is configured to use the received representation of predicted resource status information for RAN resources controlled by the first node in a process relating to management of RAN resources controlled by the second node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Additional Information

The following pages of the detailed description reproduce the text of papers submitted to the Third Generation Partnership Project as R3-206437 and R3-206436. This text was included as an appendix to the priority founding application U.S. 63/094,449.

3GPP TSG-RAN WG3 Meeting #110-e DocNum

Online meeting, 2-12 Nov. 2020

Agenda Item: 18.3

Source: Ericsson

Title: AI/ML based Use Cases

Document for: Discussion

Introduction

As described in RP-201620, the study on AI/ML in RAN3 will focus on the following:

This study item aims to study the functional framework for RAN intelligence enabled by further enhancement of data collection through use cases, examples etc. and identify the potential standardization impacts on current NG-RAN nodes and interfaces.

The detailed objectives of the SI are listed as follows:

Study high level principles for RAN intelligence enabled by AI, the functional framework (e.g. the AI functionality and the input/output of the component for AI enabled optimization) and identify the benefits of AI enabled NG-RAN through possible use cases e.g. energy saving, load balancing, mobility management, coverage optimization, etc.:

1. Study standardization impacts for the identified use cases including: the data that may be needed by an AI function as input and data that may be produced by an AI function as output, which is interpretable for multi-vendor support.

[ . . . ]

One general objective for the work is that the studies should be focused on the current NG-RAN architecture and interfaces to enable AI support for 5G deployments.

In order to explore the areas where AI/ML is most applicable and can improve the network performance for the NG RAN, this paper illustrates use cases that can be taken as reference during the development of AI/ML based solutions.

AI/ML based Use Cases

It is important to fully utilize the potentials in AI/ML for wireless networks, for example by extracting important data from the system in order to build advanced AI/ML models.

One problem in enabling AI/ML for wireless networks is the variable cost depending on wired or over-the-air data transfer. Enabling AI/ML by extending the UE reporting over-the-air by including different types of information, from radio to physical measurements would lead to increased signalling. The trade-off between increased data signalling versus enabling improved intelligence at the network is a challenging problem. It is important to fully address such trade-offs when evaluating different AI/ML use cases in the SI. One alternative to extending the UE report of radio or physical measurements is to explore the use of potential augmented information provided by the UE, for example generated by an AI-model. This information may be given as input to AI models hosted in the network, hence creating a system where AI models interact between each other to produce the desired final output. The figure below shows an example of how multiple data sources can be used to create intelligent augmentation data at the UE and at RAN nodes.

Figure 25:
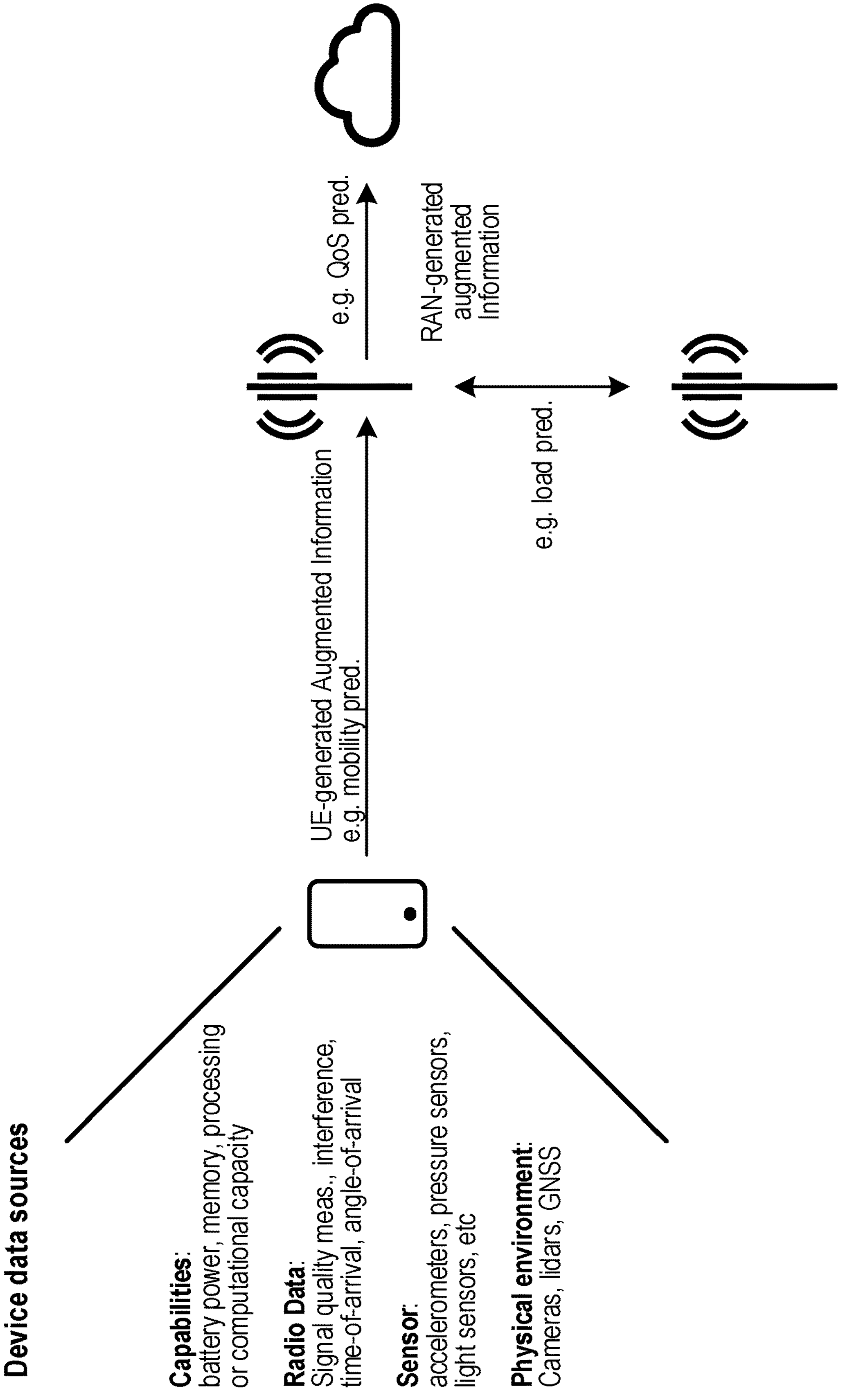
FIG. 25 shows use of augmented information from a UE and from a RAN.

FIG. 25: Use of Augmented Information from the UE and from the RAN

Explore Potential Augmented Information from the UE and from the RAN in Each Use Case Next, use cases covering important areas where AI/ML is likely to improve network performance is described. The use cases are classified in the following families:

1. AI/ML for traffic steering, both comprising
   - Capacity improvements
   - Energy efficiency
2. AI/ML for QoS prediction
3. AI/ML for improved radio resource management (RRM)

AI/ML for Traffic Steering

AI/ML can be applied to steer traffic more efficiently, both in terms of capacity and energy efficiency.

Reward Information for AI/ML-Based Handovers

Finding the best cell or set of cells to serve a UE is a challenging task due to the densification of networks and introduction of new frequency bands. One of the challenges in finding the best cell for a UE is to evaluate if the new cell was better than a previous serving cell for the UE, hence, it would be beneficial to have richer feedback information available from the new serving cell, so to compare previous and current serving cell performance.

Figure 26:
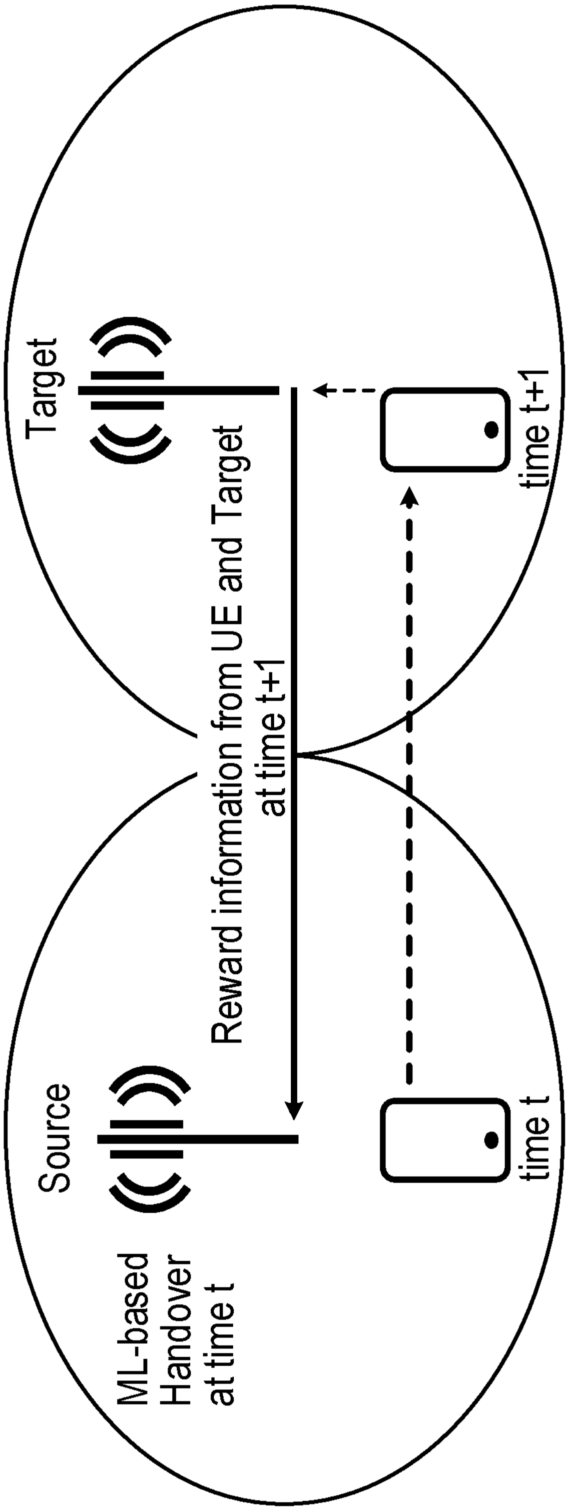
FIG. 26 shows a target providing reward information on UE performance after handover.

FIG. 26: The target provides reward information (feedback) on the UE performance after handover.

Considering the current handover mechanisms in NR, after a handover to the target cell, the source/serving node would act obliviously about the handed over UE i.e. it would not be interested on that UE any longer. Therefore, if the UE experiences low throughput or poor radio coverage once handed over to the target cell, the source node of the handover would not be able to recognize and take any counteraction preventing such handovers causing poor performance for the UE. It is thus important to design a solution enabling a feedback mechanism after handover, where the UE and the target node provide measurements relative to the performance of the target cell serving the UE. This can enable the source node to update its handover decisions frequently based on the received feedback from target node (which would comprise also feedback from the UE while at target). The feedback from the target could be used as reward information for an AI/ML function that performs handover decisions, one such function could comprise reinforcement learning. Handover decisions consist of a prediction that could take into account possible future performance for a UE once handed over to a certain target cell/node. The feedback provided from target RAN node to source could comprise of:

- Dwelling time in cell
- Measurements of QoS parameters experienced at target (instantaneous/mean)
- UE traffic pattern after handover
- Resource utilizations used by UE, experienced latency (e.g., E2E RTT), measure of transmission reliability
- Radio efficiency at target cell (bit per second per hertz)
- Any change in UEs service requirements
- Mobility history information
- Multi connectivity configurations adopted after HO.

Investigate Potential Reward Information for Enabling AI/ML Based Traffic Steering Traffic Steering Augmented Information In addition to the reward information provided by the target RAN node, the potential target RAN node could also signal augmented information as illustrated in the message sequence chart below, generated by an ML-model for improved traffic steering, for example its future load information. The predicted future load information can comprise

- Number of active UEs
- Resource utilization
- Available Capacity
- Number of RRC Connections
- TNL capacity The UE may also provide augmented information such as its predicted mobility pattern and feed this to the target RAN, which in turn will forward it to the source RAN. Similarly, the serving gNB can provide the target gNB with augmented information related to the UE at handover, for example the predicted UE mobility or traffic.

Figure 27:
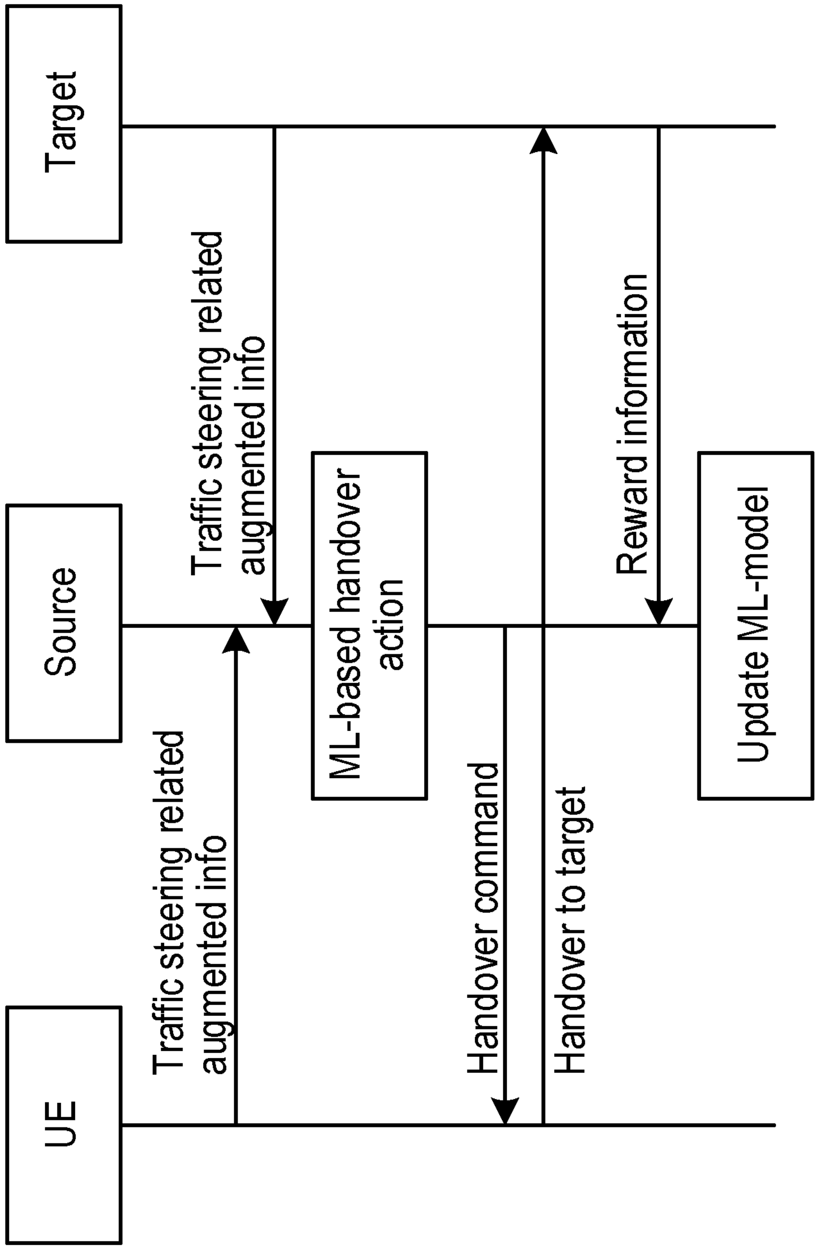
FIG. 27 shows a message sequence chart for target cell prediction based on reward information and augmented information.

FIG. 27: Message Sequence Chart for Target Cell Prediction Based on Reward Information and Augmented Information Augmented Information Related to Improved Traffic Steering should be Investigated AI/ML for Energy Efficiency Energy efficiency is an important aspect in wireless communications networks. One method for providing energy saving is to put capacity cells into a sleep mode. The activation or deactivation of a capacity cell may be triggered from a gNB that provides basic coverage as illustrated in the picture below and is typically a trade-off between energy efficiency and capacity.

In cases when there is quite low traffic around the capacity cell, it may be more energy efficient to turn off the capacity cell until the load increases. The capacity cell may later be activated when the traffic is higher and when there are UEs in the vicinity of the capacity cell which may be moved into the capacity cell by a handover procedure or some other connectivity reconfiguration procedure. However, it may be quite tricky to find out whether or not the communications UEs served by the basic coverage cell may be served by the capacity cell without activating the capacity cell. This means that in some situations when the load increases, the capacity cell is activated in order to determine whether or not one or more UEs served by the basic coverage cell may be served by the capacity cell. In case no such UEs would connect (or it would connect with acceptable radio conditions) to the activated capacity cell, the activation is done in vain, hence leading to a waste of energy.

Figure 28:
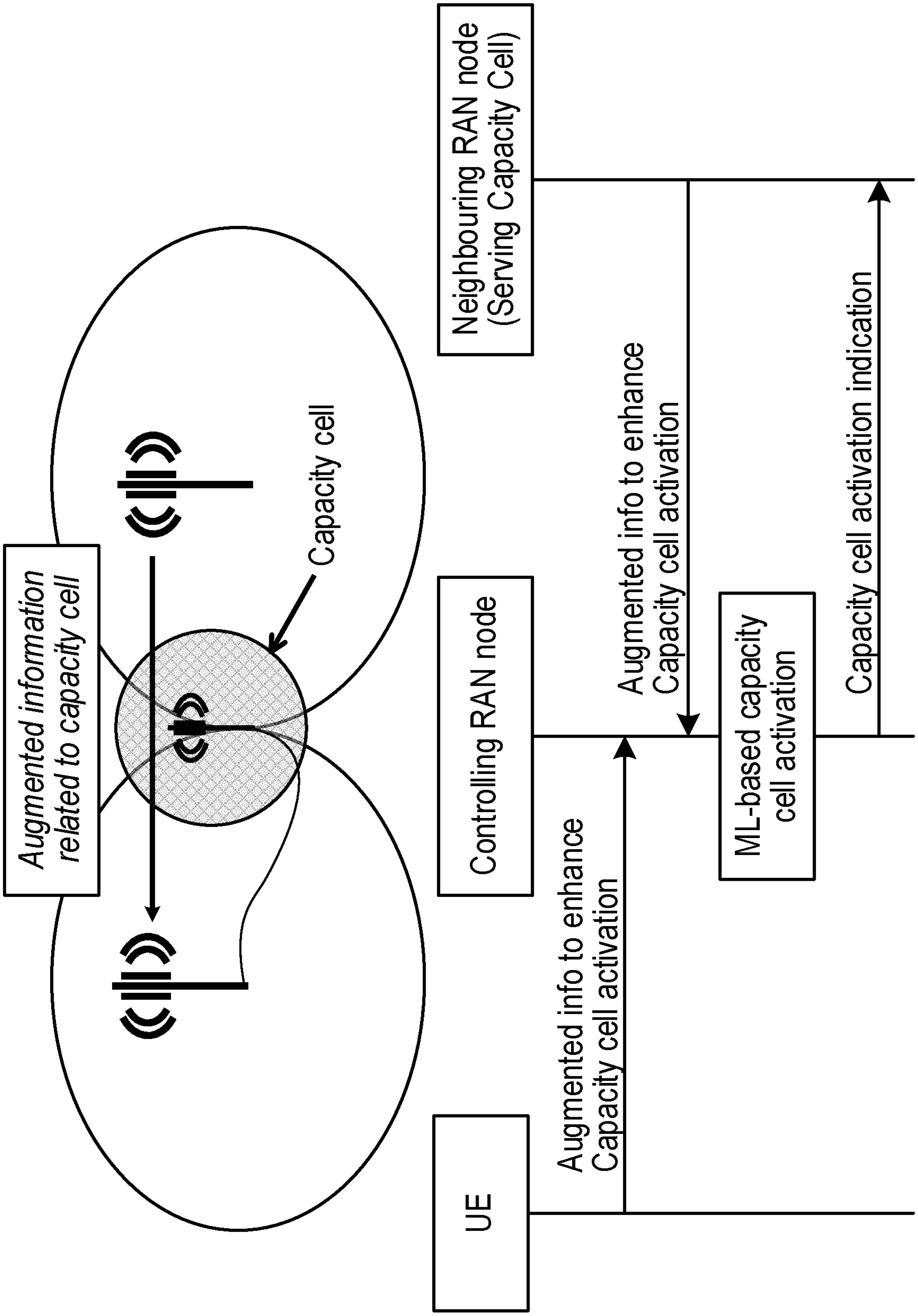
FIG. 28 shows capacity cell activation based on reward information and augmented information.

FIG. 28: Capacity Cell Activation Based on Reward Information and Augmented Information.

Furthermore, a capacity cell is often deployed in the handover region of two basic coverage cells, and therefore it is difficult to optimize capacity versus energy consumption. It is important to also look into energy saving application using ML/AI in activating capacity cells efficiently, for example to activate capacity cells based on predictions on traffic that could be offloaded to the capacity cell for all relevant nodes in the network. The signalling of such predictions to the RAN node controlling the activation or the signalling of information that may help to derive a prediction of offloaded traffic to capacity cell, should be investigated. It is also important to investigate whether the UE can provide augmented information to enable a smarter capacity cell activation.

Energy Efficiency should be Studied, for Example AI/ML for Capacity Cell Activation AI/ML for QoS Prediction Quality of service (QoS) describes the overall performance of a service, for example the latency, reliability or throughput. Service Level Agreements (SLAs) are contractual agreements between an operator and an incumbent for the provisioning of services with a given set of performance requirements. On the basis of the current and predicted QoS target of each served UE, it is possible to determine if SLAs are going to be met. The system in charge for checking fulfillment of SLAs is the OAM. In order to enable better SLA fulfillment prediction at the OAM, one should look into AI/ML in order to provide augmented information helping to forecast SLA fulfilment.

Using AI/ML, the CU-CP can for example predict whether for a group of UEs and services (e.g. for UEs in a certain network slice using a service with 5QI==x) the target QoS requirements will be fulfilled or not. Such prediction can be relative to a specific time window into the future.

Such augmented information can also comprise non-UE specific information, such as a prediction of the expected load per QoS class for a particular time of the day, as well as a prediction of whether QoS requirements for such QoS classes can be fulfilled. The QoS fulfillment prediction could be signalled from the RAN to the OAM upon request from the OAM. The request could also comprise a request for the predicted QoS for a certain type of UE, for example a highly mobile UE or a low-end UE (e.g. IoT).

The OAM receiving such QoS fulfillment prediction can in turn derive whether SLAs can be fulfilled in the future. If for example the OAM determines that SLAs cannot be fulfilled in the future, the OAM can take preventive actions such as to reconfigure resource partition policies per slice at the RAN in order to ensure that the SLAs not fulfilled can be fulfilled by means of a higher amount of resources to be utilized. The general framework is illustrated in the flowchart below.

Figure 29:
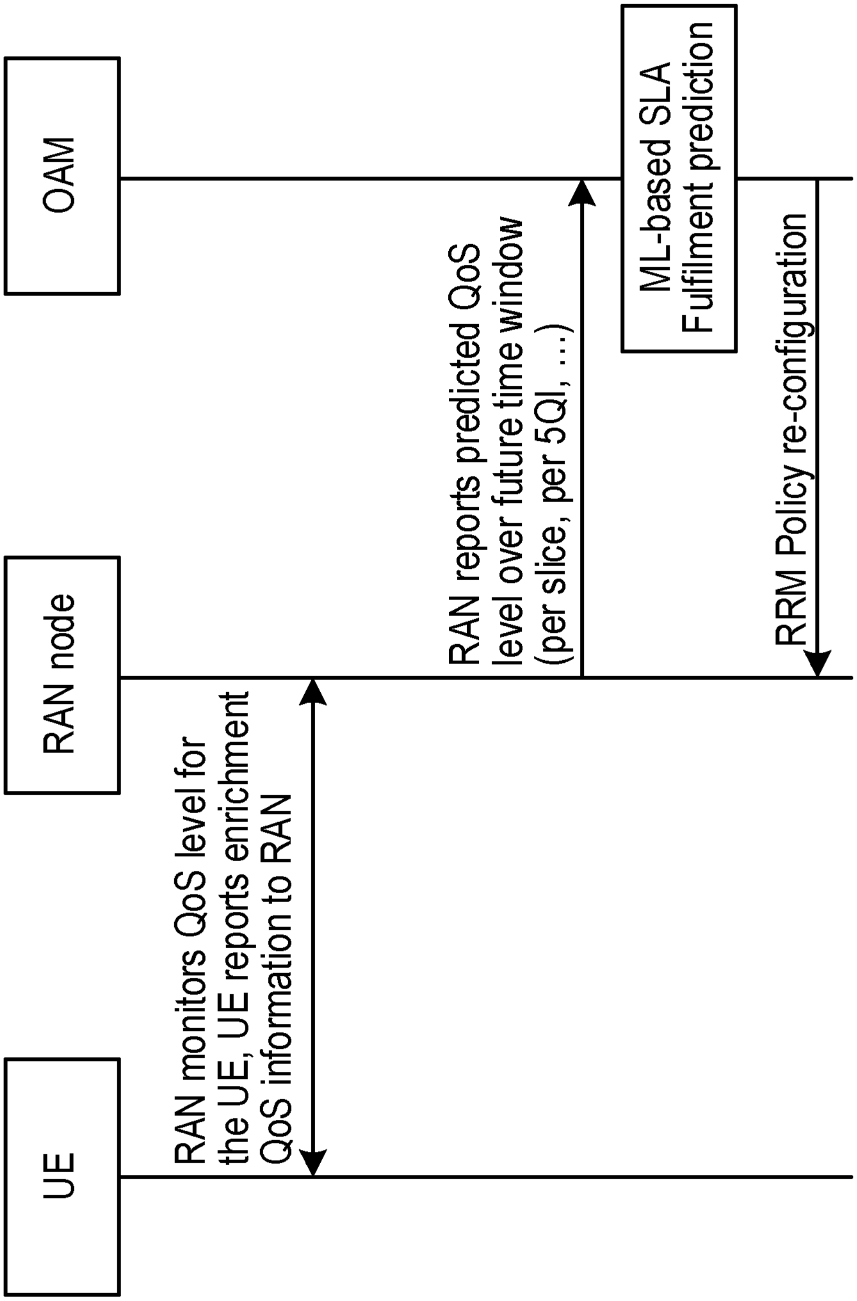
FIG. 29 shows QoS and SLA fulfilment prediction based on enrichment and augmented information.

FIG. 29: QoS and SLA Fulfillment Prediction Based on Enrichment and Augmented Information The augmented information sent to the OAM can be used to change the slice configuration, for example allocate more resources if SLA is predicted to not be fulfilled in a future time window.

AI/ML for Predicting QoS and SLA Fulfilment should be Studied

AI/ML for Improved Radio Resource Management (RRM)

The use of AI/ML can provide an improved performance by leveraging new capabilities in learning complex interactions in the environment, one such environment with complex interactions is RRM. Potential RRM algorithms comprise, link-adaptation, rank-selection, power control, mobility decisions. The SI should investigate potential augmented information from UEs or gNBs in order to enable an even better RRM. The augmented information generated by an AI-model could for example comprise forecast values such as the predicted load in a future time frame for one RAN node, or a UE predicted future signal quality value.

As an example, the use case of link adaptation can be considered. Link adaptation is a function that needs to react to rather fast changes of radio conditions. A way to improve the performance of link adaptation would be to gain more granular information about the radio environment and to predict the optimal link adaptation configuration on the basis of a prediction of the radio conditions.

In order to enhance link adaptation performance the UE may provide higher granularity data to the serving RAN, such as more granular L1 measurements, measurements of UE speed, UL queuing delays.

At the same time the serving RAN may receive from neighbour nodes information about cross cell interference, e.g. in the form of number of UEs or resource utilisation at cell edge, or indeed information either constituting or helping to extrapolate a prediction of cross cell interference.

With such information the serving RAN is able to derive a prediction of the channel condition for the UE and therefore to adopt a better link adaptation configuration.

Investigate New AI/ML-Based Augmented Information for Improved RRM

Conclusion

In this contribution a description of three main families of use cases has been carried out.

The Use Case families are as follows:

1. AI/ML for traffic steering, both comprising
   Capacity improvements
   Energy efficiency
2. AI/ML for QoS prediction
3. AI/ML for improved radio resource management (RRM)

The following proposals have been derived:

| | |
|---|---|
| Proposal 1 | Proposal 1: Explore potential augmented information from the UE and from the RAN in each use case |
| Proposal 2 | Investigate potential reward information for enabling AI/ML based traffic steering |
| Proposal 3 | Augmented information related to improved traffic steering should be investigated |
| Proposal 4 | Energy efficiency should be studied, for example AI/ML for capacity cell activation |
| Proposal 5 | AI/ML for predicting QoS and SLA fulfilment should be studied |
| Proposal 6 | Investigate new AI/ML-based augmented information for improved RRM |

A TP to TR37.816 is presented below, capturing the use case descriptions outlined. Note that the TP also includes the impact on standard per use case, described in R3-20xxxx

REFERENCES

[1]. RP-201281: "Revised WID on enhancement of data collection for SON_MDT in NR and EN-DC", CMCC, Ericsson.

[2].

TP to TR 37.817

Start of Changes

5 Use Cases and Solutions for Artificial Intelligence in RAN 5.x1 Use Case 1: AI/ML for Traffic Steering AI/ML can be applied to steer traffic more efficiently, both in terms of capacity and energy efficiency.

5.x1.1 Reward Information for AI/ML-Based Handovers

Finding the best cell or set of cells to serve a UE is a challenging task due to the densification of networks and introduction of new frequency bands. One of the challenges in finding the best cell for a UE is to evaluate if the new cell was better than a previous serving cell for the UE, hence, it would be beneficial to have richer feedback information available from the new serving cell, so to compare previous and current serving cell performance.

Figure 30:
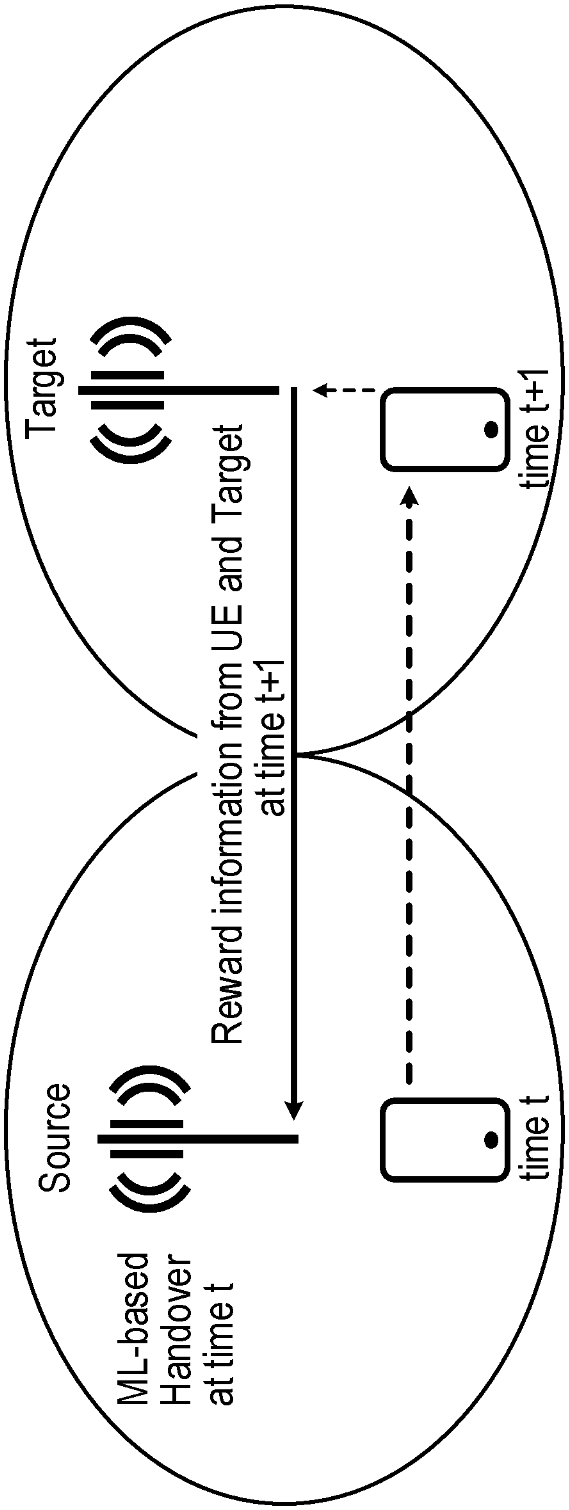
FIG. 30 shows a target providing reward information (feedback) on the UE performance after handover.

FIG. 30: The Target Provides Reward Information (Feedback) on the UE Performance after Handover Considering the current handover mechanisms in NR, after a handover to the target cell, the source/serving node would act obliviously about the handed over UE i.e. it would not be interested on that UE any longer. Therefore, if the UE experiences low throughput or poor radio coverage once handed over to the target cell, the source node of the handover would not be able to recognize and take any counteraction preventing such handovers causing poor performance for the UE. It is thus important to design a solution enabling a feedback mechanism after handover, where the UE and the target node provide measurements relative to the performance of the target cell serving the UE. This can enable the source node to update its handover decisions frequently based on the received feedback from target node (which would comprise also feedback from the UE while at target). The feedback from the target could be used as reward information for an AI/ML function that performs handover decisions, one such function could comprise reinforcement learning. Handover decisions consist of a prediction that could take into account possible future performance for a UE once handed over to a certain target cell/node. The feedback provided from target RAN node to source could comprise of:

- Dwelling time in cell
- Measurements of QoS parameters experienced at target (instantaneous/mean)
- UE traffic pattern after handover
- Resource utilizations used by UE, experienced latency (e.g., E2E RTT), measure of transmission reliability
- Radio efficiency at target cell (bit per second per hertz)
- Any change in UEs service requirements
- Mobility history information
- Multi connectivity configurations adopted after HO.

5.x1.2 Traffic Steering Augmented Information

In addition to the reward information provided by the target RAN node, the potential target RAN node could also signal augmented information as illustrated in the message sequence chart below, generated by an ML-model for improved traffic steering, for example its future load information. The predicted future load information can comprise

- Number of active UEs
- Resource utilization
- Available Capacity
- Number of RRC Connections
- TNL capacity The UE may also provide augmented information such as its predicted mobility pattern and feed this to the target RAN, which in turn will forward it to the source RAN. Similarly, the serving gNB can provide the target gNB with augmented information related to the UE at handover, for example the predicted UE mobility or traffic.

Figure 31:
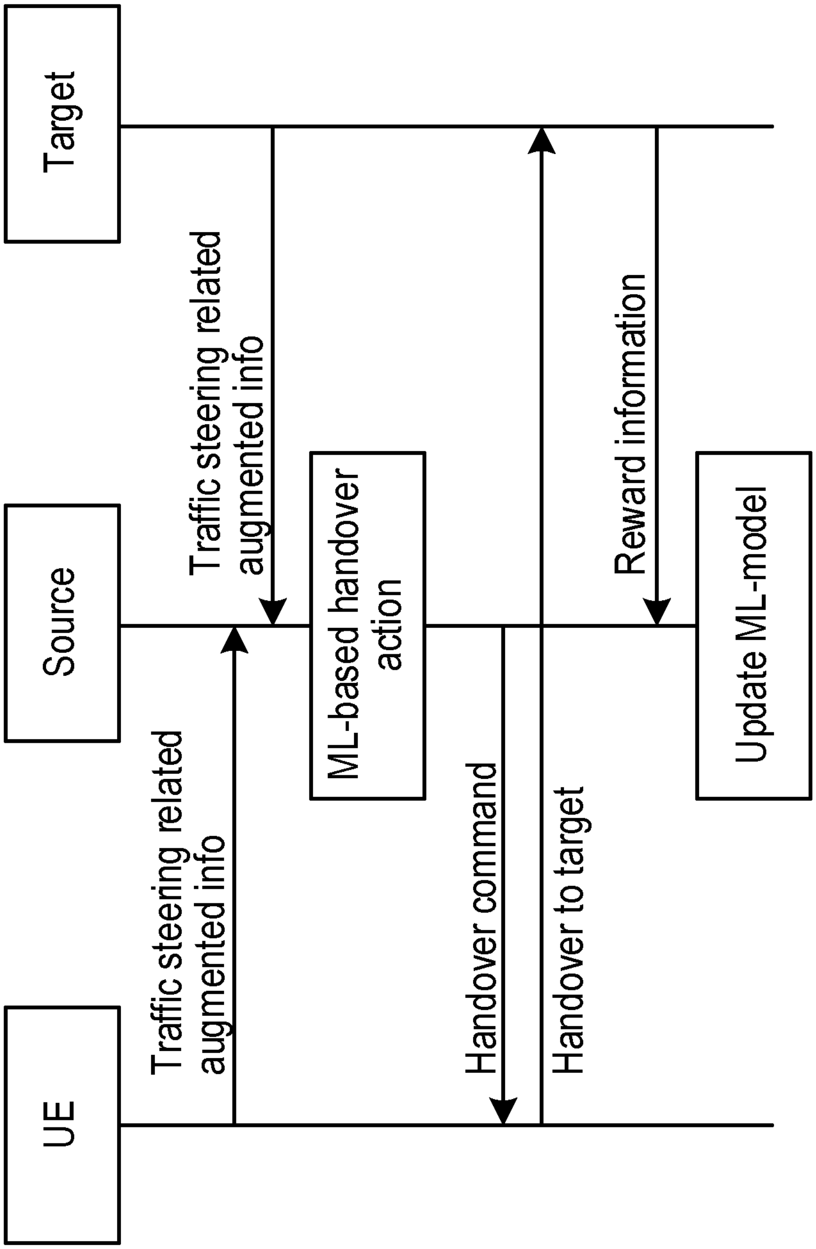
FIG. 31 shows a message sequence chart for target cell prediction based on reward information and augmented information.

FIG. 31: Message Sequence Chart for Target Cell Prediction Based on Reward Information and Augmented Information 5.x1.3 AI/ML for Energy Efficiency Energy efficiency is an important aspect in wireless communications networks. One method for providing energy saving is to put capacity cells into a sleep mode. The activation or deactivation of a capacity cell may be triggered from a gNB that provides basic coverage as illustrated in the picture below and is typically a trade-off between energy efficiency and capacity.

In cases when there is quite low traffic around the capacity cell, it may be more energy efficient to turn off the capacity cell until the load increases. The capacity cell may later be activated when the traffic is higher and when there are UEs in the vicinity of the capacity cell which may be moved into the capacity cell by a handover procedure or some other connectivity reconfiguration procedure. However, it may be quite tricky to find out whether or not the communications UEs served by the basic coverage cell may be served by the capacity cell without activating the capacity cell. This means that in some situations when the load increases, the capacity cell is activated in order to determine whether or not one or more UEs served by the basic coverage cell may be served by the capacity cell. In case no such UEs would connect (or it would connect with acceptable radio conditions) to the activated capacity cell, the activation is done in vain, hence leading to a waste of energy.

Figure 32:
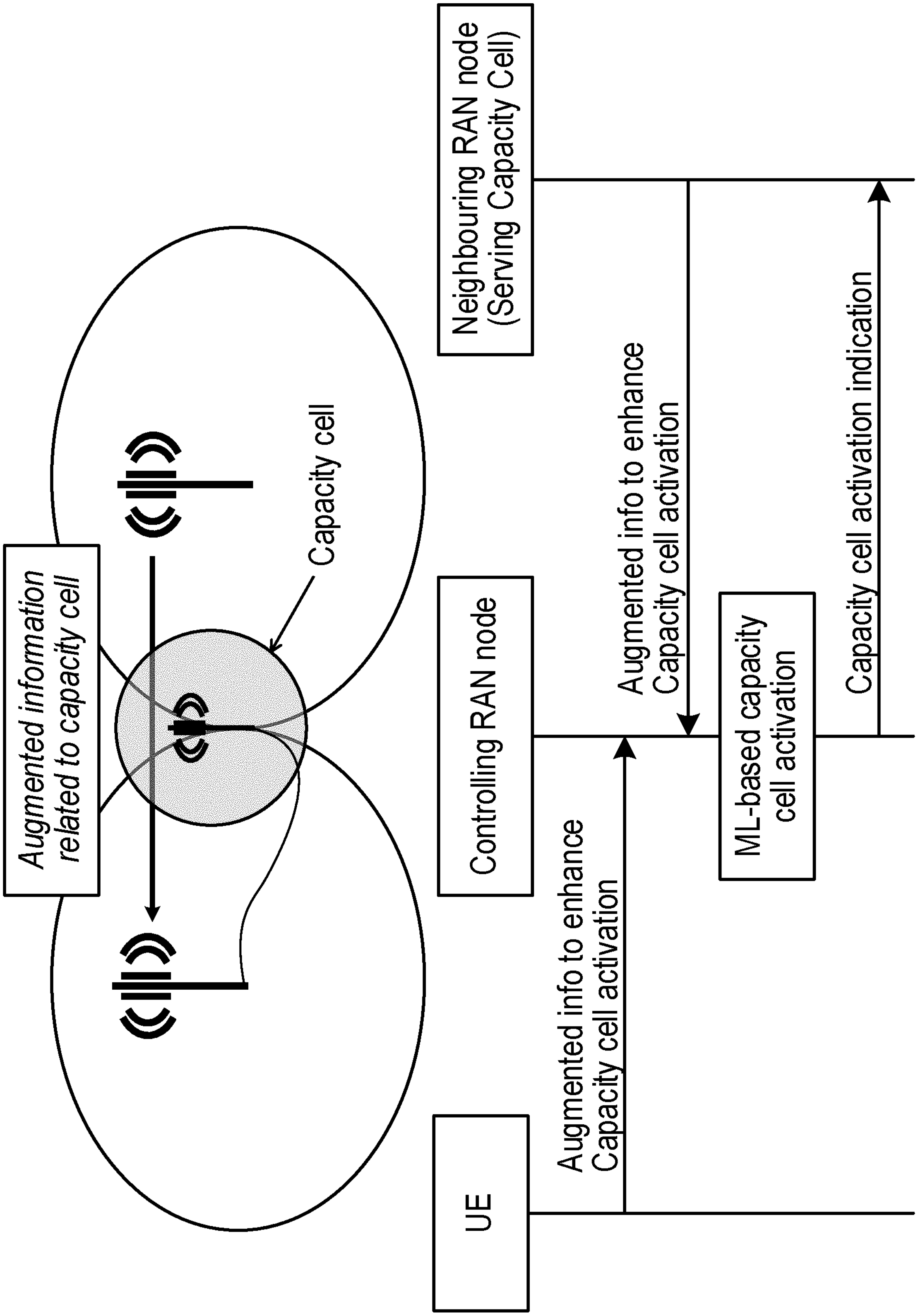
FIG. 32 shows capacity cell activation based on reward information and augmented information.

FIG. 32: Capacity Cell Activation Based on Reward Information and Augmented Information Furthermore, a capacity cell is often deployed in the handover region of two basic coverage cells, and therefore it is difficult to optimize capacity versus energy consumption. It is important to also look into energy saving application using ML/AI in activating capacity cells efficiently, for example to activate capacity cells based on predictions on traffic that could be offloaded to the capacity cell for all relevant nodes in the network. The signalling of such predictions to the RAN node controlling the activation or the signalling of information that may help to derive a prediction of offloaded traffic to capacity cell, should be investigated. It is also important to investigate whether the UE can provide augmented information to enable a smarter capacity cell activation.

5.X1.2 Solutions and Standard Impacts

The Use Case family of "AI/ML for traffic steering" may generate the following standardisation impacts:

Uu Impact:

- Flow of information over Uu from UE to target RAN to derive performance characteristics for the UE after the mobility process
- Flow of information from UE to source RAN to derive prediction of conditions while at the source Xn Impact:

- Signalling from target RAN to source RAN of information relative to the conditions and performance of the UEs after the mobility process took place.
- Signalling from target to source RAN of prediction information allowing to derive potential target cell status, e.g. load predictions per cell 5.x2.1 Use Case 2: AI/ML for QoS Prediction Quality of service (QoS) describes the overall performance of a service, for example the latency, reliability or throughput. Service Level Agreements (SLAs) are contractual agreements between an operator and an incumbent for the provisioning of services with a given set of performance requirements. On the basis of the current and predicted QoS target of each served UE, it is possible to determine if SLAs are going to be met. The system in charge for checking fulfillment of SLAs is the OAM. In order to enable better SLA fulfillment prediction at the OAM, one should look into AI/ML in order to provide augmented information helping to forecast SLA fulfilment.

Using AI/ML, the CU-CP can for example predict whether for a group of UEs and services (e.g. for UEs in a certain network slice using a service with 5QI==x) the target QoS requirements will be fulfilled or not. Such prediction can be relative to a specific time window into the future.

Such augmented information can also comprise non-UE specific information, such as a prediction of the expected load per QoS class for a particular time of the day, as well as a prediction of whether QoS requirements for such QoS classes can be fulfilled. The QoS fulfillment prediction could be signalled from the RAN to the OAM upon request from the OAM. The request could also comprise a request for the predicted QoS for a certain type of UE, for example a highly mobile UE or a low-end UE (e.g. IoT).

The OAM receiving such QoS fulfillment prediction can in turn derive whether SLAs can be fulfilled in the future. If for example the OAM determines that SLAs cannot be fulfilled in the future, the OAM can take preventive actions such as to reconfigure resource partition policies per slice at the RAN in order to ensure that the SLAs not fulfilled can be fulfilled by means of a higher amount of resources to be utilized. The general framework is illustrated in the flowchart below.

Figure 33:
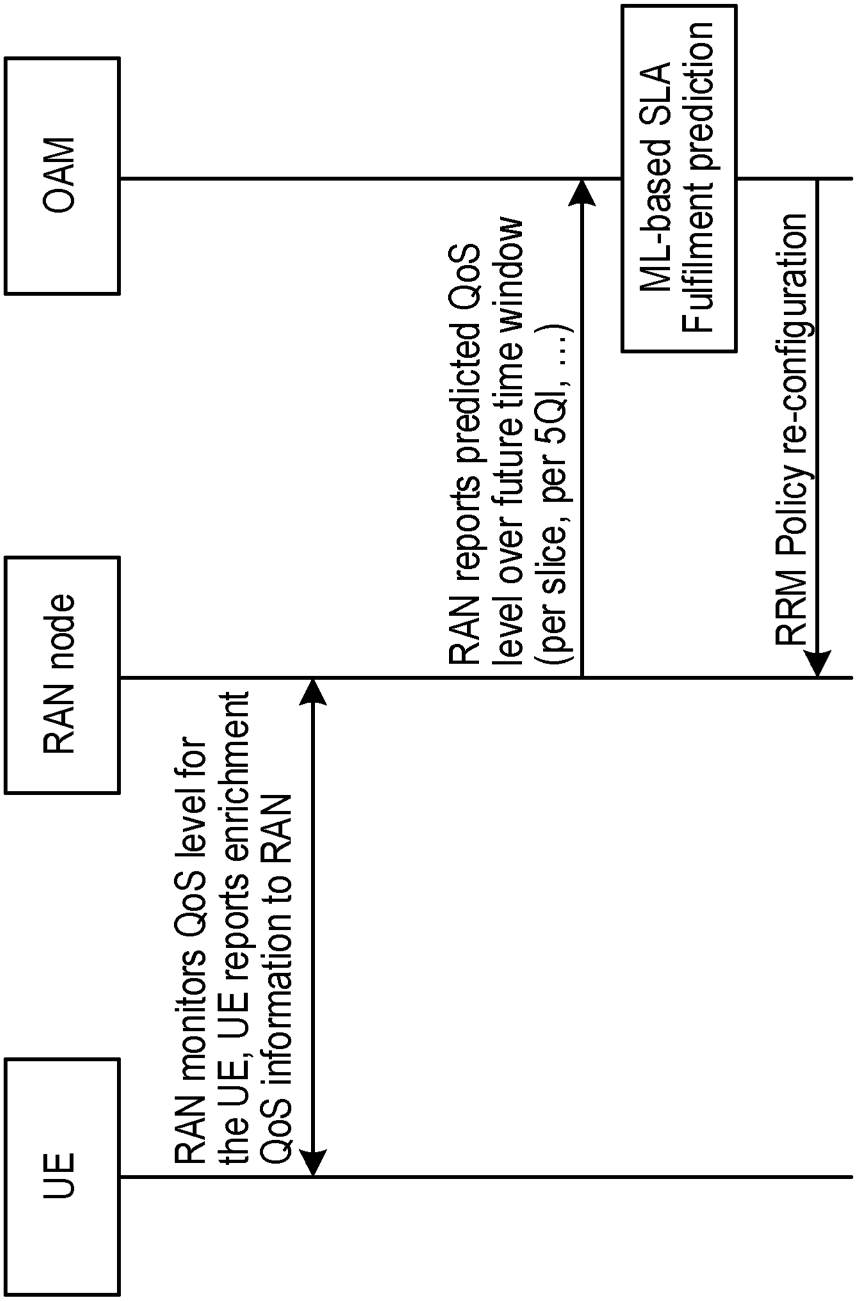
FIG. 33 shows QoS and SLA fulfilment prediction based on enrichment and augmented information.

FIG. 33: QoS and SLA Fulfillment Prediction Based on Enrichment and Augmented Information The augmented information sent to the OAM can be used to change the slice configuration, for example allocate more resources if SLA is predicted to not be fulfilled in a future time window.

5.X2.2 Solutions and Standard Impacts

The Use Case family of "AI/ML for QoS monitoring" may generate the following impacts:

- F1-C Impacts:
  - Signalling from gNB-DU to gNB-CU of augmented information for parameters that may take part in QoS prediction derivation, e.g. Predictions of over the air transmission delays, predictions of packet error rates etc.
- RAN-OAM Interface Impact:
  - Signalling of predicted QoS levels from RAN to OAM, e.g. per QoS class, per slice
  - Based on the QoS level predictions, OAM is able to run predictions on SLA fulfilment. Depending on the SLA fulfilment, OAM signals new policies to RAN influencing how SLAs may be met in the future (e.g. new per slice RRM policies)

5.x3.1 Use Case 3: AI/ML for Improved Radio Resource Management (RRM)

The use of AI/ML can provide an improved performance by leveraging new capabilities in learning complex interactions in the environment, one such environment with complex interactions is RRM. Potential RRM algorithms comprise, link-adaptation, rank-selection, power control, mobility decisions. The SI should investigate potential augmented information from UEs or gNBs in order to enable an even better RRM. The augmented information generated by an AI-model could for example comprise forecast values such as the predicted load in a future time frame for one RAN node, or a UE predicted future signal quality value.

As an example, the use case of link adaptation can be considered. Link adaptation is a function that needs to react to rather fast changes of radio conditions. A way to improve the performance of link adaptation would be to gain more granular information about the radio environment and to predict the optimal link adaptation configuration on the basis of a prediction of the radio conditions.

In order to enhance link adaptation performance the UE may provide higher granularity data to the serving RAN, such as more granular L1 measurements, measurements of UE speed, UL queuing delays.

At the same time the serving RAN may receive from neighbour nodes information about cross cell interference, e.g. in the form of number of UEs or resource utilisation at cell edge, or indeed information either constituting or helping to extrapolate a prediction of cross cell interference.

With such information the serving RAN is able to derive a prediction of the channel condition for the UE and therefore to adopt a better link adaptation configuration.

5.X3.2 Solutions and Standard Impacts

The Use Case family of "AI/ML for improved radio resource management" may generate the following impacts:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies End of Changes 3GPP TSG-RAN WG3 Meeting #110-e DocNum Online meeting, 2-12 Nov. 2020

Agenda Item: 18.4

Source: Ericsson

Title: Initial Analysis of Standardisation Impacts for AI/ML

Document for: Discussion

Introduction

A new SI has been approved in [1]. As specified in the SID, the study is tasked to address the following objective:

a) Study standardization impacts for the identified use cases including: the data that may be needed by an AI function as input and data that may be produced by an AI function as output, which is interpretable for multi-vendor support.

b) Study standardization impacts on the node or function in current NG-RAN architecture to receive/provide the input/output data.

c) Study standardization impacts on the network interface(s) to convey the input/output data among network nodes or AI functions.

In R3-20xxxx a number of AI/ML use cases were described. The Use Cases could be classified as follows:

4. AI/ML for traffic steering, both comprising
   Capacity improvements
   Energy efficiency
5. AI/ML for QoS prediction
6. AI/ML for improved radio resource management (RRM)

This paper addresses the potential Standardisation Impact of the Use Cases analysed.

Standardisation Impacts per Use Case Class

Standardisation Impacts of AI/ML for Traffic Steering—for Capacity and Energy Efficiency This class of Use Cases relies on the ability of the RAN to predict the best cell that will serve the UE. The Use Cases can include mobility scenarios triggered by various reasons (e.g. Energy Efficiency, radio conditions, load conditions) or multi connectivity scenarios (e.g. prediction of best PSCell). In general the use cases provide augmented information about the cell that, given the predicted conditions, will best serve the UE within a future time window.

In this class of Use Cases the main standardisation impacts are foreseen to be on the following:

Uu Impact:
- Flow of information over Uu from UE to target RAN to derive performance characteristics for the UE after the mobility process
- Flow of information from UE to source RAN to derive prediction of conditions while at the source Xn Impact:
- Signalling from target RAN to source RAN of information relative to the conditions and performance of the UEs after the mobility process took place.
- Signalling from target to source RAN of prediction information allowing to derive potential target cell status, e.g. load predictions per cell Conclusion 1: The Use Case family of "AI/ML for traffic steering" may generate the following impacts:

Uu Impact:
- Flow of information over Uu from UE to target RAN to derive performance characteristics for the UE after the mobility process
- Flow of information from UE to source RAN to derive prediction of conditions while at the source Xn Impact:
- Signalling from target RAN to source RAN of information relative to the conditions and performance of the UEs after the mobility process took place.
- Signalling from target to source RAN of prediction information allowing to derive potential target cell status, e.g. load predictions per cell Standardisation Impacts of AI/ML for QoS Prediction This class of Use Cases relies on the interaction between the RAN and the OAM system. In this class of Use Cases the RAN provides augmented information to the OAM concerning predictions of QoS levels.

Such QoS level predictions may consist of predictions of one or more QoS parameters forming the QoS profile of each bearer at a UE. While it might be considered that predictions could be derived on a per UE per bearer basis, it appears that the amount of information and predictions generated in this case may be overwhelming, as well as the computational effort to derive such number of predications. Instead, an equally effective approach with a lower burden on processing and storage could be that of deriving QoS predictions on a per QoS class basis. For example, QoS prediction could be derived on a per slice and per 5QI granularity.

In this class of Use Cases the main standardisation impacts are foreseen to be on the following:

F1-C Impacts:
- Signalling from gNB-DU to gNB-CU of augmented information for parameters that may take part in QoS prediction derivation, e.g. Predictions of over the air transmission delays, predictions of packet error rates etc.

RAN-OAM Interface Impact:
- Signalling of predicted QoS levels from RAN to OAM, e.g. per QoS class, per slice
- Based on the QoS level predictions, OAM is able to run predictions on SLA fulfilment. Depending on the SLA fulfilment, OAM signals new policies to RAN influencing how SLAs may be met in the future (e.g. new per slice RRM policies)

Conclusion 2: The Use Case family of "Standardisation Impacts of AI/ML for QoS monitoring" may generate the following impacts:

F1-C Impacts:
- Signalling from gNB-DU to gNB-CU of augmented information for parameters that may take part in QoS prediction derivation, e.g. Predictions of over the air transmission delays, predictions of packet error rates etc.

RAN-OAM Interface Impact:
- Signalling of predicted QoS levels from RAN to OAM, e.g. per QoS class, per slice
- Based on the QoS level predictions, OAM is able to run predictions on SLA fulfilment. Depending on the SLA fulfilment, OAM signals new policies to RAN influencing how SLAs may be met in the future (e.g. new per slice RRM policies)

Standardisation Impacts of AI/ML for Improved Radio Resource Management

In this class of scenarios it is possible to group all scenarios based on AI/ML model hosting at the RAN, so to allow for optimisation of RRM processes via a fast control loop. The output of the AI/ML models in this family are prediction parameters that can be used when applying radio resource management. An example of such input could be a prediction of link adaptation configurations.

The RAN has today a very rich set of information that allow for good configuration of radio resource policies. However, there are information currently missing at the RAN, especially concerning the "view" UEs have of the surrounding conditions.

In this class of Use Cases the main standardisation impacts are foreseen to be on the following:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies Conclusion 3: The Use Case family of "AI/ML for improved radio resource management" may generate the following impacts:

- Uu Impact: Flow of information over Uu from UE to RAN
- F1-C Impact: Signalling of information from gNB-CU to gNB-DU to provide inputs to AI/ML Models assisting with radio resource management policy optimisation
- Xn Impact: Signalling between neighbour nodes of information regarding current or predicted radio conditions, that can serve as input to AI/ML models for prediction of radio resource management policies Conclusion This paper has analysed the potential impacts on the standard derived from the Use Cases analysed in R3-2xxxx. The following conclusions were derived:

Conclusion 1: The Use Case family of "AI/ML for efficient traffic steering" may generate the following impacts:

Uu Impact:

Flow of information over Uu from UE to target RAN to derive performance characteristics for the UE after the mobility process Flow of information from UE to source RAN to derive prediction of conditions while at the source Xn Impact:

Signalling from target RAN to source RAN of information relative to the conditions and performance of the UEs after the mobility process took place.

Signalling from target to source RAN of prediction information allowing to derive potential target cell status, e.g. load predictions per cell Conclusion 2: The Use Case family of "Standardisation Impacts of AI/ML for QoS monitoring" may generate the following impacts:

F1-C Impacts:

Signalling from gNB-DU to gNB-CU of augmented information for parameters that may take part in QoS prediction derivation, e.g. Predictions of over the air transmission delays, predictions of packet error rates etc.

RAN-OAM Interface Impact:

Signalling of predicted QoS levels from RAN to OAM, e.g. per QoS class, per slice Based on the QoS level predictions, OAM is able to run predictions on SLA fulfilment. Depending on the SLA fulfilment, OAM signals new policies to RAN influencing how SLAs may be met in the future (e.g. new per slice RRM policies)

Conclusion 3: The Use Case family of "AI/ML for improved radio resource management" may generate the following impacts:

Uu Impact: Flow of information over Uu from UE to RAN

F1-C Impact: Signalling of information from gNB-CU to gNB-DU to provide inputs to AI/ML Models assisting with radio resource management policy optimisation Xn Impact: Signalling between neighbour nodes of information regarding current or predicted radio conditions, that can serve as input to AI/ML models for prediction of radio resource management policies It is proposed to capture the impacts on the standard for the use cases outlined above in the RAN3 TR 37.817. ATP including such impacts has been provided in R3-20xxxx.

REFERENCES

[3]. RP-201620: "Enhancement for data collection for NR and ENDC".

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
AI Artificial Intelligence
AR AutoRegression
CA Carrier Aggregation
CAC Composite available capacity
CGI Cell Global Identifier
CU-CP Centralized unit—control plane
CU-UP Centralized unit—user plane
DC Dual Connectivity
DL Downlink
DU Distributed unit
ECID Enhanced cell identity
eNB Evolved NodeB
E-UTRAN Evolved Universal Terrestrial Radio Access Network
FNN Feedforward Neural Network
gNB A radio base station in NR.
GNSS Global navigation satellite system
LTE Long term evolution
LSTM Long Short-Term Memory
MCG Master cell group
MDT Minimization of drive test
MIMO Multiple Input Multiple Output
ML Machine Learning
MN Master node
NR New radio
O&M Operation and Maintenance
PDCP Packet data convergence protocol
QoE Quality of Experience
QoS Quality of Service
RAN Radio access network
RNN Recurrent Neural Network
RSRP Reference signal received power
RSRQ Reference signal received quality
SON Self Optimizing Network
SCG Secondary cell group
SINR Signal to interference and noise ratio
SN Secondary node
TNL Transport network layer
UE User equipment
UL uplink
X2 The interface between two eNBs.
X2AP X2 Application Protocol
Xn The interface between two gNBs.
XnAP Xn Application Protocol
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network The following are certain enumerated embodiments further illustrating various aspects the disclosed subject matter.

Group A Embodiments

1. A computer implemented method for managing resources in a Radio Access Network, RAN, of a communication network, the method, performed by a first node in the RAN, comprising:
   obtaining a record of resource status information describing usage, during a historical time period and within a coverage area of the first node, of RAN resources controlled by the first node;
   using a Machine Learning, ML, process to predict, based on the obtained record, resource status information describing usage of RAN resources controlled by the first node within a coverage area of the first node and during a future time period; and
   sending, to a second node in the RAN, a representation of the predicted resource status information.
2. The method of embodiment 1, wherein resource status information describing usage of RAN resources controlled by the first node comprises at least one of the metrics:
   a. number of active wireless devices served by the first node;
   b. Quality of Experience measure;
   c. Quality of Service measure;
   d. established Radio Resource Control, RRC, Connections;

e. available RRC Connection capacity;
f. number of inactive UE contexts for wireless devices stored by the first node;
g. available Transport Network Layer resources;
h. Composite Available Capacity, in uplink and/or downlink;
i. Slice Available Capacity, in uplink and/or downlink;
j. Traffic for each served wireless device;
k. size of data arrival in uplink or downlink for a wireless device within a time period;
l. resource use in a part of the coverage area of the first node that is adjacent a coverage area of another node; and/or
m. transmission power used per resource block in uplink and/or downlink.

3. The method of embodiment 2, wherein predicted resource status information describing predicted usage of RAN resources controlled by the first node comprises at least one of:
a. any one of the metrics listed in embodiment 2;
b. a time window for which the predicted resource status information is valid; and/or
c. a measure of uncertainty, accuracy and/or confidence interval for the predicted resource status information.

4. The method of embodiment 2 or 3, wherein resource status information and predicted resource status information are assembled according to at least one of the criteria:
a. per uplink/downlink;
b. per cell;
c. per Data Radio Bearer;
d. per 5G Quality of Service Indicator;
e. per Quality of Service Class Indicator;
f. per intra cell coverage area;
g. per network slice;
h. maximum, minimum, mean, average, median;
i. per sharing PLMN.

5. The method of any one of the preceding embodiments, wherein obtaining a record of resource status information describing usage, during a historical time period and within a coverage area of the first node, of RAN resources controlled by the first node comprises:
a. measuring usage of RAN resources controlled by the first node during the historical time period.

6. The method of any one of the preceding embodiments, further comprising:
receiving, from the second node, resource status information describing usage, during a historical time period and within a coverage area of the second node, of RAN resources controlled by the second node.

7. The method of any one of the preceding embodiments, further comprising:
receiving, from the second node, predicted resource status information describing usage, during a future time period and within a coverage area of the second node, of RAN resources controlled by the second node.

8. The method of any one of the preceding embodiments, further comprising:
obtaining previously predicted resource status information describing usage, during a future or historical time period and within a coverage area of the first node, of RAN resources controlled by the first node.

9. The method of any one of embodiments 6 to 8, wherein using an ML process to predict, based on the obtained record, resource status information describing usage of RAN resources controlled by the first node within a coverage area of the first node and during a future time period comprises:
a. using the ML process to predict resource status information describing usage of RAN resources controlled by the first node within a coverage area of the first node and during a future time period based on the obtained record and on at least one of:
i. received resource status information describing usage, during a historical time period and within a coverage area of the second node, of RAN resources controlled by the second node;
ii. received predicted resource status information describing usage, during a future time period and within a coverage area of the second node, of RAN resources controlled by the second node;
iii. obtained previously predicted resource status information describing usage, during a future or historical time period and within a coverage area of the first node, of RAN resources controlled by the first node.

10. The method of any one of the preceding embodiments, further comprising:
negotiating, with the second node, sending of a representation of predicted resource status information describing usage of RAN resources controlled by the first node within a coverage area of the first node and during a future time period.

11. The method of embodiment 10, wherein negotiating, with the second node, sending of a representation of predicted resource status information comprises at least one of:
a. sending to the second node a request to provide a representation of predicted resource status information for RAN resources controlled by the first node, and receiving from the second node a response to the request, wherein the response indicates that the second node either will or will not accept the representation of predicted resource status information; or
b. receiving from the second node a request to provide a representation of predicted resource status information for RAN resources controlled by the first node, and sending to the second node a response to the request, wherein the response either confirms that the first node can provide the requested representation of predicted resource status information or indicates that the first node will not provide the requested representation of predicted resource status information.

12. The method of any one of the preceding embodiments, wherein using an ML process to predict, based on the obtained record, resource status information describing usage of RAN resources controlled by the first node within a coverage area of the first node and during a future time period comprises using at least one of:
a. an Autoregressive model;
b. a Recurrent Neural Network; or
c. a Long Short-Term Memory process
to predict the resource status information.

13. The method of any one of the preceding embodiments, wherein the second node is a neighbor of the first node, such that a signaling connection is established between the first node and second node.

14. The method of any one of the preceding embodiments, further comprising:
sending a request to the second node to provide feedback on the predicted resource status information.

15. The method of embodiment 14, further comprising:
receiving from the second node an explicit or implicit feedback on the predicted resource status information.

16. The method of any one of the preceding embodiments, further comprising:
generating feedback on the predicted resource status information by:
i. obtaining a record of resource status information describing usage, during the future time period and within a coverage area of the first node, of RAN resources controlled by the first node; and
ii. comparing the obtained record of resource status information to the predicted resource status information.

17. The method of embodiment 15 or 16, wherein using an ML process to predict, based on the obtained record, resource status information describing usage of RAN resources controlled by the first node within a coverage area of the first node and during a future time period comprises:
a. using the ML process to predict resource status information describing usage of RAN resources controlled by the first node within a coverage area of the first node and during a future time period based on the obtained record and on the feedback on the predicted resource status information.

18. The method of any one of the preceding embodiments, further comprising:
receiving, from the second node, a representation of predicted resource status information describing usage of RAN resources controlled by the second node within a coverage area of the second node and during a future time period; and
using the received representation of predicted resource status information for RAN resources controlled by the second node in a process relating to management of RAN resources controlled by the first node.

19. The method of embodiment 18, wherein using the received representation of predicted resource status information for RAN resources controlled by the second node in a process relating to management of RAN resources controlled by the first node comprises:
a. inputting the received representation of predicted resource status information for RAN resources controlled by the second node to a resource optimization process.

20. The method of any one of the preceding embodiments, further comprising:
sending to the second node the obtained record of resource status information describing usage, during a historical time period and within a coverage area of the first node, of RAN resources controlled by the first node.

21. The method of any one of embodiments 8 to 20, further comprising:
sending, to the second node, the previously predicted resource status information describing usage, during a future or historical time period and within a coverage area of the first node, of RAN resources controlled by the first node.

22. The method of any one of the preceding embodiments, further comprising:
negotiating, with the second node, receipt of the representation of predicted resource status information describing usage of RAN resources controlled by the second node within a coverage area of the second node and during a future time period.

23. The method of embodiment 22, wherein negotiating, with the second node, receipt of a representation of predicted resource status information comprises at least one of:
a. receiving from the second node a request to provide a representation of predicted resource status information for RAN resources controlled by the second node, and sending to the second node a response to the request, wherein the response indicates that the first node either will or will not accept the representation of predicted resource status information; or
b. sending to the second node a request to provide a representation of predicted resource status information for RAN resources controlled by the second node, and receiving from the second node a response to the request, wherein the response either confirms that the second node can provide the requested representation of predicted resource status information, or indicates that the second node will not provide the requested representation of predicted resource status information.

24. The method of any one of the preceding embodiments, further comprising:
receiving from the second node a request to provide feedback on the predicted resource status information provided by the second node.

25. The method of embodiment 24, further comprising:
generating feedback on the predicted resource status information, and
providing to the second node, explicitly or implicitly, the generated feedback on the predicted resource status information.

26. The method of any of the previous embodiments, further comprising:
obtaining user data; and
forwarding the user data to a host computer or a wireless device.

Group B Embodiments

27. A computer implemented method for managing resources in a Radio Access Network, RAN, of a communication network, the method, performed by a second node in the RAN comprising:
receiving, from a first node in the RAN, a representation of predicted resource status information describing usage of RAN resources controlled by the first node within a coverage area of the first node and during a future time period; and
using the received representation of predicted resource status information for RAN resources controlled by the first node in a process relating to management of RAN resources controlled by the second node.

28. The method of embodiment 27, wherein using the received representation of predicted resource status information for RAN resources controlled by the first node in a process relating to management of RAN resources controlled by the second node comprises:
a. inputting the received representation of predicted resource status information for RAN resources controlled by the first node to a resource optimization process.

29. The method of embodiment 27 or 28, wherein the predicted resource status information describing usage of RAN resources controlled by the first node comprises at least one of the metrics:

a. number of active wireless devices served by the first node;
b. Quality of Experience measure;
c. Quality of Service measure;
d. established Radio Resource Control, RRC, Connections;
e. available RRC Connection capacity;
f. number of inactive UE contexts for wireless devices stored by the first node;
g. available Transport Network Layer resources;
h. Composite Available Capacity, in uplink and/or downlink;
i. Slice Available Capacity, in uplink and/or downlink;
j. Traffic for each served wireless device;
k. size of data arrival in uplink or downlink for a wireless device within a time period;
l. resource use in a part of the coverage area of the first node that is adjacent a coverage area of another node;
m. transmission power used per resource block in uplink and/or downlink;
n. a time window for which the predicted resource status information is valid; and/or
o. a measure of uncertainty, accuracy and/or confidence interval for the predicted resource status information.

30. The method of embodiment 29, wherein the predicted resource status information is assembled according to at least one of the criteria:

a. per uplink/downlink;
b. per cell;
c. per Data Radio Bearer;
d. per 5G Quality of Service Indicator;
e. per Quality of Service Class Indicator;
f. per intra cell coverage area;
g. per network slice;
h. maximum, minimum, mean, average, median;
i. per sharing PLMN.

31. The method of any one of the preceding embodiments, further comprising:

obtaining resource status information describing usage, during a historical time period and within a coverage area of the second node, of RAN resources controlled by the second node, and sending the obtained resource status information to the first node.

32. The method of any one of the preceding embodiments, further comprising:

obtaining a previously predicted resource status information describing usage, during a future time period and within a coverage area of the second node, of RAN resources controlled by the second node, and sending the obtained predicted resource status information to the first node.

33. The method of any one of the preceding embodiments, further comprising:

negotiating, with the first node, receipt of the representation of predicted resource status information describing usage of RAN resources controlled by the first node within a coverage area of the first node and during a future time period.

34. The method of embodiment 33, wherein negotiating, with the first node, receipt of a representation of predicted resource status information comprises at least one of:

a. receiving from the first node a request to provide a representation of predicted resource status information for RAN resources controlled by the first node, and sending to the first node a response to the request, wherein the response indicates that the second node either will or will not accept the representation of predicted resource status information; or
b. sending to the first node a request to provide a representation of predicted resource status information for RAN resources controlled by the first node, and receiving from the first node a response to the request, wherein the response either confirms that the first node can provide the requested representation of predicted resource status information, or indicates that the first node will not provide the requested representation of predicted resource status information.

35. The method of any one of the preceding embodiments, wherein the first node is a neighbor of the second node, such that a signaling connection is established between the first node and second node.

36. The method of any one of the preceding embodiments, further comprising:

receiving from the first node a request to provide feedback on the predicted resource status information provided by the first node.

37. The method of embodiment 36, further comprising:

generating feedback on the predicted resource status information, and providing to the first node, explicitly or implicitly, the generated feedback on the predicted resource status information.

38. The method of embodiment 37, wherein generating feedback on the predicted resource status information comprises:

a. performing measurements related to the predicted resource status information for RAN resources controlled by the first node; and
b. comparing results of the performed measurements with the predicted resource status information for RAN resources controlled by the first node.

39. The method of any one of embodiments 27 to 38, further comprising:

obtaining a record of resource status information describing usage, during a historical time period and within a coverage area of the second node, of RAN resources controlled by the second node;

using a Machine Learning, ML, process to predict, based on the obtained record, resource status information describing usage of RAN resources controlled by the second node within a coverage area of the second node and during a future time period; and sending, to the first node in the RAN, a representation of the predicted resource status information.

40. The method of embodiment 39, further comprising:

receiving, from the first node, resource status information describing usage, during a historical time period and within a coverage area of the first node, of RAN resources controlled by the first node.

41. The method of embodiment 39 or 40, further comprising:

receiving, from the first node, predicted resource status information describing usage, during a future time period and within a coverage area of the first node, of RAN resources controlled by the first node.

42. The method of any one of embodiments 39 to 41, further comprising:
obtaining previously predicted resource status information describing usage, during a future or historical time period and within a coverage area of the second node, of RAN resources controlled by the second node.

43. The method of any one of embodiments 40 to 42, wherein using an ML process to predict, based on the obtained record, resource status information describing usage of RAN resources controlled by the second node within a coverage area of the second node and during a future time period comprises:
a. using the ML process to predict resource status information describing usage of RAN resources controlled by the second node within a coverage area of the second node and during a future time period based on the obtained record and on at least one of:
i. received resource status information describing usage, during a historical time period and within a coverage area of the first node, of RAN resources controlled by the first node;
ii. received predicted resource status information describing usage, during a future time period and within a coverage area of the first node, of RAN resources controlled by the first node;
iii. obtained previously predicted resource status information describing usage, during a future or historical time period and within a coverage area of the second node, of RAN resources controlled by the second node.

44. The method of any one of the preceding embodiments, further comprising:
negotiating, with the first node, sending of a representation of predicted resource status information describing usage of RAN resources controlled by the second node within a coverage area of the second node and during a future time period.

45. The method of embodiment 44, wherein negotiating, with the first node, sending of sending of a representation of predicted resource status information comprises at least one of:
a. sending to the first node a request to provide a representation of predicted resource status information for RAN resources controlled by the second node, and receiving from the first node a response to the request, wherein the response indicates that the first node either will or will not accept the representation of predicted resource status information; or
b. receiving from the first node a request to provide a representation of predicted resource status information for RAN resources controlled by the second node, and sending to the first node a response to the request, wherein the response either confirms that the second node can provide the requested representation of predicted resource status information, or indicates that the second node will not provide the requested representation of predicted resource status information.

46. The method of any one of embodiments 39 to 45, wherein using an ML process to predict, based on the obtained record, resource status information describing usage of RAN resources controlled by the second node within a coverage area of the second node and during a future time period comprises using at least one of:
a. an Autoregressive model;
b. a Recurrent Neural Network; or
c. a Long Short-Term Memory process
to predict the resource status information.

47. The method of any one of embodiments 39 to 46, further comprising:
sending a request to the first node to provide feedback on the predicted resource status information.

48. The method of embodiment 47, further comprising:
receiving from the first node an explicit or implicit feedback on the predicted resource status information.

49. The method of any one of embodiments 39 to 48, further comprising:
generating feedback on the predicted resource status information by:
i. obtaining a record of resource status information describing usage, during the future time period and within a coverage area of the second node, of RAN resources controlled by the second node; and
ii. comparing the obtained record of resource status information to the predicted resource status information.

50. The method of embodiment 48 or 49, wherein using an ML process to predict, based on the obtained record, resource status information describing usage of RAN resources controlled by the second node within a coverage area of the second node and during a future time period comprises:
a. using the ML process to predict resource status information describing usage of RAN resources controlled by the second node within a coverage area of the second node and during a future time period based on the obtained record and on the feedback on the predicted resource status information.

51. The method of any of the previous embodiments, further comprising:
obtaining user data; and
forwarding the user data to a host computer or a wireless device.

Group C Embodiments

52. A first node in a communication network comprising a Radio Access Network, RAN, the first node being configured to manage resources in the Radio Access Network, RAN, whereby the first node being configured to:
a. obtain a record of resource status information describing usage, during a historical time period and within a coverage area of the first node, of RAN resources controlled by the first node;
b. use a Machine Learning, ML, process to predict, based on the obtained record, resource status information describing usage of RAN resources controlled by the first node within a coverage area of the first node and during a future time period; and
c. send, to a second node in the RAN, a representation of the predicted resource status information.

53. The first node of embodiment 52, further being configured to perform the steps of any one of embodiments 2 to 26.

54. A second node in a communication network comprising a Radio Access Network, RAN, the second node being configured to manage resources in the Radio Access Network, RAN, whereby the second node being configured to:
a. receive, from a first node in the RAN, a representation of predicted resource status information describing usage of RAN resources controlled by the first node within a coverage area of the first node and during a future time period; and b. use the received representation of predicted resource status information for RAN resources controlled by the first node in a process relating to management of RAN resources controlled by the second node.

55. The second node of embodiment 54, further being configured to perform the steps of any one of embodiments 28 to 51.

56. A base station for managing resources in a Radio Access Network, RAN, of a communication network, the base station comprising:

processing circuitry configured to perform any of the steps of any of the Group A embodiments; and power supply circuitry configured to supply power to the base station.

57. A base station for managing resources in a Radio Access Network, RAN, of a communication network, the base station comprising:

processing circuitry configured to perform any of the steps of any of the Group B embodiments;

power supply circuitry configured to supply power to the base station.

58. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group A embodiments or the Group B embodiments.

59. The communication system of the previous embodiment further including the base station.

60. The communication system of the previous 2 embodiments, further including the UE, wherein the UE is configured to communicate with the base station.

61. The communication system of the previous 3 embodiments, wherein:

the processing circuitry of the host computer is configured to execute a host application, thereby providing the user data; and the UE comprises processing circuitry configured to execute a client application associated with the host application.

62. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group A embodiments or the Group B embodiments.

63. The method of the previous embodiment, further comprising, at the base station, transmitting the user data.

64. The method of the previous 2 embodiments, wherein the user data is provided at the host computer by executing a host application, the method further comprising, at the UE, executing a client application associated with the host application.

65. A user equipment (UE) configured to communicate with a base station, the UE comprising a radio interface and processing circuitry configured to performs the steps of the previous 3 embodiments.

66. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments or the Group B embodiments.

67. The communication system of the previous embodiment further including the base station.

68. The communication system of the previous 2 embodiments, further including the UE, wherein the UE is configured to communicate with the base station.

69. The communication system of the previous 3 embodiments, wherein:

the processing circuitry of the host computer is configured to execute a host application;

the UE is configured to execute a client application associated with the host application, thereby providing the user data to be received by the host computer.

The invention claimed is:

1. A computer implemented method for managing resources in a Radio Access Network (RAN) of a communication network, the method, performed by a first node in the RAN, comprising:

obtaining a first record of resource status information describing usage, during a historical time period and within a coverage area of the first node, of RAN resources controlled by the first node;

receiving, from a second node, predicted resource status information describing usage of RAN resources controlled by the second node;

using a Machine Learning (ML) process to predict, based on (i) the obtained first record of resource status information describing usage of RAN resources controlled by the first node and (ii) the received predicted resource status information describing usage of RAN resources controlled by the second node, resource status information describing usage of RAN resources controlled by the first node within a coverage area of the first node and during a future time period; and sending, to the second node in the RAN, a representation of the predicted resource status information.

2. The method of claim 1, wherein one or more of the following conditions apply:

i. resource status information describing usage of RAN resources controlled by the first node comprises at least one of the metrics:

a. number of active wireless devices served by the first node;

b. Quality of Experience measure;

c. Quality of Service measure;

d. established Radio Resource Control, RRC, Connections;

e. available RRC Connection capacity;

f. number of inactive UE contexts for wireless devices stored by the first node;

g. available Transport Network Layer resources;

h. Composite Available Capacity, in uplink and/or downlink;

i. Slice Available Capacity, in uplink and/or downlink;

j. Traffic for each served wireless device;

k. size of data arrival in uplink or downlink for a wireless device within a time period;

l. resource use in a part of the coverage area of the first node that is adjacent a coverage area of another node; and/or m. transmission power used per resource block in uplink and/or downlink;

ii. predicted resource status information describing predicted usage of RAN resources controlled by the first node comprises at least one of:

n. any one of the metrics a to m;

o. a time window for which the predicted resource status information is valid; and/or p. a measure of uncertainty, accuracy and/or confidence interval for the predicted resource status information; and/or iii. resource status information and predicted resource status information are assembled according to at least one of the criteria:

a. per uplink/downlink;

b. per cell;

c. per Data Radio Bearer;

d. per 5G Quality of Service Indicator;

e. per Quality of Service Class Indicator;

f. per intra cell coverage area;

g. per network slice;

h. maximum, minimum, mean, average, median;

i. per sharing PLMN.

3. The method of claim 1, wherein the received predicted resource status information describes usage, during a future time period and within a coverage area of the second node, of RAN resources controlled by the second node.

4. The method of claim 1, wherein one or more of the following conditions apply:

i. the method further comprises negotiating, with the second node, sending of a representation of predicted resource status information describing usage of RAN resources controlled by the first node within a coverage area of the first node and during a future time period;

ii. the method further comprises negotiating, with the second node, sending of a representation of predicted resource status information which comprises at least one of:

a. sending to the second node a request to provide a representation of predicted resource status information for RAN resources controlled by the first node, and receiving from the second node a response to the request, wherein the response indicates that the second node either will or will not accept the representation of predicted resource status information; or b. receiving from the second node a request to provide a representation of predicted resource status information for RAN resources controlled by the first node, and sending to the second node a response to the request, wherein the response either confirms that the first node can provide the requested representation of predicted resource status information or indicates that the first node will not provide the requested representation of predicted resource status information.

5. The method of claim 1, wherein one or more of the following conditions apply:

i. the method further comprises sending a request to the second node to provide feedback on the predicted resource status information;

ii. the method further comprises receiving from the second node an explicit or implicit feedback on the predicted resource status information; and/or iii. the method further comprises generating feedback on the predicted resource status information by:

i. obtaining a record of resource status information describing usage, during the future time period and within a coverage area of the first node, of RAN resources controlled by the first node; and ii. comparing the obtained record of resource status information to the predicted resource status information.

6. The method of claim 1, further comprising:

receiving, from the second node, a representation of predicted resource status information describing usage of RAN resources controlled by the second node within a coverage area of the second node and during a future time period; and using the received representation of predicted resource status information for RAN resources controlled by the second node in a process relating to management of RAN resources controlled by the first node.

7. The method of claim 1, wherein one or more of the following conditions apply:

i. the method further comprises negotiating, with the second node, receipt of the representation of predicted resource status information describing usage of RAN resources controlled by the second node within a coverage area of the second node and during a future time period; and/or ii. the method further comprises negotiating, with the second node, receipt of a representation of predicted resource status information comprises at least one of:

a. receiving from the second node a request to provide a representation of predicted resource status information for RAN resources controlled by the second node, and sending to the second node a response to the request, wherein the response indicates that the first node either will or will not accept the representation of predicted resource status information; or b. sending to the second node a request to provide a representation of predicted resource status information for RAN resources controlled by the second node, and receiving from the second node a response to the request, wherein the response either confirms that the second node can provide the requested representation of predicted resource status information, or indicates that the second node will not provide the requested representation of predicted resource status information.

8. The method of claim 1, wherein one or more of the following conditions apply:

i. the method further comprises receiving from the second node a request to provide feedback on the predicted resource status information provided by the second node; and/or ii. the method further comprises generating feedback on the predicted resource status information, and providing to the second node, explicitly or implicitly, the generated feedback on the predicted resource status information.

9. A computer implemented method for managing resources in a Radio Access Network (RAN) of a communication network, the method, performed by a second node in the RAN, comprising:

obtaining a previously predicted resource status information describing usage of RAN resources controlled by the second node;

sending the obtained predicted resource status information to a first node;

receiving, from the first node in the RAN, a representation of predicted resource status information describing usage of RAN resources controlled by the first node within a coverage area of the first node and during a future time period; and using the received representation of predicted resource status information for RAN resources controlled by the first node in a process relating to management of RAN resources controlled by the second node.

10. The method of claim 9, wherein one or more of the following conditions apply:

i. the predicted resource status information describing usage of RAN resources controlled by the first node comprises at least one of the metrics:
 a. number of active wireless devices served by the first node;
 b. Quality of Experience measure;
 c. Quality of Service measure;
 d. established Radio Resource Control, RRC, Connections;
 e. available RRC Connection capacity;
 f. number of inactive UE contexts for wireless devices stored by the first node;
 g. available Transport Network Layer resources;
 h. Composite Available Capacity, in uplink and/or downlink;
 i. Slice Available Capacity, in uplink and/or downlink;
 j. Traffic for each served wireless device;
 k. size of data arrival in uplink or downlink for a wireless device within a time period;
 l. resource use in a part of the coverage area of the first node that is adjacent a coverage area of another node;
 m. transmission power used per resource block in uplink and/or downlink;
 n. a time window for which the predicted resource status information is valid; and/or
 o. a measure of uncertainty, accuracy and/or confidence interval for the predicted resource status information; and/or ii. the predicted resource status information is assembled according to at least one of the criteria:
 p. per uplink/downlink;
 q. per cell;
 r. per Data Radio Bearer;
 s. per 5G Quality of Service Indicator;
 t. per Quality of Service Class Indicator;
 u. per intra cell coverage area;
 v. per network slice;
 w. maximum, minimum, mean, average, median;
 x. per sharing PLMN.

11. The method of claim 9, wherein the obtained predicted resource status information describes usage, during a future time period and within a coverage area of the second node, of RAN resources controlled by the second node.

12. The method of claim 9, wherein one or more of the following conditions apply:

i. the method further comprises negotiating, with the first node, receipt of the representation of predicted resource status information describing usage of RAN resources controlled by the first node within a coverage area of the first node and during a future time period; and/or ii. the method further comprises negotiating, with the first node, receipt of a representation of predicted resource status information comprises at least one of:
 a. receiving from the first node a request to provide a representation of predicted resource status information for RAN resources controlled by the first node, and sending to the first node a response to the request, wherein the response indicates that the second node either will or will not accept the representation of predicted resource status information; or
 b. sending to the first node a request to provide a representation of predicted resource status information for RAN resources controlled by the first node, and receiving from the first node a response to the request, wherein the response either confirms that the first node can provide the requested representation of predicted resource status information, or indicates that the first node will not provide the requested representation of predicted resource status information.

13. The method of claim 9, wherein one or more of the following conditions apply:

i. the method further comprises receiving from the first node a request to provide feedback on the predicted resource status information provided by the first node;

ii. the method further comprises generating feedback on the predicted resource status information, and providing to the first node, explicitly or implicitly, the generated feedback on the predicted resource status information; and/or iii. the method further comprises generating feedback on the predicted resource status information comprises:
 a. performing measurements related to the predicted resource status information for RAN resources controlled by the first node; and
 b. comparing results of the performed measurements with the predicted resource status information for RAN resources controlled by the first node.

14. The method of claim 9, further comprising:

obtaining a record of resource status information describing usage, during a historical time period and within a coverage area of the second node, of RAN resources controlled by the second node;

using a Machine Learning, ML, process to predict, based on the obtained record, resource status information describing usage of RAN resources controlled by the second node within a coverage area of the second node and during a future time period; and sending, to the first node in the RAN, a representation of the predicted resource status information.

15. The method of claim 9, wherein one or more of the following conditions apply:

i. the method further comprises negotiating, with the first node, sending of a representation of predicted resource status information describing usage of RAN resources controlled by the second node within a coverage area of the second node and during a future time period;

ii. the method further comprises negotiating, with the first node, sending of sending of a representation of predicted resource status information comprises at least one of:
 a. sending to the first node a request to provide a representation of predicted resource status information for RAN resources controlled by the second node, and receiving from the first node a response to the request, wherein the response indicates that the first node either will or will not accept the representation of predicted resource status information; or b. receiving from the first node a request to provide a representation of predicted resource status information for RAN resources controlled by the second node, and sending to the first node a response to the request, wherein the response either confirms that the second node can provide the requested representation of predicted resource status information, or indicates that the second node will not provide the requested representation of predicted resource status information;

iii. the method further comprises sending a request to the first node to provide feedback on the predicted resource status information; and/or iv. the method further comprises receiving from the first node an explicit or implicit feedback on the predicted resource status information.

16. A first node in a communication network comprising a Radio Access Network (RAN), the first node being configured to manage resources in the RAN, whereby the first node being configured to:

a. obtain a first record of resource status information describing usage, during a historical time period and within a coverage area of the first node, of RAN resources controlled by the first node;

b. receive, from a second node, predicted resource status information describing usage of RAN resources controlled by the second node;

c. use a Machine Learning (ML) process to predict, based on (i) the obtained first record of resource status information describing usage of RAN resources controlled by the first node and (ii) the received predicted resource status information describing usage of RAN resources controlled by the second node, resource status information describing usage of RAN resources controlled by the first node within a coverage area of the first node and during a future time period; and d. send, to the second node in the RAN, a representation of the predicted resource status information.

17. The first node of claim 16, wherein one or more of the following conditions apply:

i. resource status information describing usage of RAN resources controlled by the first node comprises at least one of the metrics:

a. number of active wireless devices served by the first node;

b. Quality of Experience measure;

c. Quality of Service measure;

d. established Radio Resource Control, RRC, Connections;

e. available RRC Connection capacity;

f. number of inactive UE contexts for wireless devices stored by the first node;

g. available Transport Network Layer resources;

h. Composite Available Capacity, in uplink and/or downlink;

i. Slice Available Capacity, in uplink and/or downlink;

j. Traffic for each served wireless device;

k. size of data arrival in uplink or downlink for a wireless device within a time period;

l. resource use in a part of the coverage area of the first node that is adjacent a coverage area of another node; and/or m. transmission power used per resource block in uplink and/or downlink;

ii. predicted resource status information describing predicted usage of RAN resources controlled by the first node comprises at least one of:

n. any one of the metrics a to m;

o. a time window for which the predicted resource status information is valid; and/or p. a measure of uncertainty, accuracy and/or confidence interval for the predicted resource status information; and/or iii. resource status information and predicted resource status information are assembled according to at least one of the criteria:

a. per uplink/downlink;

b. per cell;

c. per Data Radio Bearer;

d. per 5G Quality of Service Indicator;

e. per Quality of Service Class Indicator;

f. per intra cell coverage area;

g. per network slice;

h. maximum, minimum, mean, average, median;

i. per sharing PLMN.

18. A second node in a communication network comprising a Radio Access Network (RAN) the second node being configured to manage resources in the RAN, whereby the second node being configured to:

a. obtain a previously predicted resource status information describing usage of RAN resources controlled by the second node;

b. send the obtained predicted resource status information to a first node;

c. receive, from the first node in the RAN, a representation of predicted resource status information describing usage of RAN resources controlled by the first node within a coverage area of the first node and during a future time period; and d. use the received representation of predicted resource status information for RAN resources controlled by the first node in a process relating to management of RAN resources controlled by the second node.

19. The second node of claim 18, wherein one or more of the following conditions apply:

i. the predicted resource status information describing usage of RAN resources controlled by the first node comprises at least one of the metrics:

a. number of active wireless devices served by the first node;

b. Quality of Experience measure;

c. Quality of Service measure;

d. established Radio Resource Control, RRC, Connections;

e. available RRC Connection capacity;

f. number of inactive UE contexts for wireless devices stored by the first node;

g. available Transport Network Layer resources;

h. Composite Available Capacity, in uplink and/or downlink;

i. Slice Available Capacity, in uplink and/or downlink;

j. Traffic for each served wireless device;

k. size of data arrival in uplink or downlink for a wireless device within a time period;

l. resource use in a part of the coverage area of the first node that is adjacent a coverage area of another node;

m. transmission power used per resource block in uplink and/or downlink;

n. a time window for which the predicted resource status information is valid; and/or o. a measure of uncertainty, accuracy and/or confidence interval for the predicted resource status information; and/or ii. the predicted resource status information is assembled according to at least one of the criteria:

p. per uplink/downlink;

q. per cell;

r. per Data Radio Bearer;

s. per 5G Quality of Service Indicator;

t. per Quality of Service Class Indicator;

u. per intra cell coverage area;

v. per network slice;

w. maximum, minimum, mean, average, median;

x. per sharing PLMN.

* * * * *